US008846551B2

(12) United States Patent
Gupta et al.

(10) Patent No.: US 8,846,551 B2
(45) Date of Patent: Sep. 30, 2014

(54) SYSTEMS AND METHODS OF LASER TEXTURING OF MATERIAL SURFACES AND THEIR APPLICATIONS

(71) Applicant: University of Virginia Patent Foundation, Charlottesville, VA (US)

(72) Inventors: Mool C. Gupta, Yorktown, VA (US); Barada K. Nayak, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 136 days.

(21) Appl. No.: 13/628,009

(22) Filed: Sep. 26, 2012

(65) Prior Publication Data

US 2013/0020297 A1  Jan. 24, 2013

Related U.S. Application Data

(63) Continuation-in-part of application No. 12/530,313, filed as application No. PCT/US2008/056033 on Mar.

(Continued)

(51) Int. Cl.
*B82Y 30/00* (2011.01)
*B82Y 40/00* (2011.01)
*B23K 26/12* (2014.01)
*B23K 26/00* (2014.01)

(52) U.S. Cl.
CPC .............. *B23K 26/12* (2013.01); *B23K 26/122* (2013.01); *B23K 26/0084* (2013.01); *B23K 26/0078* (2013.01); *B23K 26/127* (2013.01); *Y10S 977/901* (2013.01)
USPC .............. 438/795; 438/487; 216/65; 977/901

(58) Field of Classification Search
CPC ......................................... B26K 26/00–26/428

USPC .............................. 216/58–81; 977/700–963; 372/43.01–50.23; 257/79–103; 438/308, 487, 795–799, 940
See application file for complete search history.

(56) References Cited

U.S. PATENT DOCUMENTS 4,622,095 A    11/1986  Grobman
4,972,061 A *  11/1990  Duley et al. .............. 219/121.66

(Continued)

FOREIGN PATENT DOCUMENTS

DE          19731315 A1     1/1999
WO      WO 2005/072437      8/2005

(Continued)

OTHER PUBLICATIONS

"Silicon microcolumn arrays grown by nanosecond pulsed-excimer laser irradiation" by A. J. Pedrazaa, J. D. Fowlkes, D. H. Lowndes, Applied Physics Letters vol. 74, No. 16 Apr. 19, 1999.*

(Continued)

*Primary Examiner* — Steven J Fulk
*Assistant Examiner* — Eric Ward
(74) *Attorney, Agent, or Firm* — Robert J. Decker

(57) ABSTRACT

The surface of a material is textured and by exposing the surface to pulses from an ultrafast laser. The laser treatment causes pillars to form on the treated surface. These pillars provide for greater light absorption. Texturing and crystallization can be carried out as a single step process. The crystallization of the material provides for higher electric conductivity and changes in optical and electronic properties of the material. The method may be performed in vacuum or a gaseous environment. The gaseous environment may aid in texturing and/or modifying physical and chemical properties of the surfaces. This method may be used on various material surfaces, such as semiconductors, metals and their alloys, ceramics, polymers, glasses, composites, as well as crystalline, nanocrystalline, polycrystalline, microcrystalline, and amorphous phases.

65 Claims, 34 Drawing Sheets

Related U.S. Application Data 6, 2008, which is a continuation-in-part of application No. 12/158,553, filed as application No. PCT/US2006/049065 on Dec. 21, 2006.

(60) Provisional application No. 61/539,785, filed on Sep. 27, 2011, provisional application No. 60/905,808, filed on Mar. 9, 2007, provisional application No. 60/860,735, filed on Nov. 22, 2006, provisional application No. 60/843,874, filed on Sep. 12, 2006, provisional application No. 60/752,545, filed on Dec. 21, 2005.

(56) References Cited

U.S. PATENT DOCUMENTS

| | | | |
|---|---|---|---|
| 5,348,609 | A | 9/1994 | Russell |
| 5,473,138 | A * | 12/1995 | Singh et al. ............. 219/121.69 |
| 5,500,071 | A * | 3/1996 | Kaltenbach et al. ........ 156/272.8 |
| 5,624,529 | A | 4/1997 | Shul |
| 5,818,700 | A | 10/1998 | Purinton |
| 6,169,014 | B1 | 1/2001 | McCulloch |
| 6,238,847 | B1 | 5/2001 | Axtell |
| 6,372,103 | B1 | 4/2002 | Perry |
| 6,451,113 | B1 | 9/2002 | Givargizov |
| 6,451,631 | B1 | 9/2002 | Grigoropoluos |
| 6,489,188 | B2 | 12/2002 | Jung |
| 6,504,180 | B1 | 1/2003 | Heremans |
| 6,613,161 | B2 | 9/2003 | Zheng |
| 6,635,932 | B2 | 10/2003 | Grigoropoluos |
| 6,746,942 | B2 | 6/2004 | Sato et al. |
| 6,829,988 | B2 | 12/2004 | George |
| 6,864,190 | B2 | 3/2005 | Han |
| 6,893,886 | B2 | 5/2005 | Liu |
| 6,919,162 | B1 * | 7/2005 | Brennen et al. ............ 430/272.1 |
| 6,921,722 | B2 | 7/2005 | Ogure |
| 6,948,843 | B2 | 9/2005 | Laugharn |
| 7,057,256 | B2 | 6/2006 | Carey |
| 7,114,448 | B2 | 10/2006 | Salleo |
| 7,169,709 | B2 | 1/2007 | Koide |
| 7,244,669 | B2 | 7/2007 | Sirringhaus |
| 7,354,792 | B2 | 4/2008 | Carey |
| 7,390,689 | B2 | 6/2008 | Mazur |
| 7,442,629 | B2 | 10/2008 | Mazur |
| 7,469,831 | B2 | 12/2008 | Gu |
| 7,585,424 | B2 | 9/2009 | Mei |
| 7,675,952 | B2 | 3/2010 | Ushinsky |
| 7,750,353 | B2 | 7/2010 | Lee |
| 7,754,508 | B2 | 7/2010 | Lee |
| 7,884,446 | B2 | 2/2011 | Mazur |
| 7,968,804 | B2 | 6/2011 | Frey |
| 7,972,553 | B2 | 7/2011 | Beck |
| 7,997,890 | B2 | 8/2011 | Heidari |
| 8,143,686 | B2 | 3/2012 | Mazur |
| 8,354,286 | B2 | 1/2013 | Lee |
| 8,598,051 | B2 | 12/2013 | Mazur |
| 2001/0030002 | A1 * | 10/2001 | Zheng et al. .................. 148/241 |
| 2002/0014625 | A1 | 2/2002 | Asami |
| 2002/0057487 | A1 | 5/2002 | Hutcheson |
| 2003/0029495 | A1 * | 2/2003 | Mazur et al. .................. 136/256 |
| 2004/0000540 | A1 * | 1/2004 | Soboyejo et al. ........ 219/121.69 |
| 2004/0076813 | A1 | 4/2004 | Han |
| 2004/0079730 | A1 | 4/2004 | Ahrens |
| 2004/0227140 | A1 | 11/2004 | Lee |
| 2005/0026401 | A1 | 2/2005 | Shimomura |
| 2005/0170567 | A1 | 8/2005 | Tanaka |
| 2005/0211680 | A1 | 9/2005 | Li |
| 2006/0000814 | A1 | 1/2006 | Gu |
| 2006/0079062 | A1 | 4/2006 | Mazur |
| 2007/0020536 | A1 | 1/2007 | Jung |
| 2007/0036951 | A1 | 2/2007 | Nguyen |
| 2008/0011852 | A1 * | 1/2008 | Gu et al. ........................ 235/454 |
| 2008/0044943 | A1 * | 2/2008 | Mazur et al. ..................... 438/95 |
| 2008/0277826 | A1 | 11/2008 | Chou |
| 2009/0321626 | A1 | 12/2009 | Vertes |
| 2010/0002740 | A1 * | 1/2010 | Ushinsky et al. ........ 372/45.011 |
| 2010/0143744 | A1 | 6/2010 | Gupta |
| 2010/0219506 | A1 | 9/2010 | Gupta |
| 2011/0033661 | A1 | 2/2011 | Oawa |
| 2013/0025322 | A1 | 1/2013 | Choi |

FOREIGN PATENT DOCUMENTS

| | | |
|---|---|---|
| WO | WO 2008/091242 | 7/2008 |
| WO | WO 2008/127807 | 10/2008 |

OTHER PUBLICATIONS

"Ultrafast laser-induced self-organized conical micro/nano surface structures and their origin" by Barada K. Nayak, Mool C. Gupta, Optics and Lasers in Engineering 48 (2010) 966-973.*

Photovoltaics, Sun & Wind Energy 2, 2005, pp. 80-84.

Raksi et. al., "Ultrafast X-Ray Absorption Probing of a Chemical Reaction," The Journal of Chemical Physics, Apr. 15, 1996, pp. 6066-6069, vol. 104, No. 15.

Redfield, "Multiple-Pass Thin-Film Silicon Solar Cell," Applied Physics Letters, Dec. 1, 1974, pp. 647-648, vol. 25, No. 11.

Riedel et al., "Fabrication of Ordered Arrays of Silicon Cones by Optical Diffraction in Ultrafast Laser Etching with SF6," Applied Physics A, 2004, pp. 381-385, vol. 78.

Seia, US Solar Industry Year in Solar, US Solar Energy Industry Charging Ahead, Prometheus Institute, 2006, pp. 1-8.

Shank et al., "Femtosecond-Time-Resolved Surface Structural Dynamics of Optically Excited Silicon," Physical Review Letters, Sep. 5, 1983, pp. 900-902, vol. 51, No. 10.

Sheehy et al., "Role of the Background Gas in the Morphology and Optical Properties of Laser-Microstructured Silicon," Chemistry of Materials, 2005, pp. 3582-3586, vol. 17.

Shen et al., "Porous Silicon as a Versatile Platform for LaserDesorption/Ionization Mass Spectrometry," Analytical Chemistry, Feb. 1, 2001, pp. 612-619, vol. 73, No. 3.

Shen et al., "Formation of Regular Arrays of Silicon Microspikes by Femtosecond Laser Irradiation through a Mask," Applied Physics Letters, 2003, pp. 1715-1717, vol. 82, No. 11.

SiOnyx, "Laser Texturing Yields Solar Efficiency Boost," Optics.org, News & Analysis, Oct. 26, 2011, 12 pages, http://optics.org/news/2/10/24.

Papet et al., "Pyramidal Texturing of Silicon Solar Cell with TMAH chemical Anisotropic Etching," Solar Energy Materials & Solar Cells, 2006, pp. 2319-2328, vol. 90, No. 15.

Simpson, "Making the World's Most Superhydrophobic Surfaces," Oak Ridge National Laboratory, Aug. 13, 2010, 2 pages.

Pedraza et al., "Self-Organized Silicon Microcolumn Arrays Generated by Pulsed Laser Irradiation," Applied Physics A, 1999, pp. S731-S734, vol. 69 [Suppl.].

Pedraza et al., "Surface Micro-Structuring of Silicon by Excimer-Laser Irradiation in Reactive Atmospheres," Applied Surface Science, 2000, pp. 251-257, vol. 168.

Vorobyev et al., "Femtosecond Laser Nanostructuring of Metals," Optics Express, Mar. 2006, pp. 2164-2169, vol. 14, No. 6.

Wu et al., "Near-Unity Below-Band-Gap Absorption by Microstructured Silicon," Applied Physics Letters, Mar. 26, 2001, pp. 1850-1852, vol. 78, No. 13.

Xia et al., "Unconventional Methods for Fabricating and Patterning Nanostructures," Chemical Reviews, 1999, pp. 1823-1848, vol. 99, No. 7.

Yoo et al., "Black Surface Structures for Crystalline Silicon Solar Cells," Materials Science and Engineering B, 2009, pp. 333-337, vol. 159-160.

Young et al., "Laser-Induced Periodic Surface Structure," Physical Review B, Jan. 15, 1983, pp. 1155-1172, vol. 27, No. 2.

Zhao et al., "22.7% Efficient Silicon Photovoltaic Modules with Textured Front Surface," IEEE Transactions on Electron Devices, 1999, pp. 1495-1497, vol. 46, No. 7.

Zhao et al., "Picosecond Pulse Laser Microstructuring of Silicon," Chinese Physics Letters, 2003, pp. 1789-1791, vol. 20, No. 10.

(56) References Cited

OTHER PUBLICATIONS

Zhigilei, "Dynamics of the Plume Formation and Parameters of the Ejected Clusters in Short-Pulse Laser Ablation," Applied Physics A, 2003, pp. 339-350, vol. 76.

Zorba et al., "Laser Microstructuring of Si Surfaces for Low-Threshold Field-Electron Emission," Thin Solid Films, 2004, pp. 492-495, vol. 453-454.

Bassam et al., "Measurement of Optical and Electrical Properties of Silicon Microstructuring Induced by ArF Excimer Laser at SF6 Atmosphere," Applied Surface Science, 2008, pp. 2621-2628, vol. 254.

Bonse et. al., "Femtosecond Laser Ablation of Silicon-Modification Thresholds and Morphology" Applied Physics A, 2002, pp. 19-25, vol. 74.

Caffrey et al., "Ultrafast Laser-Induced Microstructure/Nanostructure Replication and Optical Properties," Applied Optics, Feb. 10, 2012, pp. 604-609, vol. 51, No. 5.

Campbell et al., "Light Trapping Properties of Pyramidally Textured," Journal of Applied Physics, Jul. 1, 1987, pp. 243-249, vol. 62, No. 1.

Carey, "Femtosecond-laser Microstructuring of Silicon for Novel Optoelectronic Devices," Thesis, The Division of Engineering and Applied Sciences, Harvard University, 2004, 162 pages.

Carey et al., "Visible and Near-Infrared Responsivity of Femtosecond-Laser Microstructured Silicon Photodiodes," Optics Letters, Jul. 15, 2005, pp. 1773-1775, vol. 30, No. 14.

Chien et al., "Pulse Width Effect in Ultrafast Laser Processing of Materials," Applied Physics A: Materials Science & Processing, 2005, pp. 1257-1263, vol. 81, No. 6.

Crouch et al., "Comparision of Structure and Properties of Femtosecond and Nanosecond Laser-Structured Silicon," Applied Physics Letters, Mar. 15, 2004, pp. 1850-1852, vol. 84, No. 11.

Fauchet et al., "Surface Ripples on Silicon Gallium Arsenide Under Picosecond Laser Illumination," Applied Physics Letters, May 1, 1982, pp. 824-826, vol. 40, No. 9.

Gee et a., "Reflectance Control for Multicrystalline-Silicon Photovoltaic Modules using Textured-Dielectric Coatings," Photovoltaic Energy Conversion, Conference Record of the Twenty Fourth. IEEE Photovoltaic Specialists Conference—1994, IEEE First World Conference, 1994, pp. 1274-1277, vol. 2.

Gee et al., "The Effect of Encapsulation on the Reflectance of Photovoltaic Modules using Textured Multicrystalline-Silicon Solar Cells," Photovoltaic Energy Conversion, Conference Record of the Twenty Fourth. IEEE Photovoltaic Specialists Conference—1994, IEEE First World Conference, 1994, pp. 1555-1558, vol. 2.

Gupta, "A Study of Laser Marking of Thin Films," Journal of Material Research, 1988, pp. 1187-1195, vol. 3, No. 6.

Gupta et al., "Diode Pumped Solid State Lasers for Surface Microtexture," Journal of Laser Micro/Nanoengineering, 2013, pp. 124-130, vol. 8, No. 2.

Henley et al., "Dynamics of Confined Plumes During Short and Ultrashort Pulsed Laser Ablation of Graphite," Physical Review B, 2005, pp. 205413-1-205413-13, vol. 72.

Her et al., "Microstructuring of Silicon with Femtosecond Laser Pulses," Appl. Phys. Lett., Sep. 21, 1998, pp. 1673-1675, vol. 73, No. 12.

Her et al., "Femtosecond Laser-Induced Formation of Spikes on Silicon," Applied Physics A, 2000, pp. 383-385, vol. 70.

Hermann, "Impact of Surface Topography and Laser Pulse Duration for Laser Ablation of Solar Cell Front Side Passivating SiNx Layers," Journal of Applied Physics, 2010, pp. 114514-1-114514-8, vol. 108.

Iyengar et al., "Laser Assisted Doping for Photovoltaic Applications," Journal of Laser Micro Nanoengineering, 2009, pp. 89-94, vol. 4, No. 2.

Iyengar et al., "Optical Properties of Silicon Light Trapping Structures for Photovoltaics," Solar Energy Materials and Solar Cells, 2010, pp. 2251-2257, vol. 94.

Iyengar et al., "Ultra Low Reflectance Metal Surfaces by Ultrafast Laser Texturing," Applied Optics, Nov. 1, 2010, pp. 5983-5988, vol. 49, No. 31.

Iyengar et al., "Properties of Ultrafast Laser Textured Silicon for Photovoltaics," Solar Energy Materials & Solar Cells, 2011, pp. 2745-2751, vol. 95.

Kabashin et al., "Nanofabrication with Pulsed Lasers," Nanoscale Research Letters, 2010, pp. 454-463, vol. 5.

Khung et al., "Micropatterning of Porous Silicon Films by Direct Laser Writing," Biotechnology Progress, 2006, pp. 1388-1393, vol. 22, No. 5.

Kovalchenko et al., "The Effect of Laser Texturing of Steel Surfaces and Speed-Load Parameters on the Transition of Lubrication Regime from Boundary to Hydrodynamic," Tribology Transactions 2004, pp. 299-307, vol. 47.

Li et al., "Laser-Textured Silicon Photodiode with Broadband Spectral Response," Applied Optics, Jun. 10, 2011, pp. 2508-2511, vol. 50, No. 17.

Liu et al., "Phase Transformation on and Charged Particle Emission from a Silicon Crystal Surface, Induced by Picosecond Laser Pulses," Applied Physics Letters, Nov. 1, 1981, pp. 755-757, vol. 39, No. 9.

Lowndes et al., "Early Stages of Pulsed-Laser Growth of Silicon Microcolumns and Microcones in Air and SF6," Applied Surface Science, 2000, pp. 647-658, vol. 154-155.

MacDonald et al., "Texturing Industrial Multicrystalline Silicon Solar Cells," Solar Energy, 2004, pp. 277-283, vol. 76, Issues 1-3.

Makower et al., "Clean Energy Trends 2005," Clean Edge, Mar. 2005, pp. 1-18.

Martin et al., "Measuring Liquid Properties with Smooth- and Textured-Surface Resonators," Frequency Control Symposium, 47th, Proceedings of the 1993 IEEE International, 1993, pp. 603-608.

Martinu et al., "Plasma Deposition of Optical Films and Coatings: A Review," Journal of Vacuum Science & Technology A, 2000, pp. 2619-2645, vol. 18, No. 6.

Mata et al., "Osteoblast Attachment to a Textured Surface in the Absence of Exogenous Adhesion Proteins," IEEE transactions on NanoBioscience, 2003, pp. 287-294, vol. 2, No. 4.

Matsui et al., "Influence of Substrate Texture on Microstructure and Photovoltaic Performances of Thin Film Polycrystalline Silicon Solar Cells," Journal of Non-Crystalline Solids, 2002, pp. 1152-1156, vol. 299-302, Part 2.

Mills et al., "Solidification Driven Extrusion of Spikes During Laser Melting of Silicon Pillars," Nanotechnology, 2006, pp. 2471-2744, vol. 17.

Mills et al., "Laser-Etched Silicon Pillars and Their Porosification," Journal of Vacuum Science & Technology A, 2004, pp. 1647-1651, vol. 22, No. 4.

Nayak et al., "Femtosecond Laser-Induced Micro-Structure of Thin a-Si:H Films," MRS Fall 2004 meeting, Nov. 29-Dec. 3, 2004, 14 pages, Boston, MA.

Nayak et al., "Femtosecond Laser-Induced Micro-Structure of Thin a-Si:H Films," Materials Research Society Symposium Proc. 850, 2005, 5 pages, Warrendale, PA.

Nayak et al., "Semiconductor Laser Crystallization of a-Si:H on Conducting Tin Oxide Coated Glass for Solar Cell and Display Applications," Applied Physics A, Feb. 2005, pp. 1077-1080, vol. 80, No. 5.

Nayak et al., "Femtosecond-Laser-Induced-Crystallization and Simultaneous Formation of Light Trapping Microstructures in Thin a-Si:H Films," Applied Physics A: Materials Science and Processing, 2007, pp. 663-666, vol. 89, No. 3.

Nayak et al., "Spontaneous Formation of Nanospiked Microstructures in Germanium by Femtosecond Laser Irradiation," Nanotechnology 2007, 195302 (4pp), vol. 18.

Nayak et al., "Ultrafast-Laser-Assisted Chemical Restructuring of Silicon and Germanium Surfaces," Applied Surface Science, 2007, pp. 6580-6583, vol. 253, No. 15.

Nayak et al., "Formation of Nano-Textured Conical Microstructures in Titanium Metal Surface by Femtosecond Laser Irradiation," Applied Physics A, 2008, pp. 399-402, vol. 90.

Nayak et al., "Self-Organized Micro/Nano Structures in Metal Surfaces by Ultrafast Laser Irradiation," Optics and Lasers in Engineering, 2010, pp. 940-949, vol. 48.

Pozzato et al., "Superhydrophobic Surfaces Fabricated by Nanoimprint Lithography," Microelectronic Engineering, 2006, pp. 884-888, vol. 83.

(56) References Cited

OTHER PUBLICATIONS

Nayak et al., "Efficient Light Trapping in Silicon Solar Cells by Ultrafast-Laser-Induced Self-Assembled Micro/Nano Structures," Progress in Photovoltaics: Research and Applications, 2011, pp. 631-639, vol. 19.

Nayak et al., "Micro Texturing of Silicon Using Pulsed N2-laser and Formation Mechanism," Applied Optics, Jan. 1, 2012, pp. 114-120, vol. 51, No. 1.

Sparber et al., "Comparison of Texturing Methods for Monocrystalline Silicon Solar Cells using KOH and Na2C03," Proceedings of 3rd World Conference on Photovoltaic Energy Conversion, 2003, pp. 1372-1375, Osaka, Japan.

Tucci et al., "CF4/O2 Dry Etching of Textured Crystalline Silicon Surface in a-Si:H/c-Si Heterojunction for Photovoltaic Applications," Solar Energy Materials & Solar Cells, 2001, pp. 175-185, vol. 69, No. 2.

Vinod et al., "Surface and Optical Characterization of the Porous Silicon Textured Surface," Journal of Materials Science: Materials in Electronics, 2005, pp. 1-6, vol. 16, No. 1.

Yamada et al., "Optimization of Anti-Reflection Moth-Eye Structures for use in Crystalline Silicon Solar Cells," Progress in Photovoltaics: Research and Applications, 2011, pp. 134-140, vol. 19, No. 2.

\* cited by examiner

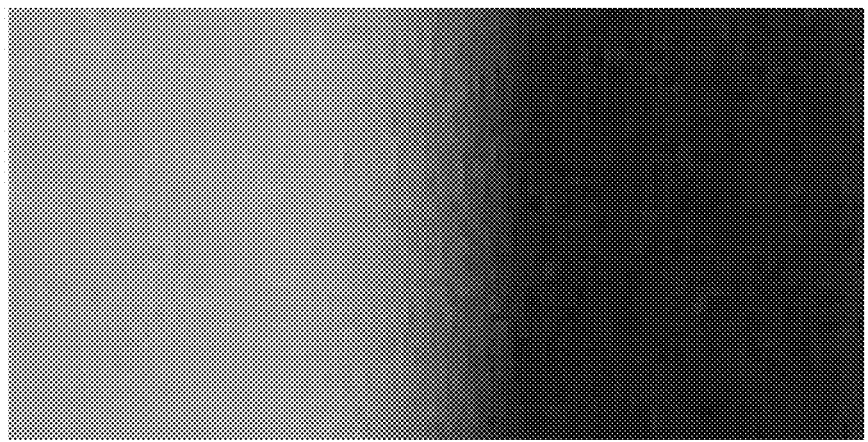
FIG. 3A          FIG. 3B
  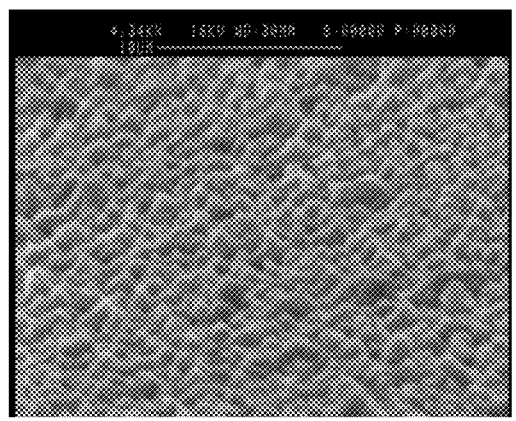
FIG. 4A          FIG. 4B FIG. 10A
FIG. 10B
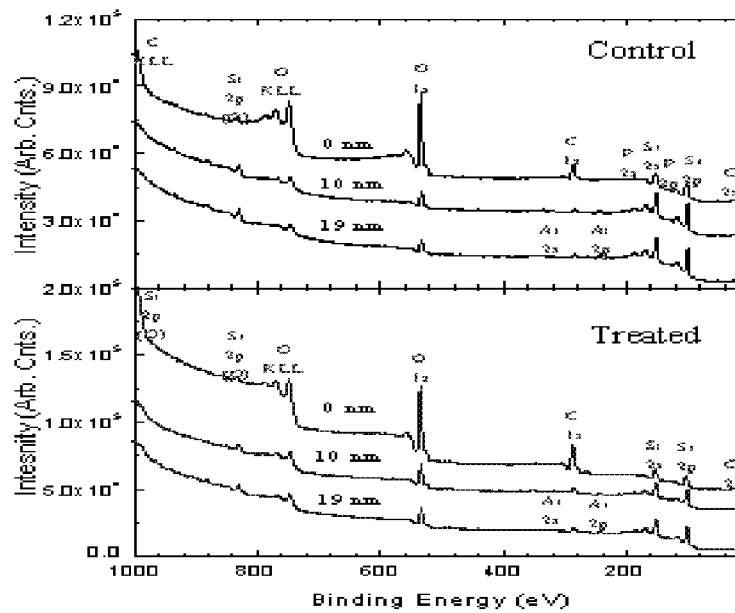
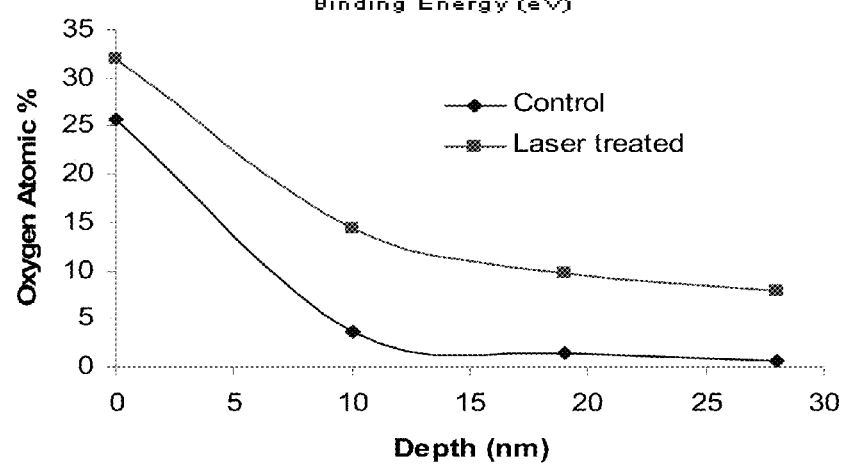
FIG. 10C

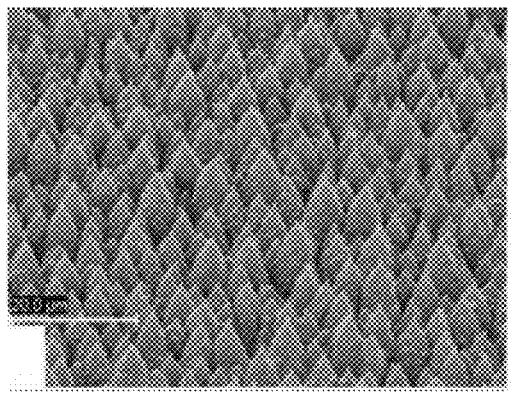
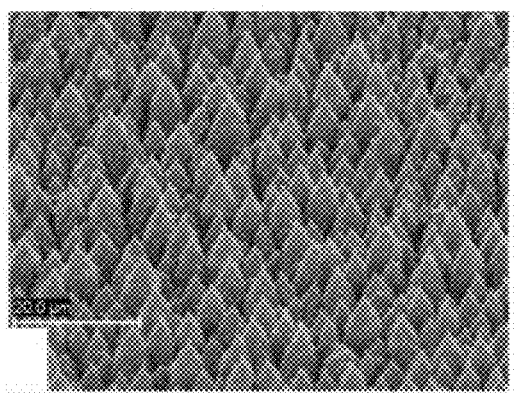
FIG. 14A          FIG. 14B
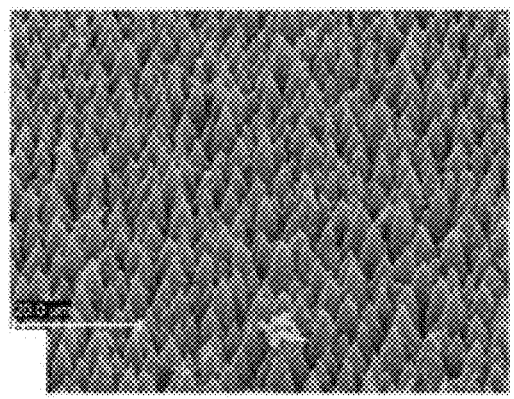
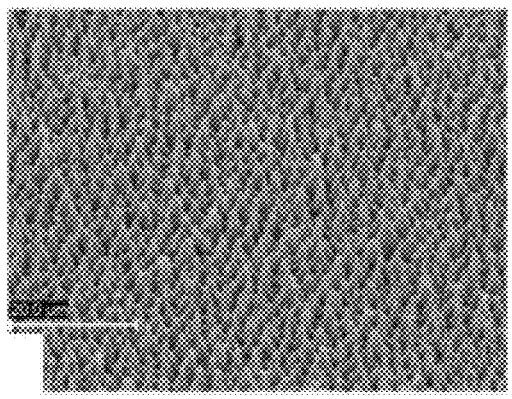
FIG. 14C          FIG. 14D

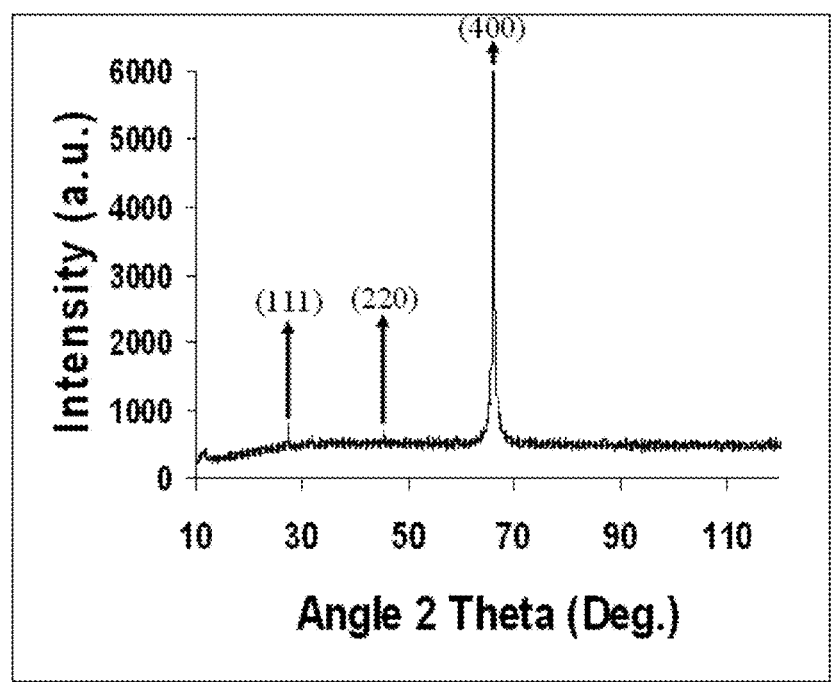
FIG. 15
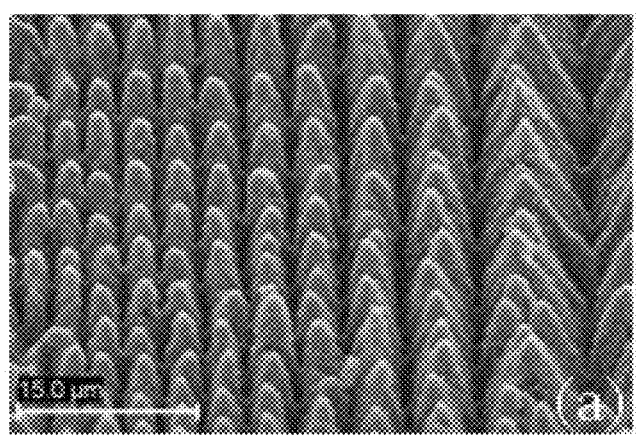
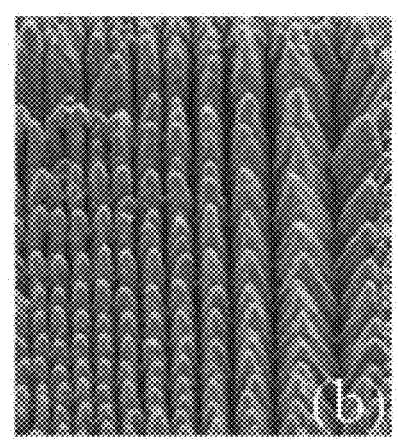
FIG. 19A  FIG. 19B

FIG. 36A Ti Control (θ = 93°)
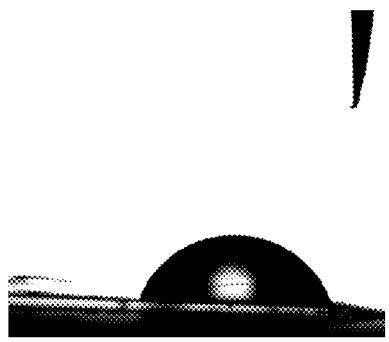
FIG. 36D SS Control (θ = 72.5°)
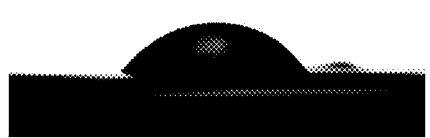
FIG. 36B Ti Control Autoclaved
(θ = 60.8°)
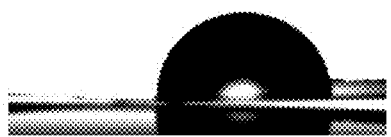
FIG. 36E SS Control Autoclaved
(θ = 86.9°)
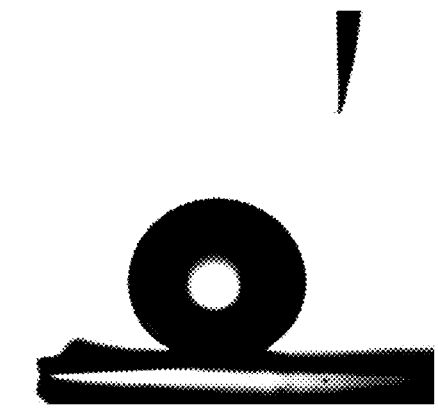
FIG. 36C Ti Textured & Autoclaved
(θ = 152°)
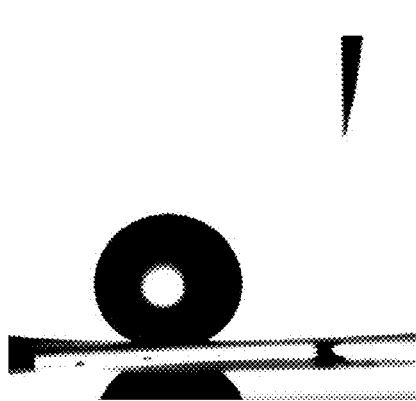
FIG. 36F SS Textured & Autoclaved
(θ = 152.6°)

| Element | Scanned over the Cross-Section Shown in the Rectangular Area | | Point Scan at the Central Region of the Cross-Section (R1) | | Point Scan at the Edge of the Cross-Section (R2) | |
|---|---|---|---|---|---|---|
| | Weight% | Atomic% | Weight% | Atomic% | Weight% | Atomic% |
| C | 13.2 | 25.5 | — | — | 16.2 | 30.9 |
| O | 3.6 | 5.3 | — | — | 1.2 | 1.7 |
| Si | 83.2 | 69.2 | 100.0 | 100.0 | 82.6 | 67.4 |

FIG. 40 Atomic Percentages for O, C, and Si for the Rectangular Area Scan and the Point Scans

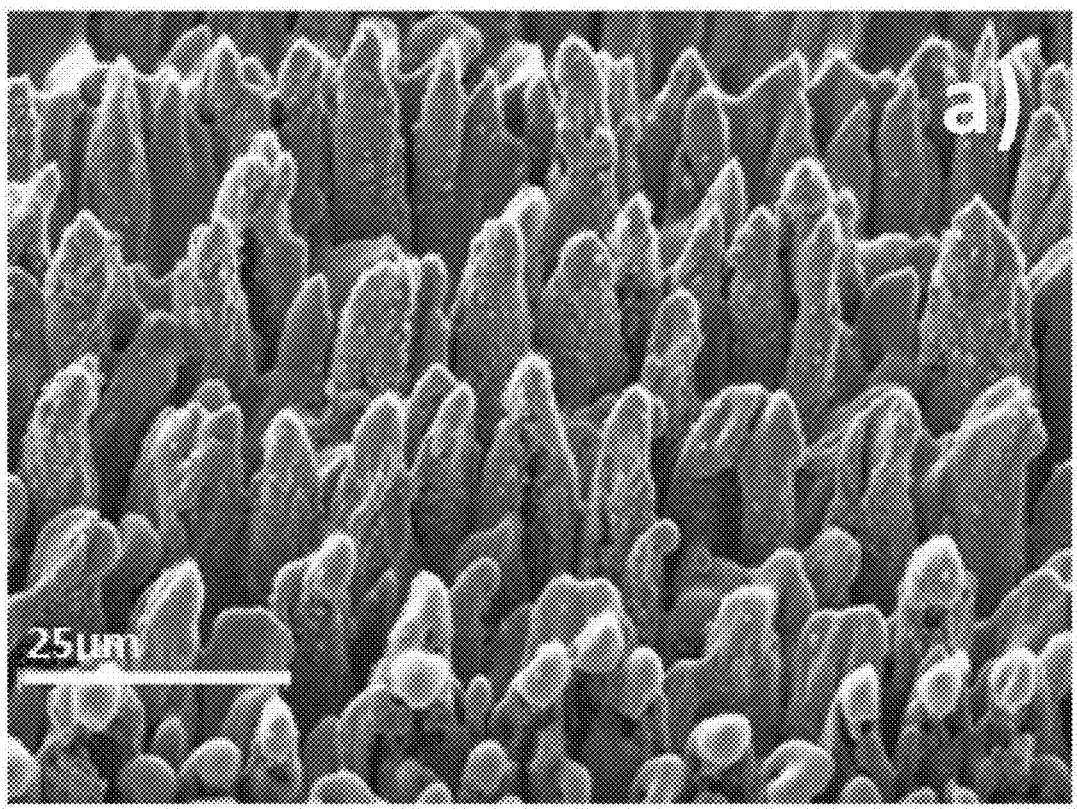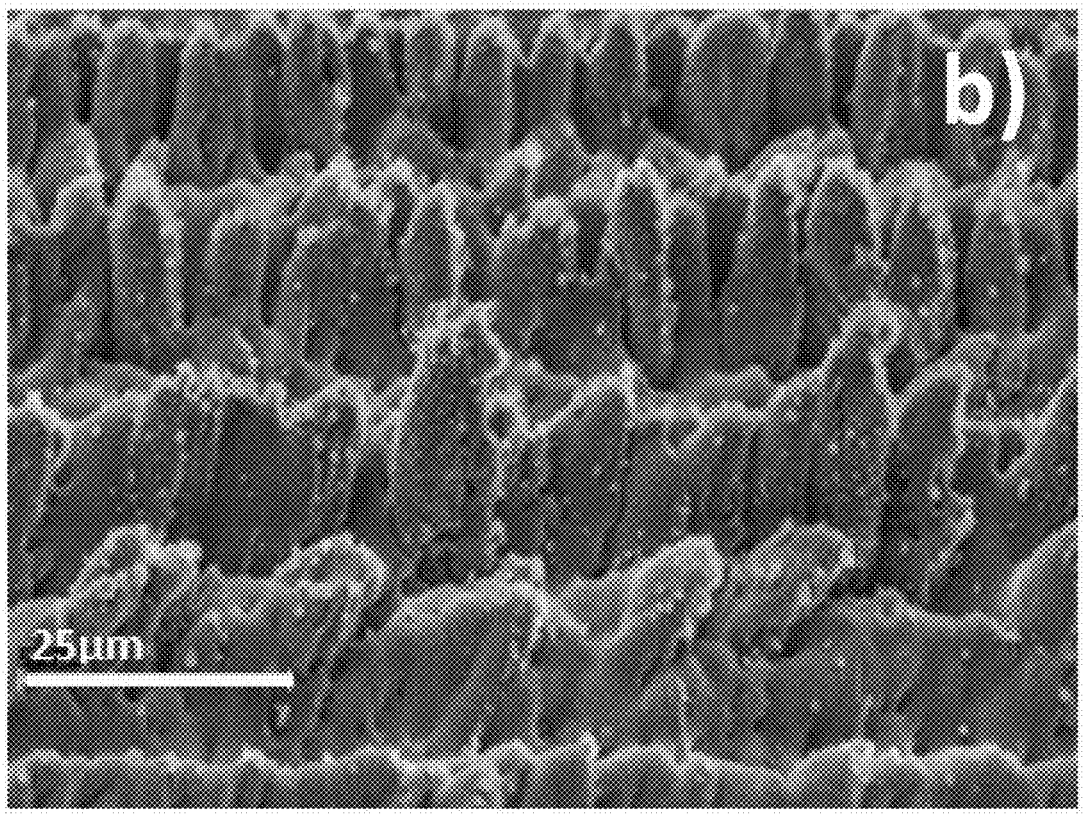
FIG. 43

SYSTEMS AND METHODS OF LASER TEXTURING OF MATERIAL SURFACES AND THEIR APPLICATIONS

CROSS-REFERENCE TO RELATED APPLICATIONS

The present application claims priority under 35 U.S.C. §119(e) from U.S. Provisional Application Ser. No. 61/539,785, filed Sep. 27, 2011, entitled "Microtexturing of Silicon Using N2-laser and Formation Mechanism." The full disclosure of this application is hereby incorporated by reference herein in its entirety.

The present application claims priority under 35 U.S.C. §120 as a continuation-in-part application U.S. application Ser. No. 12/530,313, filed on Feb. 23, 2010, which is a national stage filing of International Application No. PCT/US2008/056033, filed Mar. 6, 2008, which claims benefit of priority under U.S.C. §119 (e) from U.S. Provisional Patent Application No. 60/905,808, filed on Mar. 9, 2007, entitled "Formation of Nano-Textured Conical Microstructures in Titanium, Fabrication of Superhydrophobic Surfaces and Fabrication of Nanopores in Silicon by Femtosecond Laser Irradiation." The full disclosures of these applications are incorporated herein by reference in their entirety.

The present application claims priority under 35 U.S.C. §120 as a continuation-in-part application U.S. application Ser. No. 12/158,553, filed on Jun. 20, 2008, which is a national stage filing of International Application Serial No. PCT/US2006/049065, filed Dec. 21, 2006, entitled, "Systems And Methods of Laser Texturing and Crystallization of Material Surfaces," which claims benefit of priority from U.S. Provisional Patent Application No. 60/752,545, filed on Dec. 21, 2005; U.S. Provisional Patent Application No. 60/843,874, filed on Sep. 12, 2006; and U.S. Provisional Patent Application No. 60/860,735, filed on Nov. 22, 2006. The full disclosures of these applications are incorporated herein by reference.

STATEMENT OF GOVERNMENT INTEREST

The present invention was developed with United States Government Support under NASA Langley Professor Grant No. 3771-005-A. The government has certain rights in the invention.

FIELD OF THE INVENTION

Apparatuses and methods consistent with the present invention relate to laser modification of surfaces, in order to alter their thermal, structural, mechanical, tribological, optical, electrical and electronic properties.

BACKGROUND OF THE INVENTION

Laser processing provides a unique method of modifying materials by depositing large amounts of energy onto the surface of a material in an extremely controlled manner. Laser processing enables the precisely localized treatment of a material. Laser processing is particularly useful after thin-film deposition of amorphous materials, which usually involves low temperature processing, and allows for the use of flexible and low melting temperature substrates for large area device fabrication. However, these devices lack better performance, usually due to poor electrical, optical, and/or structural properties. Laser processing of these devices with ultra-short laser pulses has been found to improve the properties of the devices, because the high peak intensities of the laser pulses rapidly texture the surface, and a subsequent quenching process induces crystallization in the material. The texturing of the surface leads to more light absorption in the material, and the subsequent crystallization improves the electronic properties of the material.

For example, thin film amorphous silicon (a-Si) based devices are inexpensive compared to their crystalline counterparts because of low temperature processing, which is suitable for deposition on large substrates, such as glass, plastic, and steel foils. However, solar cell devices fabricated using a-Si thin-films lack efficiency, have a high reflectivity across the electromagnetic spectrum, possess a larger band gap (~1.7 eV), and have limited carrier mobility. In order to improve the efficiency and sensitivity of a-Si based devices, post-deposition laser processing is usually recommended. This includes texturing and subsequent crystallization of the surface. Pulsed laser crystallization of thin a-Si films on various substrates has potential applications in the fabrication of thin film transistors for active matrix liquid crystal displays and efficient solar cells. Typically, nanosecond or microsecond lasers are utilized to crystallize such films through a rapid melting and solidification process. Methods of using a laser to crystallize a material surface are also disclosed by U.S. Pat. No. 6,169,014 to McCulloch, U.S. Pat. No. 6,451,631 to Grigoropoluos et al., U.S. Pat. No. 6,489,188 to Jung, and U.S. Pat. No. 6,635,932 to Grigoropoluos et al., of which are hereby incorporated by reference herein in their entirety.

Methods of using an ultrafast laser to texture the surface of crystalline bulk silicon are disclosed in U.S. patent application Ser. No. 10/155,429 to Mazur, of which is hereby incorporated by reference herein in their entirety. Mazur discloses a method of texturing the surface of a silicon substrate by irradiating the surface with ultra-short laser pulses in the presence of a background gas, such as $SF_6$. After texturing, the silicon surface in Mazur contains cone-like microstructures that are up to 50 μm high, and have widths of about 0.8 μm near the tip and up to 10 μm near the base. Also, Mills and Kolasinski disclose nanospikes formed atop silicon pillars when the sample is exposed to $SF_6$ gas diluted with helium (17 Nanotechnology 2471, 2006). Further, Vorobyev and Guo disclose the formation of nanoprotrusions with spherical tips on copper, gold, and platinum surfaces by using a femtosecond laser ablation technique (14 Optics Express 2164, 2006).

While the prior art discussed above provides important advantages, it suffers from a number of drawbacks. The prior art fails to disclose a method of producing periodic arrays of pillar structures on a surface of a material by texturing the surface. Further, the prior art does not teach a method of texturing and crystallizing a surface in one step. Also, the prior art does not teach a method of forming pillar structures on metal surfaces. In addition, the prior art fails to disclose a method of utilizing laser texturing and crystallization in many novel applications.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for texturing a surface of a semiconductor material, including providing an etching gas in an area around the surface of the material, irradiating a portion of the surface with short laser pulses, and translating at least one of the surface and a laser beam to allow the short laser pulses to impact another portion of the surface. This method produces a periodic array of pillar structures on the surface, resulting in changes in properties of the surface.

According to an aspect of the present invention, the method additionally produces nanospikes atop the pillar structures.

Also, the present invention provides a method for texturing a surface of a semiconductor material, including providing an etching gas in an area around the surface of the material; irradiating a portion of the surface with short laser pulses while simultaneously crystallizing the portion of the surface; and translating at least one of the surface and a laser beam to allow the short laser pulses to impact another portion of the surface. This method produces pillar structures on the surface, resulting in changes in properties of the surface.

In addition, the present invention provides a method for texturing a metallic surface, including irradiating a portion of the metallic surface with short laser pulses, and translating at least one of or both the surface and a laser beam to allow the short laser pulses to impact another portion of the surface. This method produces pillar structures on the surface, resulting in changes in properties of the surface.

An aspect of an embodiment of the present invention provides a method for texturing a surface of a material. The method comprising: providing a gaseous or vacuum environment in an area around the surface of the material; irradiating a portion of the surface with short laser pulses; and moving at least one of the surface or a laser beam relative to each other to allow the short laser pulses to irradiate the surface. And whereby the method produces a periodic array of pillars or a non-periodic array of pillars on the surface, resulting in changes in properties of the surface.

An aspect of an embodiment of the present invention provides a method for texturing a surface of a semiconductor material. The method comprising: providing a gaseous or vacuum environment in an area around the surface of the material; irradiating a portion of the surface with short laser pulses while simultaneously crystallizing the portion of the surface; and moving at least one of the surface and a laser beam relative to each other to allow the short laser pulses to irradiate another portion of the surface while simultaneously crystallizing the other portion of the surface. And whereby the method produces pillars on the surface, resulting in changes in properties of the surface.

An aspect of an embodiment of the present invention provides a method for texturing a metallic surface. The method comprising: irradiating a portion of the metallic surface with short laser pulses; and moving at least one of the surface and a laser beam relative to each other to allow the short laser pulses to irradiate another portion of the surface. And whereby the method produces pillars on the surface, resulting in changes in properties of the surface.

An aspect of an embodiment of the present invention provides a semiconductor surface. The semiconductor comprises a portion on which pillars are formed with nanospikes atop the pillars by irradiating the surface with short laser pulses in a vacuum or gaseous environment surrounding the surface.

An aspect of an embodiment of the present invention provides a metallic surface. The metallic surface comprises a portion on which pillars are formed by irradiating the surface with short laser pulses.

An aspect of an embodiment of the present invention provides a system for texturing a surface of a material. The system comprising: a chamber in an area around the surface of the material to provide a gaseous or vacuum environment; an energy source providing a power supply for a radiation source, the radiation source for irradiating at least a portion of the surface; a base for retaining the surface. The base or radiation source adapted to move relative to one another for irradiation wherein a periodic array of pillars or a non-periodic array of pillars on the surface, resulting in changes in properties of the surface.

An aspect of an embodiment of the present invention provides a system for texturing a surface of a material. The system comprising: a chamber in an area around the surface of the material to provide a gaseous or vacuum environment; an energy source providing a power supply for a radiation source, the radiation source for irradiating at least a portion of the surface; and a base for retaining the surface. The base or radiation source adapted to move relative to one another for irradiation wherein the portion of the surface is crystallized during irradiation.

An aspect of an embodiment of the present invention provides a system for texturing a surface of a material. The system comprising: a chamber in an area around the surface of the material to provide a gaseous or vacuum environment; an energy source providing a power supply for a radiation source, the radiation source for irradiating at least a portion of the surface; and a base for retaining the surface. The base or radiation source adapted to move relative to one another for irradiation wherein pillars are produces on the portion of the surface, resulting in changes in properties of the surface.

An aspect of an embodiment of the present invention provides a surface. The surface comprises a portion on which pillars are formed with nanospikes atop the pillars by irradiating the surface with short laser pulses in a vacuum or gaseous environment surrounding the surface. And whereby the surface comprises at least one of metal, metal alloys, ceramic, glasses and or polymer, or any combination thereof.

An aspect of an embodiment of the present invention provides a surface. The surface comprising a portion on which pillars are formed by irradiating the surface with short laser pulses. And whereby the surface comprises at least one of metal alloys, semiconductor, ceramic, glasses and or polymer, or any combination thereof.

An aspect of an embodiment of the present invention provides a method for texturing a surface of a material. The method comprising: providing a gaseous or vacuum environment in an area around the surface of the material; irradiating a portion of the surface with energy pulses; and moving at least one of the surface or an energy beam relative to each other to allow the energy pulses to irradiate the surface. And whereby the method produces a periodic array of pillars or a non-periodic array of pillars on the surface, resulting in changes in properties of the surface.

An aspect of an embodiment of the present invention provides a method for texturing a surface of a semiconductor material. The method comprising: providing a gaseous or vacuum environment in an area around the surface of the material; irradiating a portion of the surface with energy pulses while simultaneously crystallizing the portion of the surface; and moving at least one of the surface and an energy beam relative to each other to allow the short energy pulses to irradiate another portion of the surface while simultaneously crystallizing the other portion of the surface. And whereby the method produces pillars on the surface, resulting in changes in properties of the surface.

An aspect of an embodiment of the present invention provides a method for texturing a metallic surface. The method comprising: irradiating a portion of the metallic surface with energy pulses; and moving at least one of the surface and an energy beam relative to each other to allow the energy pulses to irradiate another portion of the surface. And whereby the method produces pillars on the surface, resulting in changes in properties of the surface.

An aspect of an embodiment of the present invention provides a surface. The surface comprises a portion on which pillars are formed with nanospikes atop the pillars by irradiating the surface with energy pulses in a vacuum or gaseous environment surrounding the surface. And whereby the surface comprises at least one of metal, metal alloys, ceramic, semiconductor glasses and or polymer, or any combination thereof.

An aspect of an embodiment of the present invention provides a surface. The surface comprises a portion on which pillars are formed by irradiating the surface with energy pulses. And whereby the surface comprises at least one of metal, metal alloys, semiconductor, ceramic, glasses and or polymer, or any combination thereof.

An aspect of an embodiment of the present invention provides, but not limited thereto, a surface of a material that is textured and by exposing the surface to pulses from an ultrafast laser (or other desired energy source). The laser treatment causes pillars to form on the treated surface. These pillars provide for greater light absorption. Texturing and crystallization can be carried out as a single step process. The crystallization of the material provides for higher electric conductivity and changes in optical and electronic properties of the material. The method may be performed in vacuum or a gaseous environment. The gaseous environment may aid in texturing and/or modifying physical and chemical properties of the surfaces. This method may be used on various material surfaces, such as but not limited thereto, semiconductors, metals and their alloys, ceramics, polymers, glasses, composites, as well as crystalline, nanocrystalline, polycrystalline, microcrystalline, and amorphous phases. The related method may be used to provide a variety material surfaces or templates for a variety of systems and devices.

An aspect of an embodiment of the present invention provides, but not limited thereto, a method for texturing a surface of a material. The method may comprise providing a gaseous or vacuum environment in an area around the surface of the material; irradiating a portion of the surface with laser pulses, wherein the laser pulses have: a laser pulse energy density of about 0.05 J/cm$^2$ to about 5 J/cm$^2$, a wavelength of about 200 nm to about 2000 nm, a pulse width greater than 0 ns and less than about 30 ns; and wherein the method produces a periodic array of pillars or a non-periodic array of pillars on the surface, resulting in changes in properties of the surface.

An aspect of an embodiment of the present invention provides, but not limited thereto, a system for texturing a material. The system may comprise: a gaseous or vacuum environment encompassing the material; a base for retaining the surface; and an energy source configured to provide a radiation source, said radiation source configured to irradiate a portion of the surface with laser pulses. The laser pulses may be configured to provide: a laser pulse energy density of about 0.05 J/cm$^2$ to about 5 J/cm$^2$; a wavelength of about 200 nm to about 2000 nm; and a pulse width greater than 0 ns and less than about 30 ns; resulting in the formation of a periodic array of pillars or a non-periodic array of pillars on the surface.

It should be appreciated that any of the aforementioned or following exemplary embodiments of the present invention method and system (and resultant structure/texture) may be practiced by controlling laser (or applicable energy source) texturing process and/or crystallizing process by varying the spatial profile of the laser pulse. The spatial profile could be Gaussian, flat profile, multimode, etc. or other profile as desired or required.

It should be appreciated that any of the aforementioned or following exemplary embodiments of the present invention method and system (and resultant structure/texture) may be practiced by controlling surface texture and/or crystallization by preheating the sample and providing additional energy by the laser beam (or applicable energy source).

These and other advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of exemplary embodiments, when read together with the accompanying drawings, in which:

FIG. 3 is a photograph of a hydrogenated amorphous silicon (a-Si:H) surface, with FIG. 3(a) illustrating a non-modified portion, and FIG. 3(b) illustrating a modified portion, according to an exemplary embodiment of the present invention;

FIG. 4 illustrates scanning electron microscopy (SEM) images of an a-Si:H surface, with FIG. 4(a) illustrating a non-modified portion, and FIG. 4(b) illustrating a modified portion, according to an exemplary embodiment of the present invention;

FIG. 10 illustrates results of X-ray photoelectron spectroscopy (XPS) measurements of a-Si:H surfaces, with FIG. 10(a) illustrating the XPS measurement of untreated control surfaces, FIG. 10(b) illustrating the XPS measurement of treated surfaces, and FIG. 10(c) illustrating depth profiles of oxygen concentration for untreated control and treated surfaces, according to an exemplary embodiment of the present invention;

FIG. 14 shows a comparison of SEM images viewed at 45° from the surface normal of Ge (100) surfaces irradiated at different laser power levels, with FIG. 14(a) showing a surface irradiated with a laser power of 0.66 J/cm$^2$, FIG. 14(b) showing a surface irradiated with a laser power of 0.56 J/cm$^2$, FIG. 14(c) showing a surface irradiated with a laser power of 0.3 J/cm$^2$, and FIG. 14(d) showing a surface irradiated with a laser power of 0.2 J/cm$^2$, according to embodiments of the present invention;

FIG. 15 is graphical representation of an X-ray diffraction pattern of a laser treated germanium surface having nanospikes, according to an exemplary embodiment of the present invention;

FIG. 19 illustrates SEM images periodic structures formed on a silicon surface, with FIG. 19(a) illustrating a one-dimensional periodic structure, and FIG. 19(b) illustrating a two-dimensional periodic structure, according to embodiments of the present invention;

FIG. 36 shows a series of contact angle measurements for titanium and stainless steel surfaces, in which a water droplet is placed on the surface of the material. FIG. 36(a) is a control sample of titanium, and FIG. 36(b) is a control autoclaved sample of titanium. FIG. 36(c) is a textured and autoclaved sample of titanium. These figures indicate that the contact angle for the textured and autoclaved sample (152°) is significantly higher than the contact angle for the control samples (93° and 60.8°). Similarly, FIG. 36(d) is a control sample of stainless steel, FIG. 36(e) is a control autoclaved sample of stainless steel, and FIG. 36(f) is a textured and autoclaved sample of stainless steel. These figures show that the contact angle for the textured and autoclaved sample (152.6°) is significantly higher than the contact angle for the control samples (72.5° and 86.9°). Therefore, the textured and autoclaved samples of titanium and stainless steel demonstrate superhydrophobicity. Similar results are expected for silicon samples

FIG. 38(b) shows a higher magnification image of FIG. 38(a), FIG. 38(c) laser treated sample in 1000 mbar SF6 at a laser fluence of 2 J/cm$^2$ and an average number of laser shots of 100, FIG. 38(d) shows a higher magnification image of FIG. 38(c), FIG. 38(e) Cross-sectional image of FIG. 38(a).

FIG. 39(a) shows a SEM image of the cross-section of conelike microstructure. The EDX mapped region is shown as a rectangular FIG. 39(b) silicon map, FIG. 39(c) oxygen map, and FIG. 39(d) carbon map FIG. 39(e) spectrum acquired over the rectangular region shown in FIG. 39(a).

FIG. 40 shows the atomic percentages for Oxygen, Carbon, and Silicon for the rectangular area scan and the point scans from FIG. 39.

FIG. 43 Shows SEM images of laser treated samples exposed to an average of 100 laser shots at fluence of ~2 J/cm$^2$ prepared in FIG. 43(a) 1000 mbar N2 and FIG. 43(b) in air.

FIG. 44(a) 1 shot, FIG. 44(b) 10 shots, FIG. 44(c) 50 shots, FIG. (d) 60 shots, FIG. (e) 70 shots, FIG. (f) 80 shots, and FIG. (g) 90 shots and FIG. (h) shows a higher magnification of image FIG. (g).

DETAILED DESCRIPTION OF EXEMPLARY EMBODIMENTS OF THE INVENTION

Figure 1:
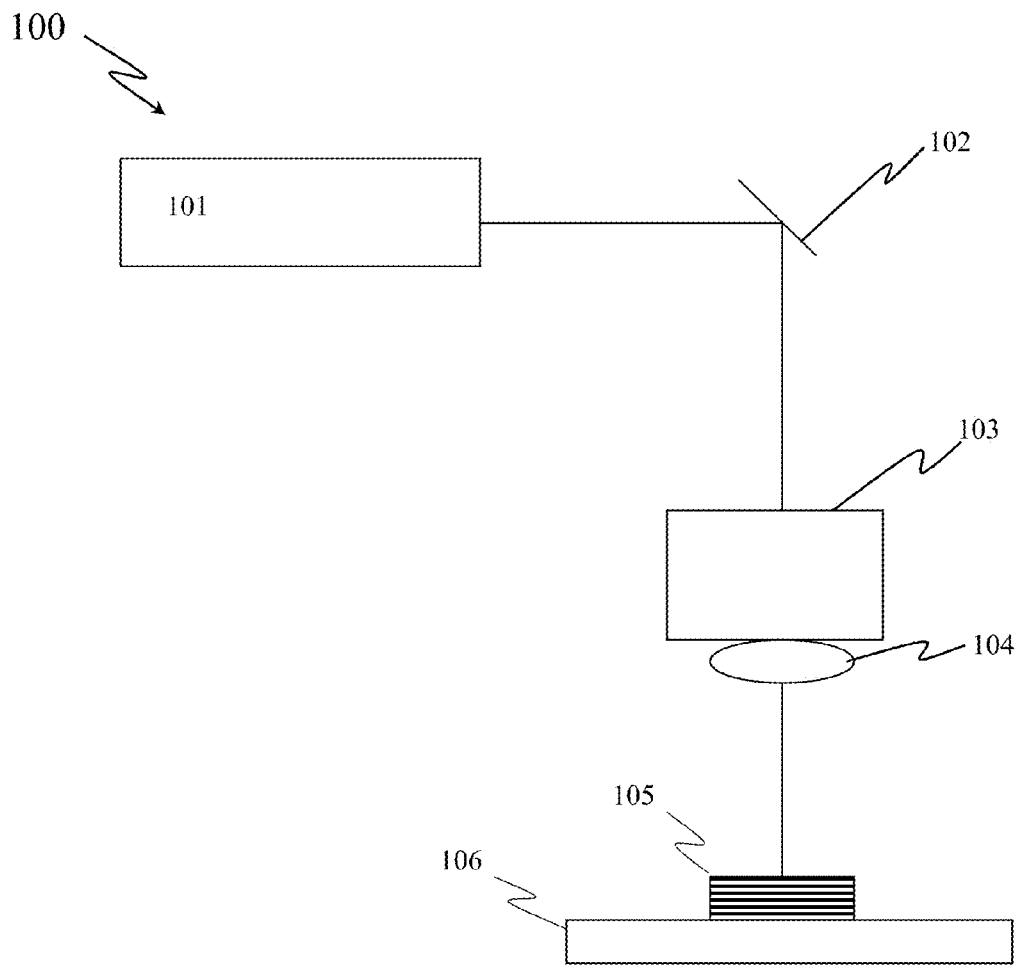
FIG. 1 illustrates the components in a surface modification system, according to an exemplary embodiment of the present invention.

In describing an exemplary embodiment of the present invention illustrated in the drawings, certain specific terminology will be used for the sake of clarity. However, the invention is not intended to be limited to that specific terminology, and it is to be understood that the terminology includes all technical equivalents that operate in a similar manner to accomplish the same or a similar result.

Apparatuses and methods consistent with the present invention texture and crystallize the surface of a material in one step by exposing the surface of the material to an ultrafast laser. In order to expose an area of the surface that is larger than the beam spot size, the material may be translated relative to the laser. The texturing causes pillars to form on the surface of the material, increasing the light absorption of the treated material. Pillars are height variations over a surface, including valleys and hills. Pillars can be formed in a variety of shapes, including conical, arrowhead, pyramid, and spheroid structures. The top of the pillar has a narrower diameter than the bottom of the pillar. Additionally, crystallization increases the electrical conductivity of the treated material. Texturing and crystallizing the surface of the material in a single step allows for faster manufacturing and lower costs than performing these steps separately.

The texturing and crystallization may be performed under atmospheric conditions, or while the material to be treated is in a non-atmospheric gaseous environment. In such a gaseous environment, additional surface texturing will occur through chemical assisted processing. Sulfur hexafluoride ($SF_6$), hydrogen chloride (HCl), Tetrafluoromethane ($CF_4$), Trifluoromethane ($CHF_3$) gases have been examined, and have been shown to be suitable gases in which to perform the surface texturing. Hydrogen chloride is advantageous over sulfur hexafluoride, because when sulphur hexafluoride is used, impurities in the material may result. In contrast, when hydrogen chloride is used, no impurities are created, and the material remains in its pure form. It is to be understood that other gases may also be used. Surface texturing and crystallization have also been achieved in a helium gas environment and in a vacuum.

The materials that have undergone surface texturing and crystallization are also within the scope of the present invention. For amorphous materials, the surface will become textured and the material will become crystallized. Hydrogenated amorphous silicon has been examined using the method of the invention, and has been shown to be well-suited to benefit from this method. Thin-film, poly-crystalline, and single crystal materials may also be used. These materials will benefit from the surface texturing methods of the present invention. Silicon and germanium have been studied, and have been shown to be suitable materials to undergo the laser treatment method in the presence of sodium hexafluoride gas and hydrogen chloride gas. Metals, dielectrics, and polymers have also been shown to be suited to be textured using the method of the present invention. However, it is to be appreciated that other materials are suited to undergo the laser treatment methods of the present invention.

Additionally, the use of materials that have undergone the treatment methods of the present invention is within the scope of the present invention. The present invention has many useful applications. The methods described herein will provide for a material with a higher light absorption capacity and a higher electrical conductivity than an untreated material. These two properties are desirable in photovoltaic applications. Enhanced light trapping capabilities are also useful in photo-sensing applications. Photodetectors utilizing the present invention will be more sensitive to light, and will be able to detect a broader spectrum of electromagnetic waves.

The surface texturing greatly enhances the heat transfer capability of a given material. A material that has been textured can dissipate more heat through convection because of the increased surface area of the material that is exposed to a fluid flowing over the material. Additionally, the texturing will ensure a turbulent flow of the fluid, which is advantageous in convection heat transfer. For radiation heat transfer, the increased surface area will allow for more heat dissipation.

In an exemplary embodiment of the present invention, the surface alteration process was performed on hydrogenated amorphous silicon (a-Si:H), in particular a-Si:H thin films. Thin films with thicknesses from 1.5 to 2 μm were deposited on glass substrates, using a low temperature Plasma Enhanced Chemical Vapor Deposition (PECVD) technique. The a-Si:H films were deposited at a rate of around 1 Å/s in a hydrogen diluted silane environment at about 200° C. The samples were then treated using a femtosecond Ti:Sapphire laser system (Spectra-Physics Spitfire). The laser system delivered pulses at a repetition rate of 1 kHz, with a pulse energy that could vary from 0-1.2 mJ, and a wavelength of 800 nm. The wavelength of the laser can also be frequency doubled or halved to achieve wavelengths from 200 to 1600 nm. The temporal profile of the pulses was measured to be 110 fs using a background free, scanning second-order autocorrelator. The sample was placed on a stationary stage, and the laser beam was deflected by a Scanlab galvo-head to scan the sample surface. The beam spot on the sample surface was circular, with a beam diameter of 0.5 mm. The beam scanning speed was around 12.5 cm/sec. Scanning electron micrographs of treated and untreated surfaces of the a-Si:H films were taken using a Cambridge Instruments high resolution electron microscope for a surface texture study. Surface roughness and formation of spikes in the treated films were also examined with an atomic force microscope (Digital Instruments Nanoscope III).

The optical transmission and reflection of a 20 mm×30 mm laser treated area of the sample was measured using a PERKIN-ELMER LAMBDA 9 spectrophotometer. The reflectance and transmittance percentages were then used to obtain the absorption percentage in the material: A=100−R−T. Light from a He—Ne laser source was incident on the treated sample at different angles, and the scattered light was measured by a silicon sensor with an active region of around 4 cm$^2$ to estimate the scattering of light due to texturing. It was observed from the measurements that scattering might contribute to a 5-10% variation in the reflection measured by the spectrophotometer. In addition to the optical properties, X-ray diffraction (XRD) was performed on the untreated and laser treated samples to study the structural modification induced by the laser treatment. The Rigaku Miniflex 2005 X-ray diffractometer with a Cu target (CuK$_\alpha$-line) was used for the XRD measurements. The grain size of the treated films was estimated from the X-ray data. Also, the oxygen incorporation into silicon films during this ultrafast laser treatment was studied using a Physical Electronics Inc. 560 XPS/SAM spectrophotometer with a dual source anode (Mg/Al) radiating 1253.6 eV X-ray photons.

Figure 2:
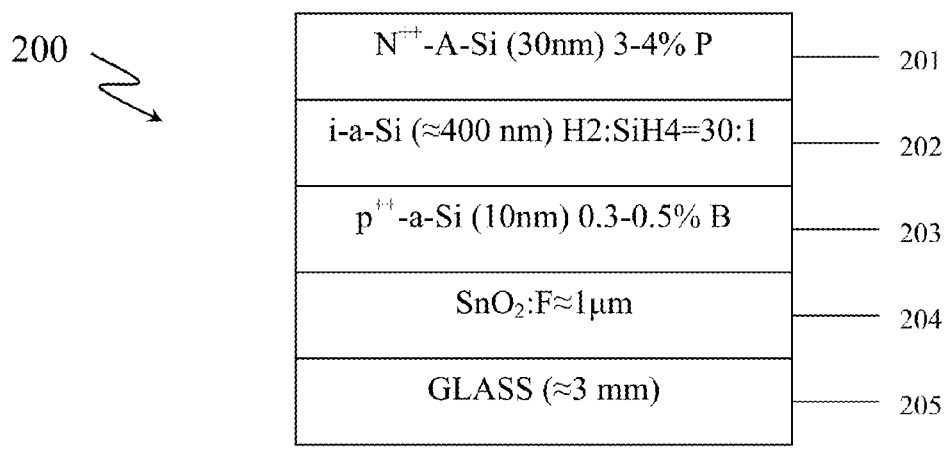
FIG. 2 illustrates an example of a sample material to which surface modification is performed, according to an exemplary embodiment of the present invention.

FIG. 1 shows an exemplary system 100 that can be used to provide surface modifications. The femtosecond laser system 101 provides a laser pulse incident on the a-Si:H sample 105 (for example, but not limited thereto glass substrate), which is supported by an X-Y-Z sample stage 106. The system 100 uses a mirror 102 (other redirecting, channeling or optical means) to direct the laser pulse to a galvo-head unit 103, which scans the sample surface. A focusing lens 104 is used to focus the pulses on the surface. An exemplary a-Si:H sample 200 is illustrated in FIG. 2, with a glass slide 205, an intervening layer 204, and amorphous silicon layers 201-203. The laser system may a wide variety of energy sources beside laser, such as at least one of: ion, plasma, electron or microwave or any combination thereof. It should be appreciated that a variety of energy source systems may be utilized besides a laser system, such as but not limited thereto the following: ion beam, plasma beam, electron beam or microwave beam or any combination thereof, or other suitable and available energy sources.

FIG. 3 illustrates that the change in the surface of the a-Si:H film deposited on the glass substrate can be observed optically. FIG. 3(a) shows a photograph of the untreated surface, and FIG. 3(b) shows a photograph of the treated surface. After treatment, the a-Si:H films turned completely dark, in contrast with their original shiny reddish gray color. FIG. 4(a) shows an SEM image of the untreated surface, and FIG. 4(b) shows an SEM image of the treated surface. FIG. 4(b) shows that microstructures and small spikes have been spontaneously formed upon laser treatment.

Figure 5A:
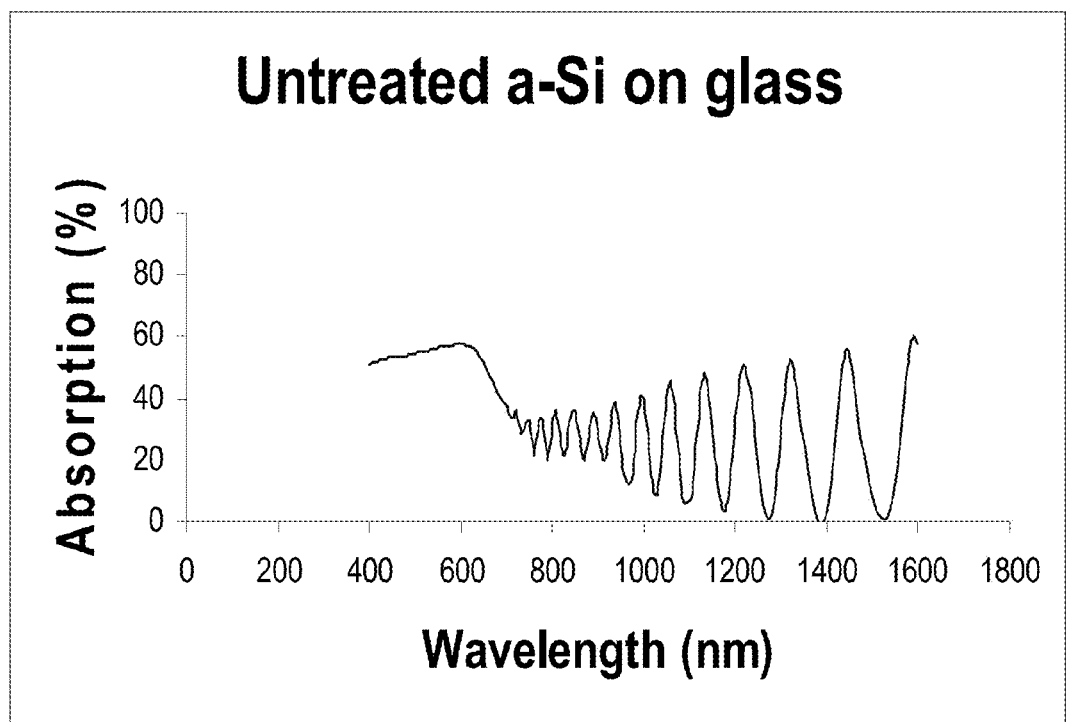
FIG. 5 illustrates graphical results of absorption versus wavelength for an a-Si:H surface, with FIG. 5(a) illustrating the absorption for an untreated sample, and FIG. 5(b) illustrating the absorption for a treated sample, according to an exemplary embodiment of the present invention.
Figure 5B:
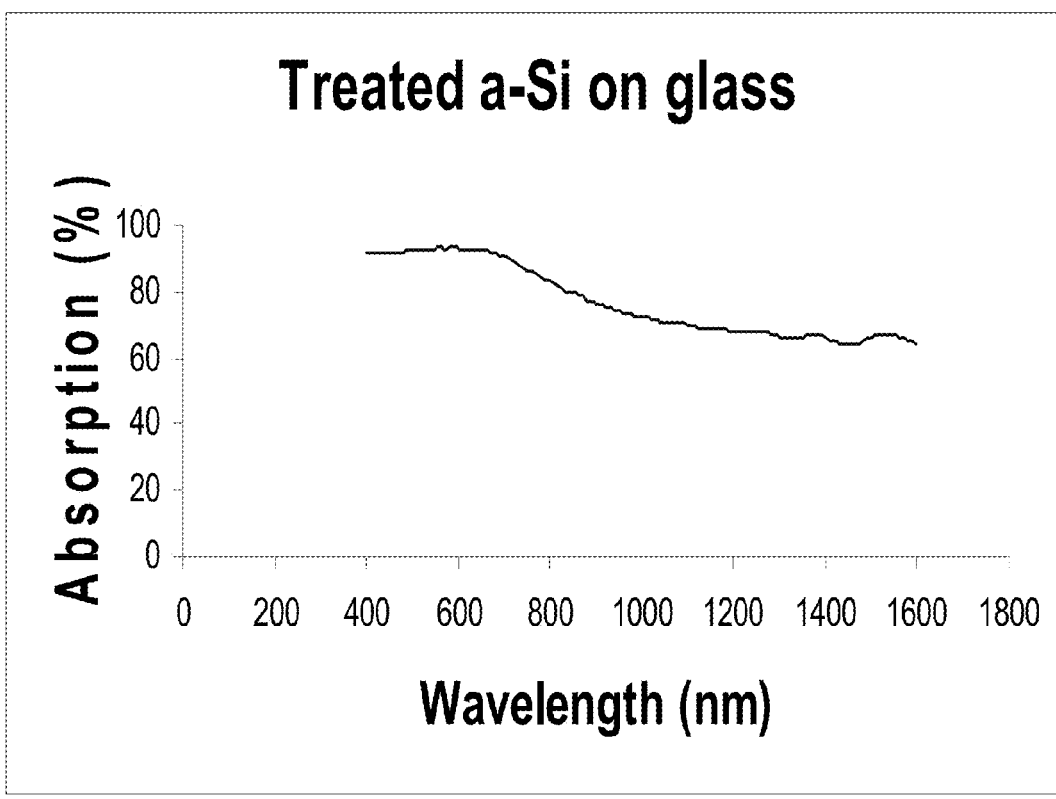

In order to study the optical characteristics, the reflectance and transmittance of a treated 20×30 mm$^2$ area were measured using a spectrophotometer. FIG. 5 shows the absorptance of treated and untreated a-Si:H films. FIG. 5(b) that there is a significant enhancement in the optical absorption below a-Si:H band gap (1.7 eV) for treated films, when compared to the untreated films in FIG. 5(a). Since the experiments were carried out under atmospheric conditions, XPS spectra of a treated sample (FIG. 10(b)) and an untreated control sample (FIG. 10(a)) were also obtained. SiO$_x$ formation was observed in the treated sample. The oxygen concentration was estimated by taking XPS measurements at different depths of the sample. Depth profiles of the oxygen concentration in the treated and untreated control samples are shown in FIG. 10(c). Traces of oxygen were observed up to a depth of around 50 nm in treated samples, compared to a depth of 10 nm in the untreated control sample. The samples appeared to be pitch black after treatment, and it is suggested that the below-band edge absorption might be due to trapping the light, which is caused by multiple reflections from the textured surface. Also, structural defects induced during the micro-structuring process most likely produce bands of defect and impurity states in the bandgap, and further enhance the overall absorption.

Figure 6A:
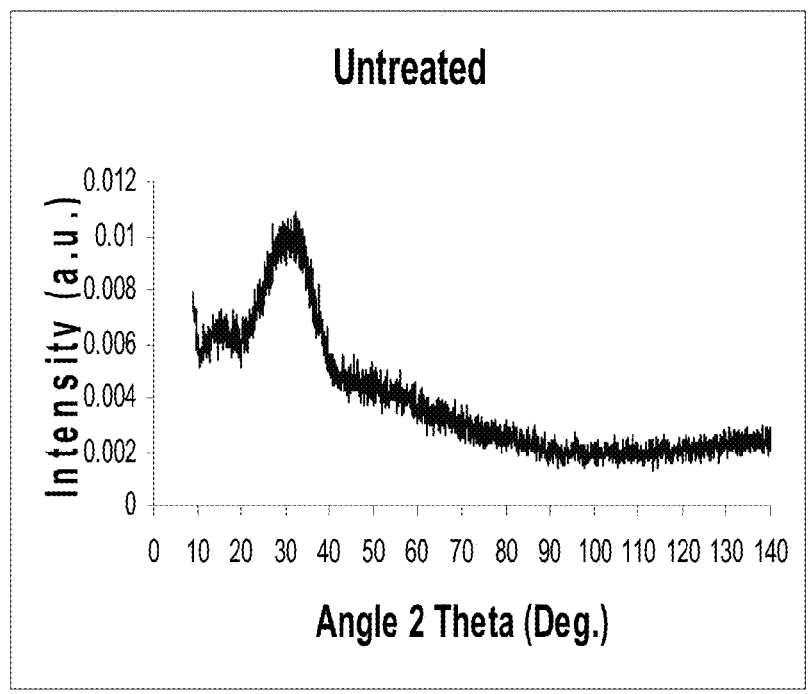
FIG. 6 illustrates graphical results of an X-ray diffraction pattern for an a-Si:H surface, with FIG. 6(a) illustrating the results for an untreated sample, and FIG. 6(b) illustrating the results for a treated sample, according to an exemplary embodiment of the present invention.
Figure 6B:
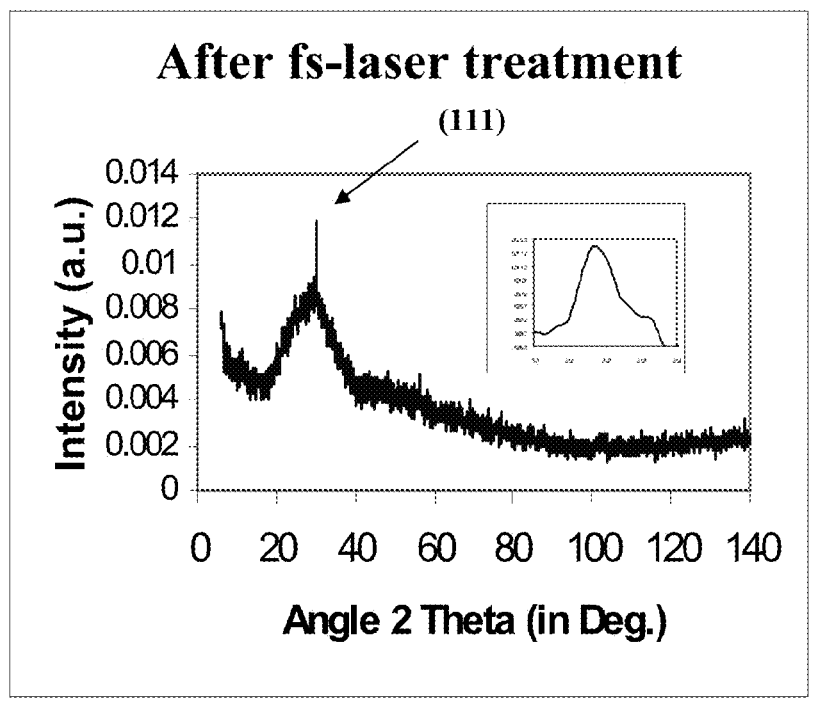

FIG. 6(a) shows the X-ray diffraction pattern for an untreated a-Si:H sample, and FIG. 6(b) shows an X-ray diffraction pattern for a treated a-Si:H sample. Peaks around 2θ=30° and 56° are observed for the treated sample. These peaks are absent in the untreated control sample, indicating a structural change after laser treatment. The X-ray wavelength used for these measurements was the CuK$_\alpha$ line at 1.54 Å. The observed peaks are due to the (111) and (311) orientations of crystalline silicon. Regardless of the fluence conditions, the (111) orientation dominated in the crystallized films, as the (111) plane has least surface energy. Dominant (111) and (311) peak formation is typically observed in nanosecond laser crystallization. The (111) peak was fitted with a Gaussian curve and the full width at half-maximum (FWHM) was determined. The particle size was determined to be around 85 nm using the Scherrer's formula: L=k*λ/Γ cos θ; where λ is the X-ray wavelength for measurement; Γ is the X-ray line width (FWHM) (measured in radians); θ is the Bragg angle of diffracted rays (measured in degrees); and k is a constant equal to 0.9.

Figure 7A:
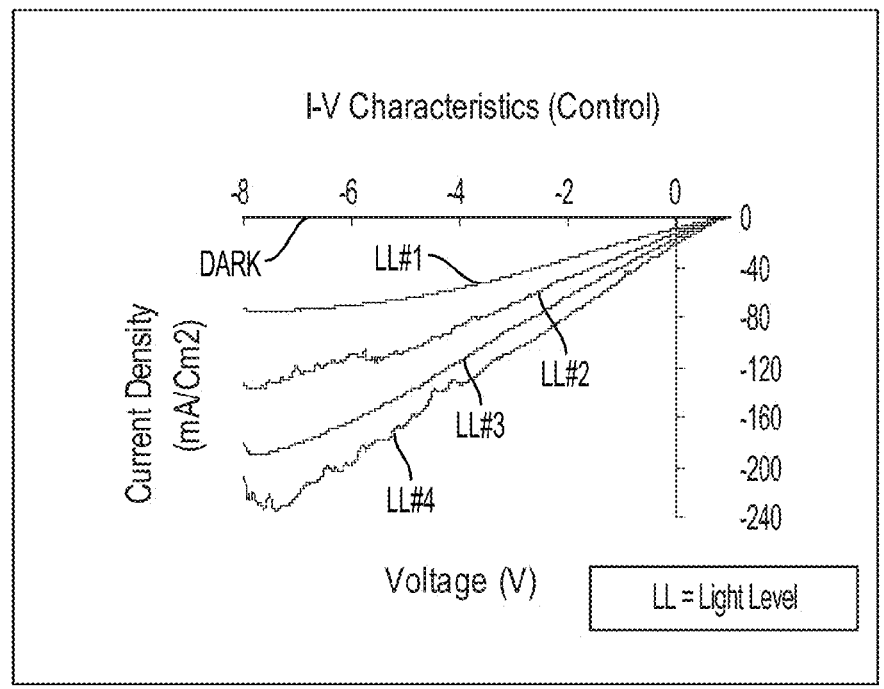
FIG. 7 illustrates graphical results of current versus voltage for an a-Si:H surface with varying light levels, with FIG. 7(a) illustrating the results for an untreated control sample, and FIG. 7(b) illustrating the results for a treated sample, according to an exemplary embodiment of the present invention.
Figure 7B:
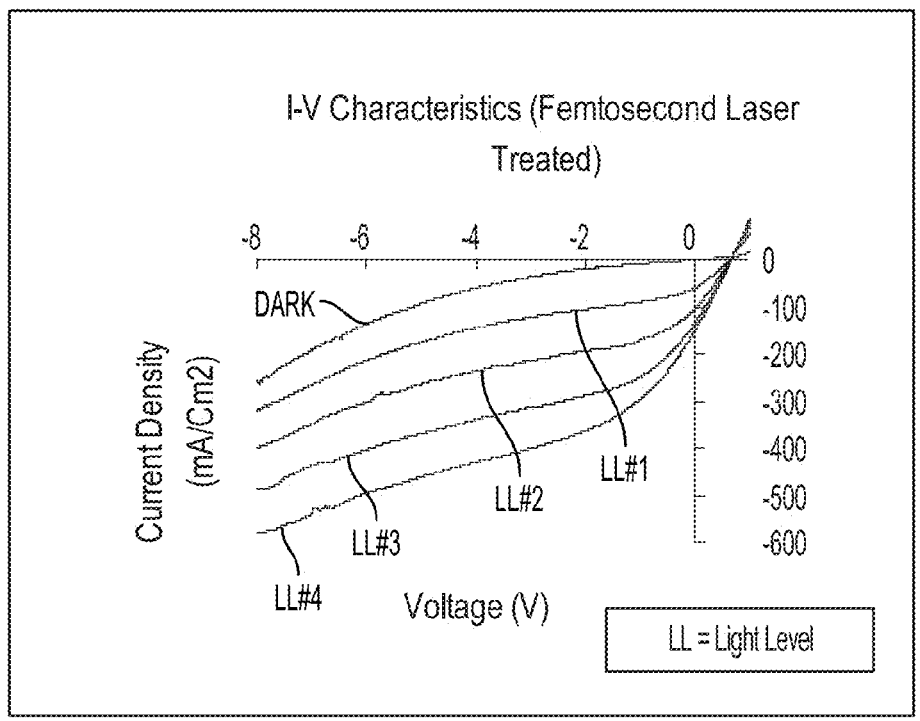
Figure 11:
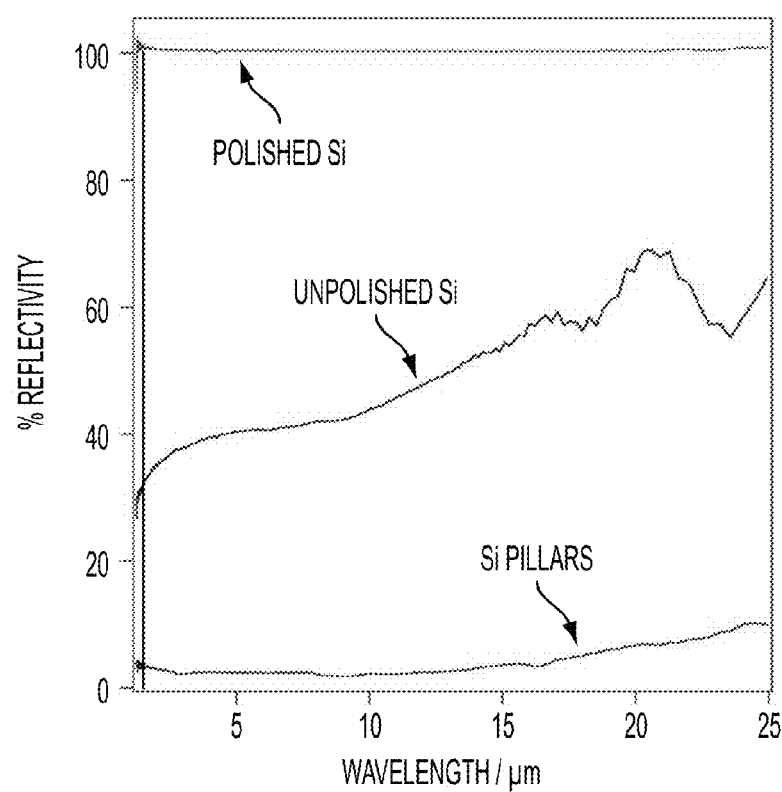
FIG. 11 is a graph illustrating the reflectivity of surfaces of polished silicon, unpolished silicon, and treated a-Si:H surfaces, according to an exemplary embodiment of the present invention.
Figure 12:
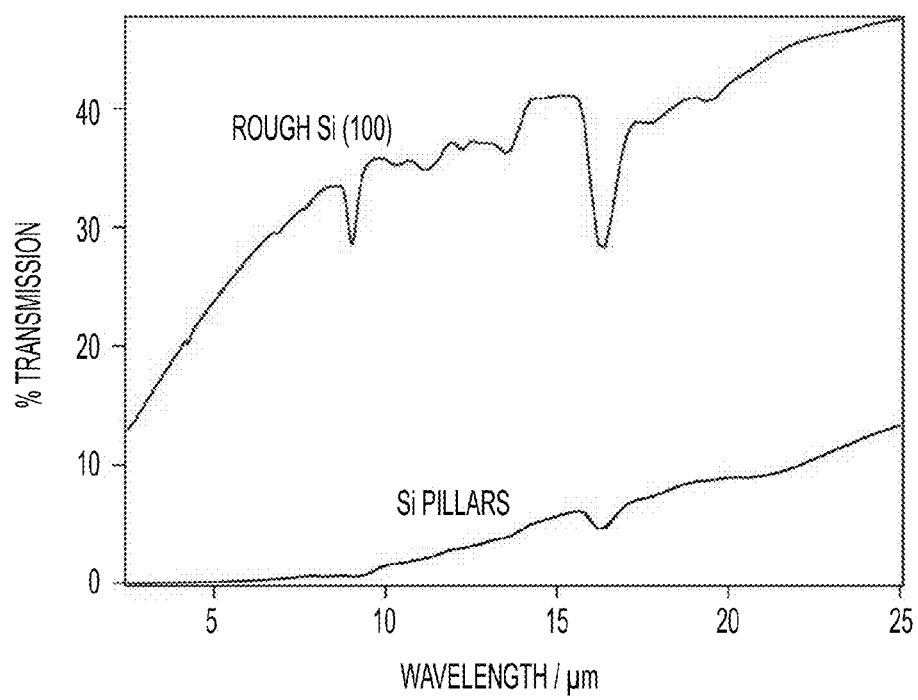
FIG. 12 is a graph illustrating the transmission of samples of unpolished silicon and treated a-Si:H surfaces, according to an exemplary embodiment of the present invention.

The current-voltage characteristics of the treated and untreated a-Si:H samples were also examined, as shown in FIG. 7. FIG. 7(a) shows a graph of the current density as a function of voltage for several light levels for the untreated sample. As illustrated in FIG. 7(b), the current-voltage characteristics change considerably, due to the surface modification and changes in the properties of the material. The transmission and reflectivity of the treated and untreated surfaces were also examined. The reflectivity of polished silicon, unpolished silicon, and treated silicon with pillars is shown in FIG. 11. Similarly, the transmission of the treated silicon versus the rough silicon surface is presented in FIG. 12. The changes in the optical properties shown in FIG. 3 are further substantiated by the changes in reflectivity and transmission as functions of wavelength. These results impact the use of silicon in many applications, as discussed below.

Figure 8:
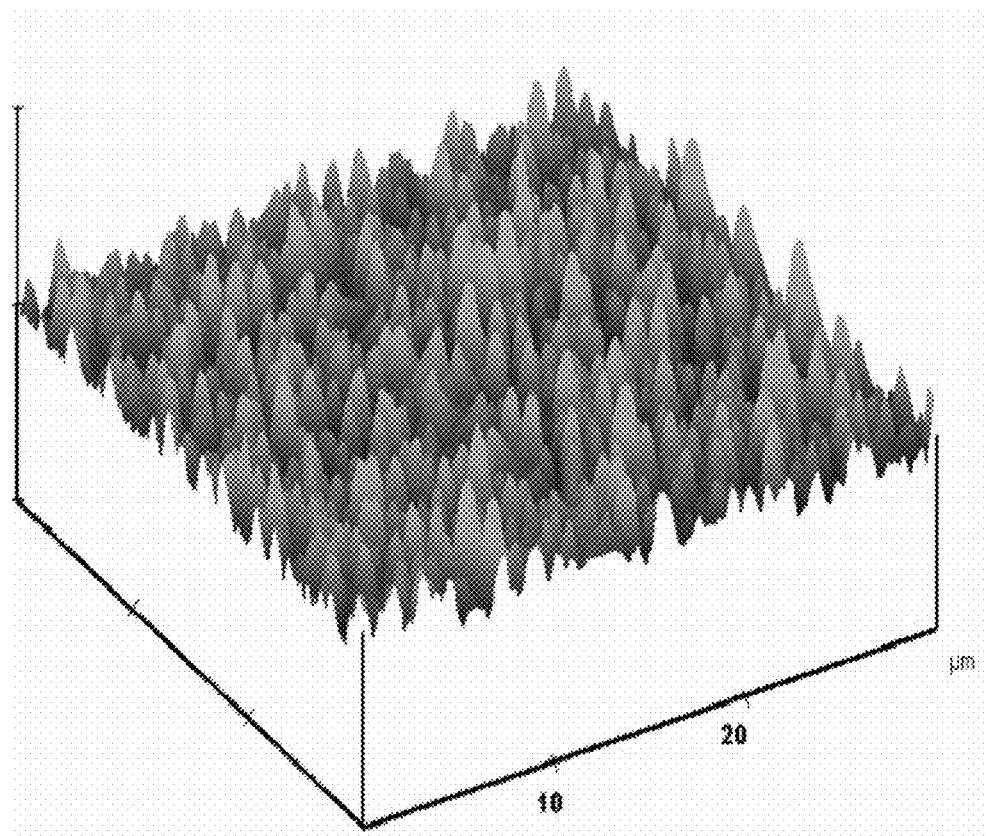
FIG. 8 illustrates an atomic force microscope image of an a-Si:H surface that has been treated according to an exemplary embodiment of the present invention.
Figure 9:
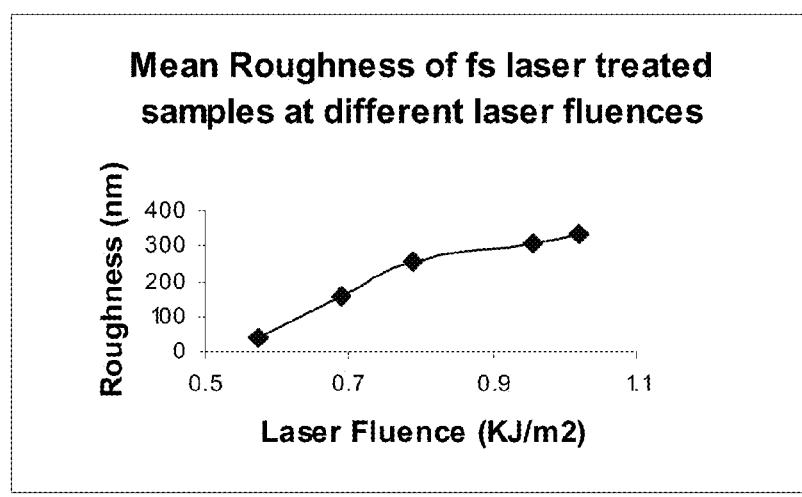
FIG. 9 is a graph illustrating the average roughness of laser treated a-Si:H surfaces at different laser fluences, according to an exemplary embodiment of the present invention.

In order to measure the roughness and spike distribution, atomic force microscopy (AFM) images of the treated a-Si:H samples were obtained. FIG. 8 shows that spikes of a height of about 300 nm were formed, with a spacing between the tips of around 1 µm. The heights of these spikes were found to increase with laser fluence. The average height of the microstructures was 150 nm at a laser fluence of 0.3 J/cm$^2$, and the height increased nearly linearly with the laser fluence. Microstructures with a height of around 350 nm were observed at a fluence of 0.5 J/cm$^2$. Beyond 0.5 J/cm$^2$, the films became very rough, and material ablation deteriorated the texturing. Also, the average roughness of the surface correlates with the laser fluence, as illustrated in the graph in FIG. 9. FIG. 9 shows that the surface roughness increases approximately linearly with the laser fluence.

Increasing the efficiency of a-Si:H thin film solar cells requires more light absorption and a reduction in carrier recombination. A thick i-layer increases the light absorption, but recombination deteriorates the performance. On the other hand, for sufficiently thin film solar cells, the light absorption becomes an issue. Keeping a thin micro or nano crystalline phase with surface texturing could both reduce recombination and improve light trapping. The treated surface had a silicon oxide formation layer of about 50 nm, and was found to be semiconducting. This layer could be used as an n-layer in a p-i-n type solar cell, and an active layer for other optoelectronic devices. The simultaneous formation of light trapping structures and crystallization might find applications in devices such as thin film solar cells, large area sensors, and display devices.

As discussed previously, the femtosecond laser treatment results in the enhancement of optical absorption in a-Si:H thin films. The high absorption of the film is suggested to be due to the light trapping occurring in the silicon spikes formed at the surface after laser treatment, and the structural defects induced during micro structuring process most likely producing bands of defect and impurity states in the band gap. Also, crystallization in the film after femtosecond laser treatment is attributed to a non-thermal ultrafast phase transition and subsequent surface-initiated crystallization. By performing the surface texturing and crystallization as a one-step laser process, optoelectronic devices can be fabricated efficiently.

Exemplary embodiments of the present invention also form nanospiked, nearly periodic microstructures, by exposing a germanium surface to femtosecond laser pulses in a gaseous sulfur hexafluoride ($SF_6$) environment. The microstructures that are formed in germanium have a different aspect ratio than the microstructures formed on silicon. Because reducing light reflection and increasing absorption are key issues in improving optoelectronic device performance, this type of microstructure formation in germanium could lead to the fabrication of highly responsive infrared photodetectors and solar cells. In addition, these textured surfaces might find potential applications in the fabrication of biomedical devices and sensors.

The surface modification of germanium can occur according to the following process. Undoped Ge (100) wafers are cleaved into small chips and ultrasonically cleaned with acetone and methanol. One or more chips are put on a stage inside a vacuum chamber with a base pressure of around 1 mTorr, which is mounted on a high-precision computer-controlled X-Y-Z stage. The chamber is rinsed with $SF_6$ at least twice, and then backfilled with $SF_6$ at 400 mbar. The samples are exposed to 1.4 mJ pulses of light with a wavelength of 800 nm, a pulse duration of 130 fs, and a repetition rate of 1 kHz from a regeneratively amplified Spectra-Physics Ti-sapphire laser system. The wavelength of the laser can be frequency doubled or halved to achieve wavelengths from 200 to 1600 nm. Short laser pulse widths can also be used, including 1 fs to 1 µs pulses. Ultrafast laser pulses are a subcategory of short pulses, and can range from 1 femtosecond to hundreds of picoseconds. The laser beam is focused along the surface normal onto the sample surface by a coated lens with a focal length of 1 m, and the laser fluence is adjusted with a Glan laser calcite polarizer.

The spatial profile of the laser pulse is nearly Gaussian, but is elongated in one axis, creating an elliptical profile. The fluence is calculated by using the laser spot size, which is determined by exposing a point on the sample surface to thousands of shots. In order to scan an area that is bigger than the laser spot size, the samples are translated using a motorized X-Y-Z stage. Scanning also assists in making the surface structure more uniform by smoothing out any shot-to-shot irregularities in the beam profile. By varying the scanning speed of the X-Y-Z stage, the number of laser pulses impinging on the sample surface at a particular location is controlled. The spot size is 0.3 mm along the minor axis and 0.6 mm along the major axis. Scanning is performed parallel to the minor axis.

Samples are produced with isolated single line scans, or with large areas created by overlapping several line scans. The step size between the scan lines is chosen to be sufficiently small (generally 0.38 mm), so that successive lines overlap substantially. This further improves layer homogeneity. Homogeneity is further enhanced by performing two overlapping scans in orthogonal directions, rather than one overlapping scan with an exposure of the same total number of shots. After laser processing, the samples are analyzed with a scanning electron microscope (Zeiss SUPRA 40).

FIG. 13 shows an SEM image at increasing levels of magnification, viewed at 45° from the surface normal line of a germanium surface after exposing the surface to femtosecond laser pulses. Sharp conical structures with nanospikes are formed when the sample is under a pressure of 400 mbar $SF_6$, and is scanned by a laser beam with a fluence of about 0.6 J/cm$^2$. FIG. 13 shows that these structures are almost regular in position, are 10 to 15 µm tall, and have a base diameter around 5 µm, which tapers down to around 100 nm near the tip. The areal density of pillars in FIG. 13(a) is 0.027 µm$^{-2}$, which corresponds to a mean spacing of roughly 6 µm between pillars. The sizes of the microstructures vary across the scanned line, indicating a response to the spatial profile of the laser pulse. In the region of low fluence towards the edge of the irradiated line, the structures have a smaller height and are more densely packed than in the center.

Figure 13A:
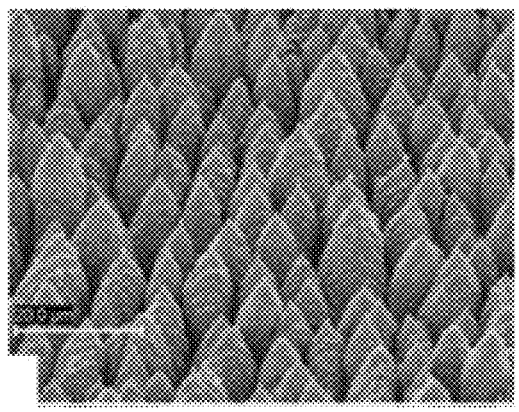
FIG. 13 illustrates SEM images of germanium surfaces, with FIG. 13(a) illustrating an SEM image viewed at 45° from the surface normal, FIG. 13(b) illustrating a higher magnification SEM image showing nanospikes formed on each germanium pillar, FIG. 13(c) illustrating a single nanospike of a treated sample, and FIG. 13(d) illustrating a nanotip formed after brief chemical etching, according to exemplary embodiments of the present invention.
Figure 13B:
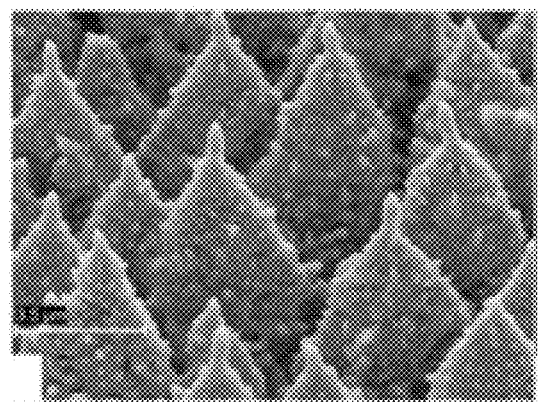
Figure 13C:
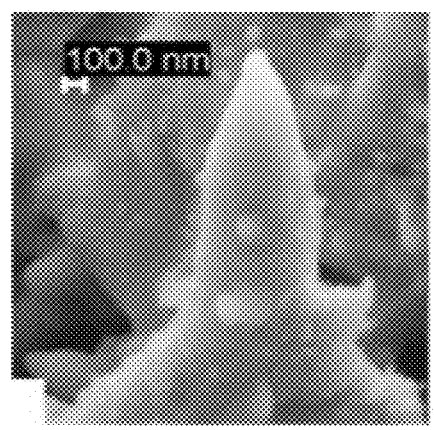
Figure 13D:
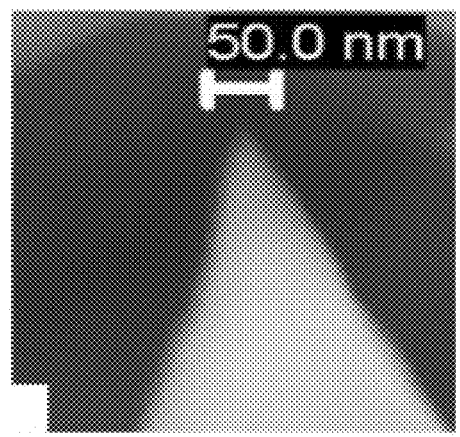

FIG. 13(b) shows that the microstructures have two distinct features: (a) a conical shape (b) that is crowned with a very sharp spike, which has a radius of about 400 nm (about 100 nm at the tip), and is up to about 2 μm long (see FIG. 13(c)). The tips can be sharpened further by a brief chemical processing with 100 ml $H_2O_2$ (10 vol %), 8 g NaOH for 10 seconds at room temperature. Alternatively, the tips can be sharpened further by ion etching, including etching with an Argon ion beam. Nanoclusters, which are formed during laser ablation and deposited on the surface, are also evident from FIG. 13(b).

The SEM images of FIG. 14 show the effect of laser fluence on the surface texturing of germanium. In this figure, the average number of laser shots at each point on the sample surface is 400. The germanium surface in FIG. 14(a) was irradiated with laser pulses with a fluence of 0.66 J/cm$^2$, and the germanium surface in FIG. 14(b) was irradiated with laser pulses with a fluence of 0.56 J/cm$^2$. In contrast, the germanium surface in FIG. 14(c) was irradiated with laser pulses with a fluence of 0.3 J/cm$^2$, and the germanium surface in FIG. 14(d) was irradiated with laser pulses with a fluence of 0.2 J/cm$^2$. FIG. 14(d) shows that texturing is observed at fluences as low as 0.2 J/cm$^2$, resulting in features are smaller in width and height, less regular, less smooth, and densely populated, with very tiny or no spike formation. However, for higher fluence conditions, such as those in FIGS. 14(a) and 14(b), the structures are more well-developed, sharper, and more conical, and spike-formation takes place atop the pillars. Also, increasing the number of laser shots from 400 to 600 and keeping the fluence almost the same wipes out all the spikes.

Germanium expands upon freezing. When a shell of germanium material starts freezing and expanding, it exerts pressure on the liquid trapped inside, causing the liquid to shoot upward and solidify to form nanospikes. As Mills and Kolasinski disclose, in order to obtain nanospikes in silicon, it is necessary to dilute the $SF_6$ with He. This reduces the chemical processing that results from the interaction of fluoride with the silicon surface. If the processing is too aggressive, it can remove the nanospikes. In contrast, it is unnecessary to dilute the $SF_6$ in order to obtain nanospikes on a germanium sample, probably because of differences in the chemistry of processing in the F/Ge system compared to the F/Si system. Another possible reason why germanium appears to be more conducive for nanospike formation might be that the thermal conductivity of undoped germanium is less than half of the thermal conductivity of undoped silicon. Therefore, the heat dissipation to the pillar in germanium is slower, and the liquid bulb remains in a molten state for a longer time, as compared to silicon.

In order to investigate the properties of the textured germanium surfaces, an X-ray diffraction study was conducted. FIG. 15 shows an X-ray diffraction spectrum of a laser textured germanium surface. The sharp high-intensity peak corresponds to the (400) plane, because the starting material is Ge (100). However, two relatively weak peaks at (111) and (220) are also observed. This indicates that the textured pillars and the nanospikes remain predominantly crystalline.

Figure 16A:
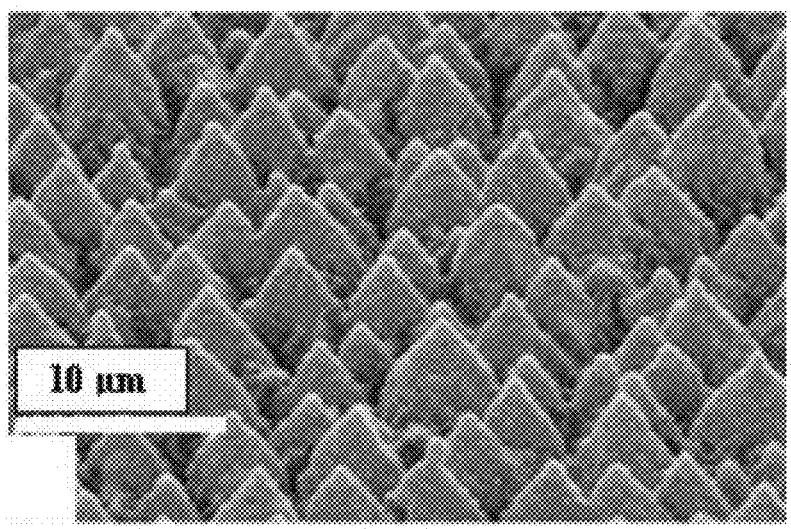
FIG. 16 illustrates SEM images of treated surfaces, with FIG. 16(a) illustrating an image taken towards the edge of the scanned line for a Ge (100) surface, FIG. 16(b) indicating ball formation instead of spikes for a Ge (100) surface, and FIG. 16(c) illustrating an image taken in the middle of the scanned line for a Si (100) surface, according to exemplary embodiments of the present invention.
Figure 16B:
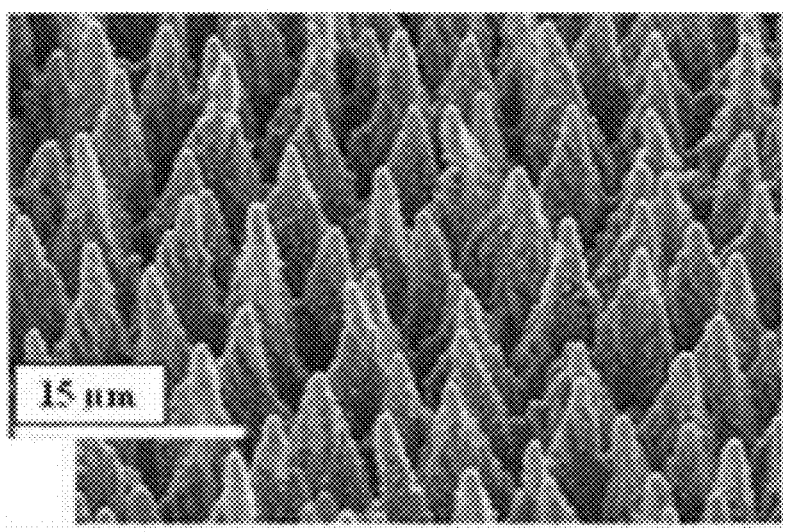
Figure 16C:
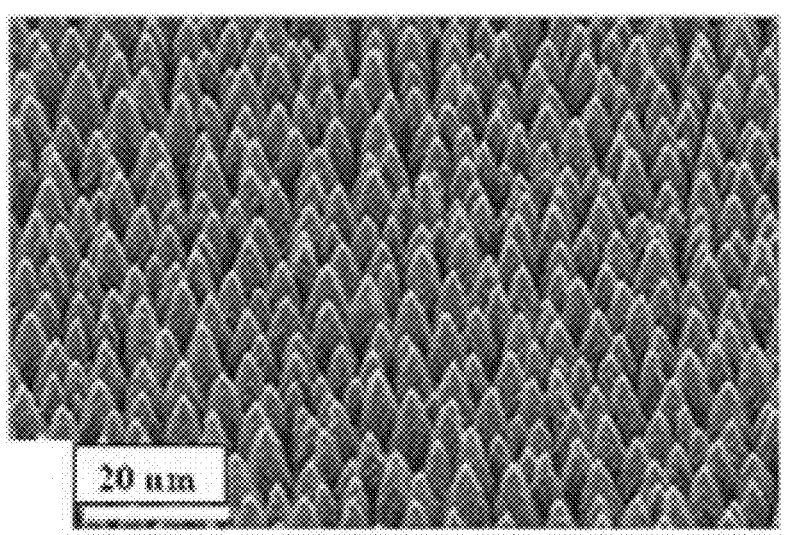

The SEM images of FIGS. 16(a) and 16(b) show the structural formations in germanium, and FIG. 16(c) compares the structural formations in silicon, after laser treatment under similar conditions. For all three samples the laser fluence was around 0.56 J/cm$^2$, the number of laser shots was around 600, the sample was in a gaseous $SF_6$ environment at 400 mbar, and an orthogonal scanning mode was used. The SEM image in FIG. 16(a) was taken toward the edge of the scanned line, while the SEM image in FIG. 16(b) was taken in the middle of the scanned line. FIG. 16 shows that the germanium pillars are not as smooth as the silicon pillars. Also, the aspect ratio, defined as the ratio of the tip height to the tip width, is higher in silicon than germanium for a given laser condition. For example, at a fluence of 0.5 J/cm$^2$, silicon has an aspect ratio of around 200, whereas germanium has an aspect ratio of around 100. Also, as mentioned previously, spikes were not formed on germanium under higher laser shot conditions. However, pillars formed under higher laser shot conditions are taller than pillars formed under fewer shots, as shown in FIGS. 13 and 14. In contrast, silicon shows a well-developed smooth structure under a greater variety of shot conditions.

FIG. 16(a) shows that toward the edge of the laser scanned line on the germanium surface, pyramidal structures were formed, which tend to form a small spherical cap at the top, instead of the nanospikes formed in FIG. 16(b). This spherical cap formation is typical of silicon. The spherical shape of the cap suggests that a liquid germanium drop resolidified before it could spill over the pillar. The lack of nanospikes in FIG. 16(a) might be due to three possible reasons: (a) the fluence is low to achieve the high melting condition necessary for nanospike formation; (b) the higher number of laser shots destroyed nanospikes that were already formed; or (c) an insufficient density of nanostructures was formed. With further regard to (c), deposition of nanoclusters has been implicated in the formation of nanospikes. A sufficient nanoclusters deposition rate is required, and because fewer nanoclusters are formed at a lower fluence, there may be a critical fluence for the formation of nanospikes, not only because a sufficient melt must be formed, but also because a sufficient density of nanoclusters must be created.

Figure 17A:
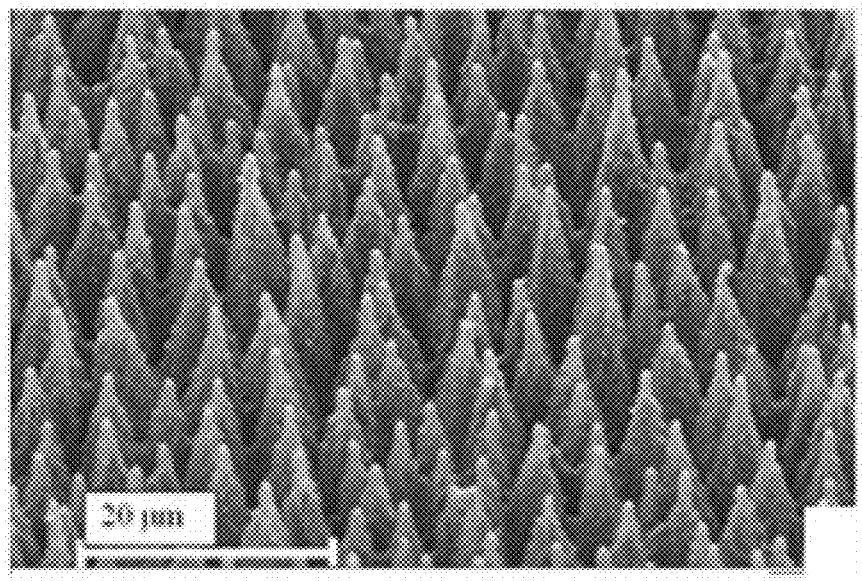
FIG. 17 illustrates SEM images of pillars, viewed at 45° from the surface normal, formed on a silicon surface, with FIG. 17(a) illustrating an SF$_6$ gaseous environment, and FIG. 17(b) illustrating an HCl gaseous environment, according to exemplary embodiments of the present invention.
Figure 17B:
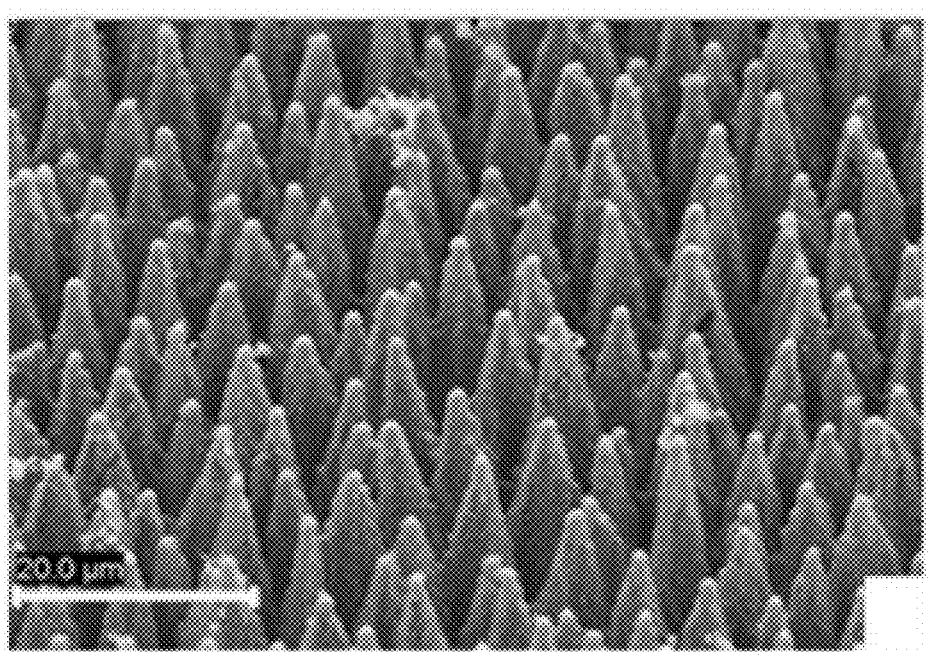

FIG. 17 shows SEM images viewed at 45° from the surface normal of sharp conical pillars formed on the surface of B-doped Si (100) wafers. The pillars were produced with 240 shots of 130-fs laser pulses at a fluence of 0.6 J/cm$^2$. FIG. 17(a) shows the results for a sample in 400 mbar of $SF_6$, and FIG. 17(b) shows the results for a sample in 400 mbar of HCl. The pillar size varies across the scanned laser line, indicating the intensity variation of the laser fluence across the spatial profile of the laser pulse. The scan lines were overlapped to minimize height variation over a large area on the sample surface. The spikes that are obtained in $SF_6$ are around 15 μm tall and have a base diameter of around 5 μm.

On the other hand, the structures formed under similar laser conditions in the presence of HCl are composed of taller and wider pillars, with a height of around 20 μm and a base diameter of around 7 μm. FIGS. 17(a) and 17(b) show that the pillars formed in $SF_6$ are narrower towards the tips, compared to the pillars formed in HCl. Although the pillar density is comparable in both cases, the pillars formed in HCl look stronger and are relatively blunt towards the tip, indicating that differences in the etch chemistry of the F/Si system and the Cl/Si system are responsible for significant structural differences.

The role of chemistry in structure formation is not well understood, and it is a significant result that regular conical pillars are formed during femtosecond irradiation in $SF_6$ as well as HCl. Regular conical pillars can be formed during nanosecond irradiation of silicon in the presence of $SF_6$, but they are not formed for nanosecond irradiation of silicon in the presence of HCl. Nanosecond irradiation of silicon in HCl produces significantly blunter tips, the pillars are much taller, with a height greater than 50 μm, and the pillars are porous, instead of having a solid core. This is a further indication that the mechanisms of pillar formation are different for the femtosecond and nanosecond irradiation regimes. This result is also significant because chemical impurities, namely sulfur, incorporated during laser processing have been implicated in changing the optical and electronic properties of the textured surfaces.

Figure 18A:
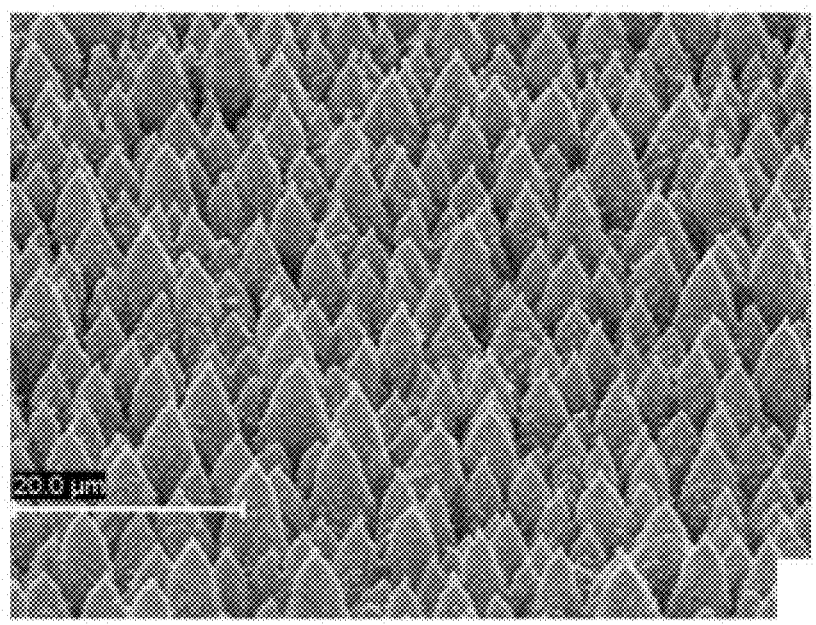
FIG. 18 illustrates SEM images of pillars, viewed 45° from the surface normal, formed on a germanium surface, with FIG. 18(a) illustrating an SF$_6$ gaseous environment, and FIG. 18(b) illustrating an HCl gaseous environment, according to exemplary embodiments of the present invention.
Figure 18B:
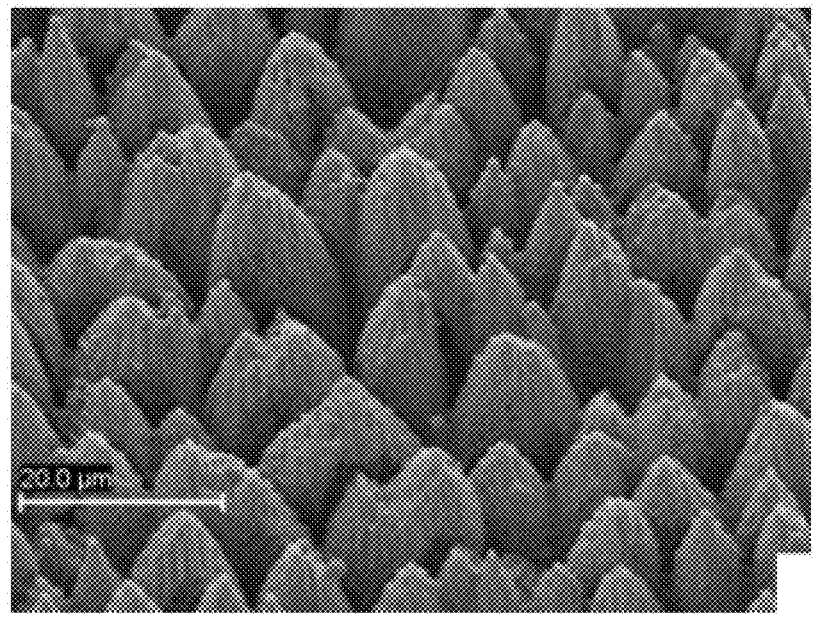
Figure 20A:
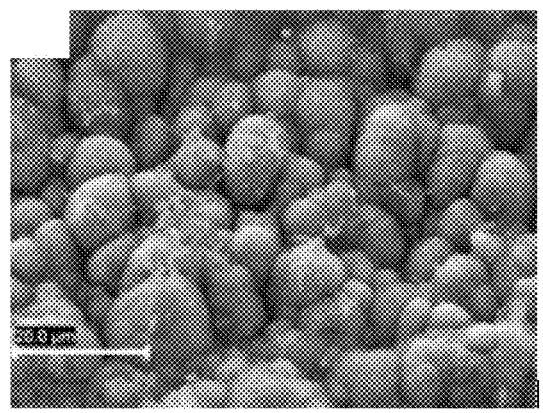
FIG. 20 illustrates SEM images of titanium surfaces, with FIG. 20(a) illustrating a titanium surface treated in air, FIG. 20(b) illustrating a titanium surface treated in vacuum, FIG. 20(c) illustrating a titanium surface treated in helium, and FIG. 20(d) illustrating a titanium surface treated in SF$_6$, according to exemplary embodiments of the present invention.
Figure 20B:
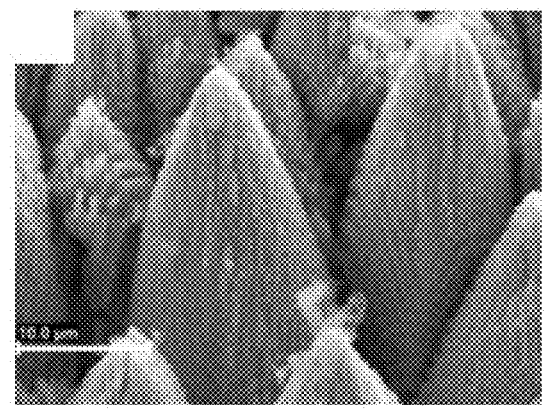
Figure 20C:
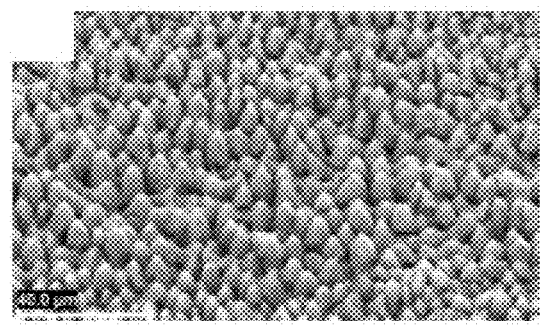
Figure 20D:
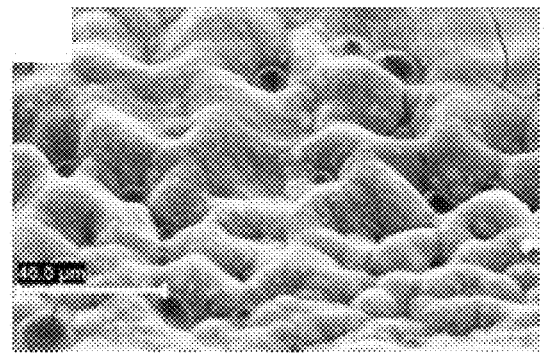
Figure 21A:
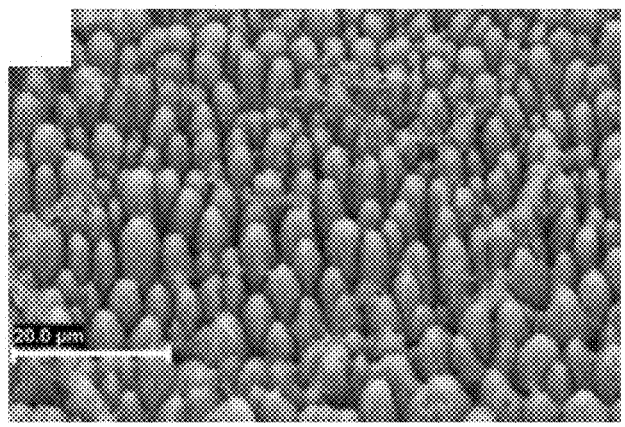
FIG. 21 illustrates SEM images of stainless steel surfaces, with FIG. 21(a) illustrating a stainless steel surface treated in air, FIG. 21(b) illustrating a stainless steel surface treated in vacuum, FIG. 21(c) illustrating a stainless steel surface treated in helium, and FIG. 21(d) illustrating a stainless steel surface treated in SF$_6$, according to exemplary embodiments of the present invention.
Figure 21B:
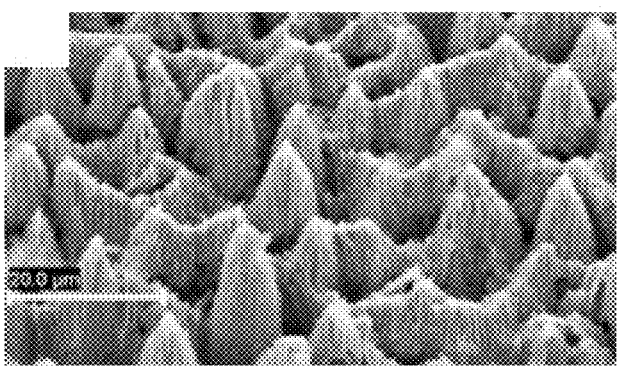
Figure 21C:
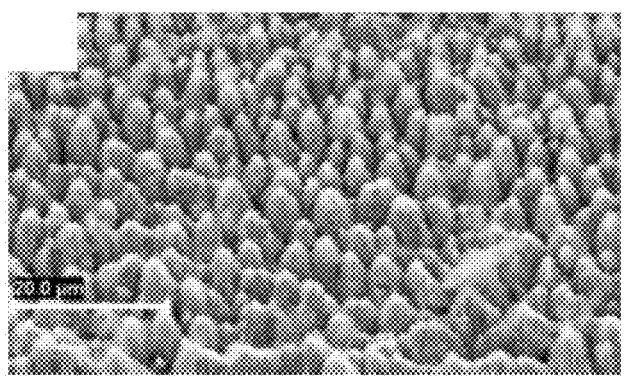
Figure 21D:
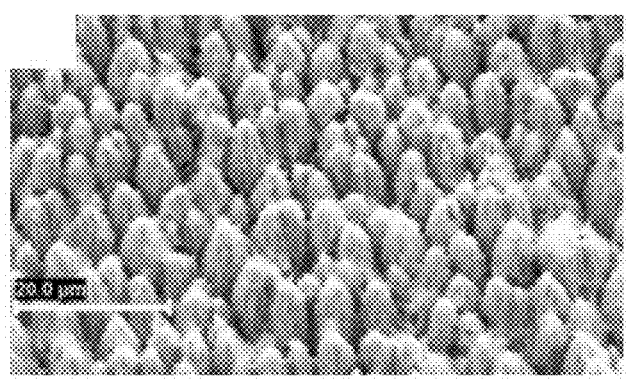
Figure 22A:
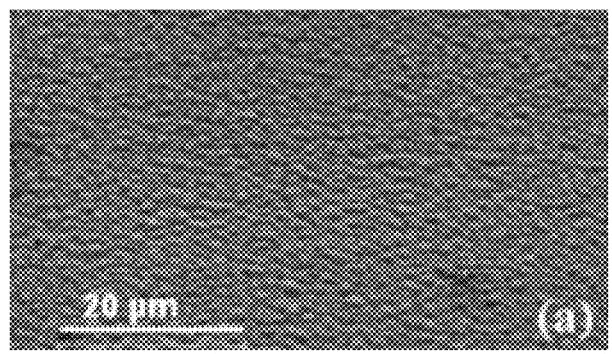
FIG. 22 illustrates SEM images viewed at 45° from the surface normal, with FIG. 22(a) illustrating a treated SiC surface, FIG. 22(b) illustrating a treated GaAs surface, FIG. 22(c) illustrating a treated titanium surface, and FIG. 22(d) illustrating a treated stainless steel surface, according to exemplary embodiments of the present invention.
Figure 22B:
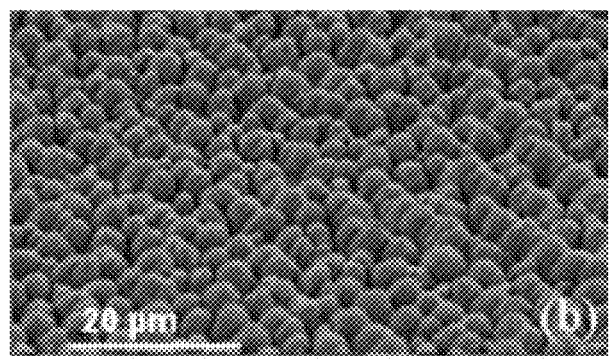
Figure 22C:
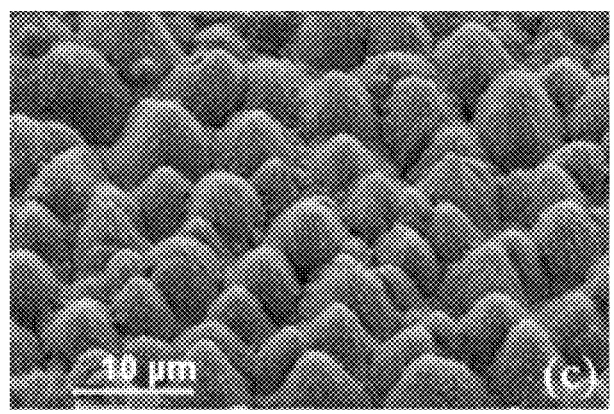
Figure 22D:
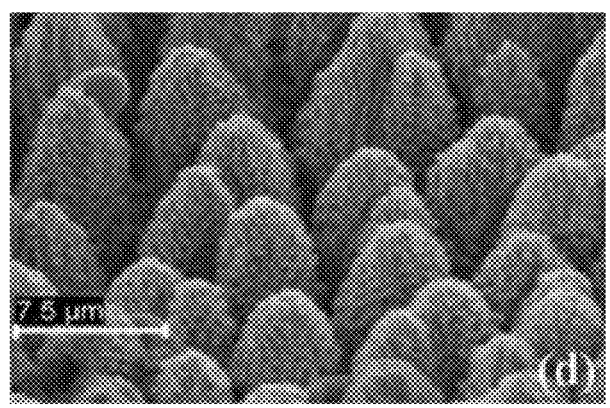

FIG. 18 shows SEM images taken for germanium samples treated under similar laser and gaseous conditions as described above for silicon. A very different surface texturing was created for germanium. FIG. 18(a) shows that for germanium processed in $SF_6$, there were two distinct features that were not observed for silicon treated under similar conditions: (a) conical pillar formation with a higher cone angle up to a neck; and (b) very sharp spikes, up to about 2 μm in length with a tip radius of about 100 nm, formed atop the pillars. Nanoclusters formed during laser ablation are more abundant in germanium than silicon under similar laser conditions, which might be due to the lower melting temperature of germanium. On the other hand, FIG. 18(b) shows that the germanium structures formed in the presence of HCl are less densely populated, shorter, have a higher cone angle and a wider base, and exhibit greater variations in pillar height than the silicon structures shown in FIG. 17(b). Gas phase silicon etching is anisotropic in HCl, and the etch rate is around 20 μm min$^{-1}$ for the (100) plane at temperatures in the range of 1050-1250° C., whereas in germanium the etch rate is around 3 μm min$^{-1}$, the etch rate is independent of temperature beyond 800° C., and etching leads to the development of square pits for the (100) orientation. The differences in etch chemistry are involved in determining the different structure formation dynamics, which result in more regular spike formation in HCl for silicon than for germanium.

Laser induced surface texturing that produces regular structures on materials in the presence of reactive species is a complex process involving: (1) interactions between the plume and the process gas, and the plume and the surface, such as decomposition of the reactive gas, chemical etching enhanced by laser heating of the material and the formation of radicals, and deposition out of the plume; (2) laser ablation of the material; and (3) optical phenomena that initiate the formation of regular structures. The laser parameters, gaseous environment, and nature of the substrate all play a role in the final outcome of the surface morphology. Structure formation is ultimately a convoluted dynamical process involving all three factors. The dimensions and character of the pillars formed in silicon have been shown to depend critically on the temporal pulse width of the laser beam. While pillar production with pulse durations in the range of 100 fs to 20 ns has been demonstrated, with much smaller pillars being formed in the case of femtosecond irradiation, pillars were not producible with a 300 ns Nd:VO$_4$ laser. It appears that laser pulses significantly shorter than the melt lifetime of about 250 ns are required for sharp pillar formation.

FIG. 19(a) illustrates an SEM image of a one-dimensional periodic structure made on a silicon substrate, according to exemplary embodiments of the present invention. FIG. 19(b) illustrates an SEM image of a two-dimensional periodic structure made on a silicon substrate, according to exemplary embodiments of the present invention. Periodic structures can be produced by controlling the laser intensity distribution on the surface of the sample. The laser intensity distribution can be controlled by using interference and diffraction. For example, interference fringes are created by placing a metal wire in a portion of the laser beam. The light diffracted by the wire interferes to produce an intensity distribution on the sample surface that results in a periodic structure of pillars. Alternatively, the incident laser beam is split into two components, and then recombined at various angles to control the periodicity. It is also possible to place several pinholes in the path of the laser beam to create a periodic circular pattern of pillars on the surface. By using laser beams with different wavelengths and controlling the interference patterns, the periodicity of the pillars can be adjusted from tens of nanometers to tens of micrometers.

In an exemplary embodiment of the present invention, copper or tungsten wires with diameters from 100 to 250 μm are used to create interference fringes. The sample is exposed to 1.4 mJ pulses of light with a wavelength of 800 nm, a pulse duration of 130 fs, and a repetition rate of 1 kHz. The laser scan speed is 0.1 in/sec, and scanning is performed after placing the sample inside a vacuum chamber filled with $SF_6$ at a pressure of 400 mbar. In order to create a two-dimensional array of pillars, the metal wires are crossed orthogonally and placed in the path of the laser beam. Also, the spacing between adjacent pillars can be controlled by changing the wavelength of the laser pulses. For example, when the laser wavelength is decreased, the spacing between adjacent pillars also decreases.

In another exemplary embodiment of the present invention, the laser texturing method was performed on various metallic surfaces. A metal is defined as an electrically conducting material. For example, titanium and stainless steel sheets are cut into small square-inch sized chips and cleaned with acetone and methanol. One such chip is put on a stage inside a vacuum chamber with a base pressure of around 1 mTorr, which is mounted on a high-precision computer-controlled X-Y-Z stage. The chamber is rinsed and then backfilled with air at atmospheric pressure, $SF_6$ in a pressure range from 75 to 800 mbar, or helium in a pressure range from 75 to 800 mbar. The laser texturing method can also be conducted with a mixture of gases in different proportions and at different pressures, or in vacuum, with a chamber pressure of around 1 mbar. The samples are exposed to ultrafast laser pulses with a pulse energy of 0.95 mJ, a wavelength of 800 nm, a pulse width of 130 fs, and a repetition rate of 1 kHz from a regeneratively amplified Spectra-Physics Ti-sapphire laser system. Short laser pulse widths can also be used, including 1 fs to 1 μs pulses. Ultrafast laser pulses are a subcategory of short pulses, and can range from 1 femtosecond to hundreds of picoseconds. The laser beam is focused onto the sample surface by a coated lens with a focal length of 1 m, and the laser fluence is adjusted by using a Glan calcite polarizer.

The spatial profile of the laser pulse is Gaussian, and the fluence is calculated by using the laser spot size, which is determined by exposing a point on the sample surface to thousands of shots. In order to scan an area that is bigger than the laser spot size, the samples are translated using a motorized X-Y-Z stage. Scanning also assists in making the surface structure more uniform by smoothing out any shot-to-shot irregularities in the beam profile. By varying the scanning speed of the X-Y-Z stage, the number of laser pulses impinging on the sample surface at a particular spot is controlled. The spot size is about 0.3 mm.

Samples are produced with isolated single line scans, or with large areas created by overlapping several line scans. The step size between scan lines is chosen to be sufficiently small (less than 0.38 mm), so that successive lines overlap substantially. This further improves layer homogeneity. Homogeneity is further enhanced by performing two overlapping scans in orthogonal directions, rather than one overlapping scan with an exposure of the same total number of shots. After laser processing, the samples are analyzed with a scanning electron microscope (Zeiss SUPRA 40).

FIG. 20 shows SEM images of titanium surfaces treated with the laser texturing method for different background gas conditions. FIG. 20(a) shows an SEM image of a titanium surface treated in air, and FIG. 20(b) shows an SEM image of a titanium surface treated in vacuum. FIG. 20(c) shows an SEM image of a titanium surface treated in helium at a pressure less than 200 mbar, and FIG. 20(d) shows an SEM image of a titanium surface treated in $SF_6$ at a pressure greater than 400 mbar. As these figures show, pillar formation occurs in titanium that is treated with a laser fluence from 0.6 to 1.0 J/cm$^2$, and in vacuum or gas at low pressures less than 200 mbar. In order to create a well-developed pillar on titanium, it is necessary to irradiate the sample with around 1000 shots. However, increasing the number of shots or the laser fluence destroys the pillars.

FIG. 21 shows SEM images of stainless steel surfaces treated with the laser texturing method for different background gas conditions. FIG. 21(a) shows an SEM image of a stainless steel surface treated in air, and FIG. 21(b) shows an SEM image of a stainless steel surface treated in vacuum. FIG. 21(c) shows an SEM image of a stainless steel surface treated in helium at a pressure less than 200 mbar, and FIG. 21(d) shows an SEM image of a stainless steel surface treated in $SF_6$ at a pressure greater than 400 mbar. As shown in the figures, laser texturing forms pillars on stainless steel surfaces in air, vacuum, helium, and $SF_6$. However, in order to create a well-developed pillar on stainless steel, it is necessary to irradiate the sample with around 2000 shots. Both the stainless steel samples and the titanium samples turn pitch black after laser treatment. However, unlike titanium, pillar formation occurs on stainless steel in air.

FIG. 22 shows a series of SEM images viewed at 45° from the surface normal, which compares the results of the laser texturing method for various semiconductors and metals. In each case the surface of the material is treated with ultrafast laser pulses with a pulse width of 130 fs. FIG. 22(a) shows an SEM image of SiC treated with 260 shots at a laser fluence of around 1 J/cm$^2$ in 400 mbar of $SF_6$. FIG. 22(b) shows an SEM image of GaAs treated with 260 shots at a laser fluence of around 0.5 J/cm$^2$ in 400 mbar of $SF_6$. FIG. 22(c) shows an SEM image of titanium treated with 2000 shots at a laser fluence of around 0.3 J/cm$^2$ in 400 mbar of $SF_6$. FIG. 22(d) shows an SEM image of stainless steel treated with 2500 shots at a laser fluence of around 4.5 J/cm$^2$ in 400 mbar of $SF_6$. These figures show that the laser texturing method can form pillars on various semiconductors and metals.

In addition, the laser texturing method is likely to form pillars on ceramics, polymers, and alloys. By controlling the processing conditions of the laser texturing method for each material, the thermal, structural, optical, and electronic properties of the material can be tailored. Further, the formation of pillars can be controlled by changing the polarization state of the laser beam. A polarizer can change the output from the laser to be linearly, circularly, elliptically, or randomly polarized. The laser texturing method can be performed on surfaces of any geometrical shape, and is not limited to planar surfaces.

Similarly, the laser texturing method could also be used to process transparent materials, such as glass. The incident light could be absorbed by a two-photon process, or an appropriate wavelength could be selected for absorption by the transparent material. The altered surfaces formed by this method could be used in magnetic disk drives, because the disk drive and the head are spaced very closely together for data writing and reading.

Figure 26:
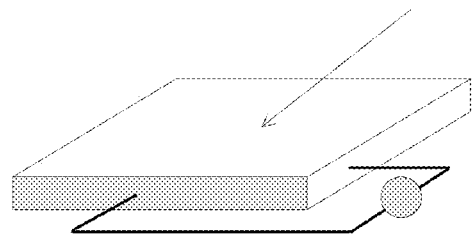
FIG. 26 is a schematic representation of photovoltaic and photodetection applications using the treated surface, according to exemplary embodiments of the present invention.

The altered surfaces formed by the apparatuses and methods of the present invention can have great utility in photovoltaic technologies, as schematically illustrated in FIG. 26. The increased light trapping and the control of photogenerated charges can provide improved efficiency. In particular, the altered surfaces would be beneficial in photodetectors, because the surfaces allow for the development of more sensitive detectors with a high responsivity, and extend the spectral range into the infrared region of the spectrum. This could also enable the building of infrared sensors for various applications.

The altered surfaces would also be beneficial in measuring optical power using pyroelectric effect where pyroelectric detectors convert the changes in incoming light to electrical signals. The pyroelectric films can be coated on a textured surface which provides good absorption to incoming radiation.

Figure 27:
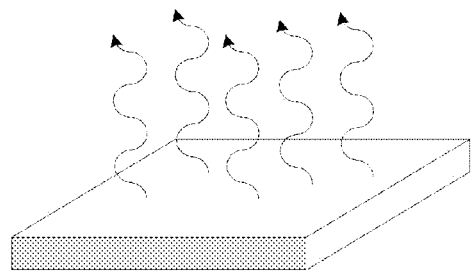
FIG. 27 is a schematic representation of heat dissipation using the treated surface, according to exemplary embodiments of the present invention.

The altered surfaces would also be beneficial in heat dissipation, as schematically illustrated in FIG. 27. A large surface area is created by texturing, which allows gas molecules to exchange energy with the surface, and increases heat dissipation. Such a high-efficiency heat sink could be very important for microelectronics, power electronics, optoelectronics, high power lasers and other devices that require efficient heat dissipation.

Figure 23:
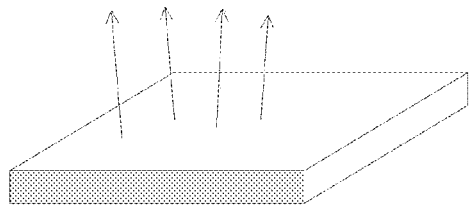
FIG. 23 is a schematic representation of field emission from the treated surface, according to exemplary embodiments of the present invention.

The altered surfaces can also be used in field emission, as schematically illustrated in FIG. 23. Due to the sharp geometry of pillars formed by the laser texturing process, very high electric fields can be generated at relatively low voltages. These high electric fields can be used for electron emission from surfaces, providing an efficient source of electrons for various electronic and optoelectronic device applications, such as field emission displays, sensors, and instruments. The texture can also be used as a template for coating other types of films for field emission.

Figure 25:
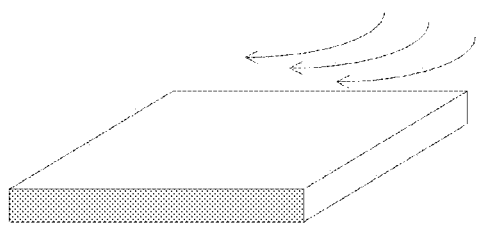
FIG. 25 is a schematic representation of the effect on external flow by the treated surface, according to exemplary embodiments of the present invention.

The altered surfaces would also be beneficial in surface property control, as schematically illustrated in FIG. 25. Laser textured surfaces can be made hydrophobic or hydrophilic by controlling the texture and surface coating. This can affect the air or fluid flow across the surface of the material.

The altered surfaces would also be beneficial in micro fluidic applications. There is an increasing number of micro fluidic applications for chemical and biomedical applications of chips. As schematically illustrated in FIG. 25, textured surfaces in micro channels can provide a good method of controlling the fluid flow, which can impact DNA sequencing and other applications. The altered surfaces would also be beneficial in turbulence control for aerodynamic applications. The flow of gases can be controlled by inserting a textured surface into the flow path. Also, turbulence can be generated by using of textured surfaces. This effect can be used in aerospace applications.

Figure 24:
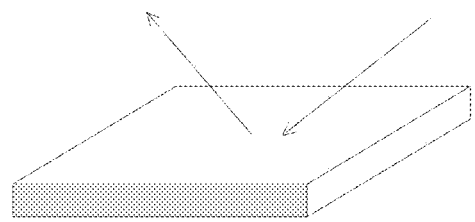
FIG. 24 is a schematic representation of reflectivity and absorption of the treated surface, according to exemplary embodiments of the present invention.

The altered surfaces would also be beneficial in an optical beam block, as schematically illustrated in FIG. 24. The laser textured surface has an extremely low reflectance and transmittance in the visible to the far infrared region, allowing the surface to be an efficient beam block for various optical and manufacturing applications. The altered surfaces would also be beneficial in controlling the visual appearance of products, including the surface color. The laser texturing process provides a completely black surface, hence it can be used to control the color of the surface without using any paints, dyes, or pigments.

Figure 29:
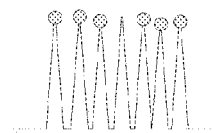
FIG. 29 is a schematic representation of the placement of chemical or biochemical materials at the tips on the treated surface, according to exemplary embodiments of the present invention.
Figure 30:
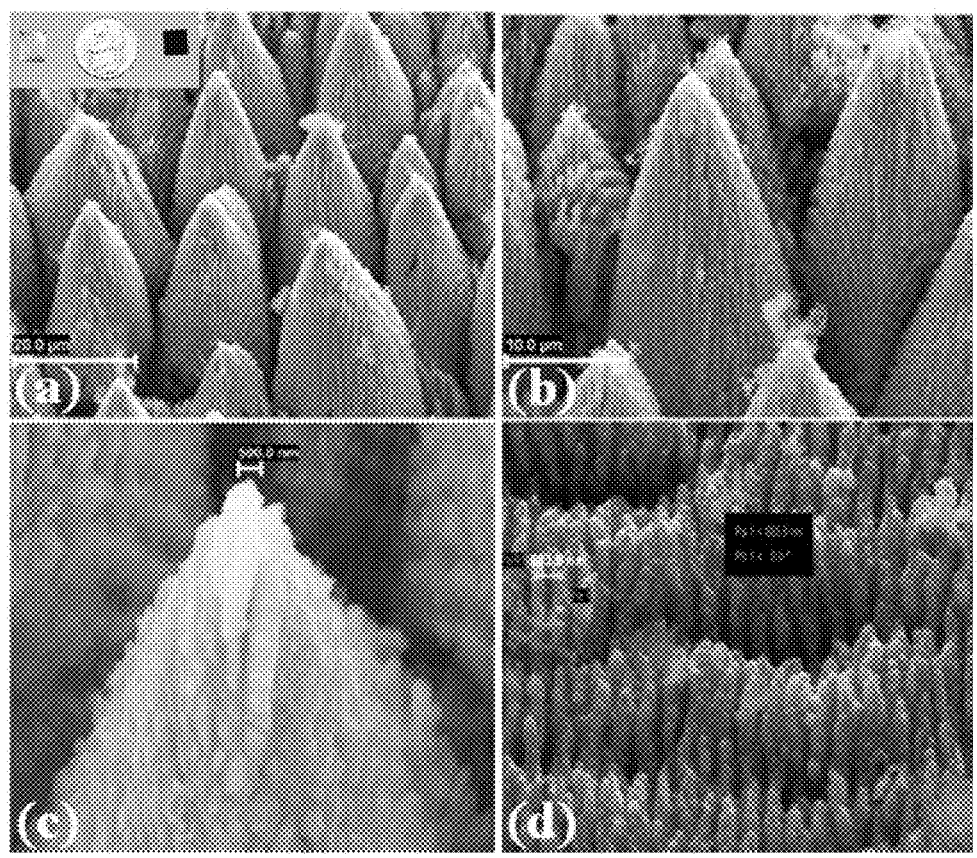
FIG. 30 shows SEM images of a Ti surface after irradiation of approximately 800 laser pulses of 130 fs duration and 1.5 J/cm$^2$ fluence in vacuum at a base pressure of ~1 mbar viewed at 45° from the surface normal, with FIG. 30(a) illustrating sharp conical microstructures, and containing an inset of a photograph of a control titanium piece (gray in color) and a textured titanium piece (black in color), FIG. 30(b) illustrating a higher magnification image which shows that the base diameter of the pillars is over 10 μm, and the height is around 25 μm, FIG. 30(c) illustrating the taper part of the pillars, and showing that the tip diameter is around 500 nm, and FIG. 30(d) illustrating the ripples formed on the surface of the pillars, with a periodicity of around 680 nm and a ridge width of around 200 nm.
Figure 31A:
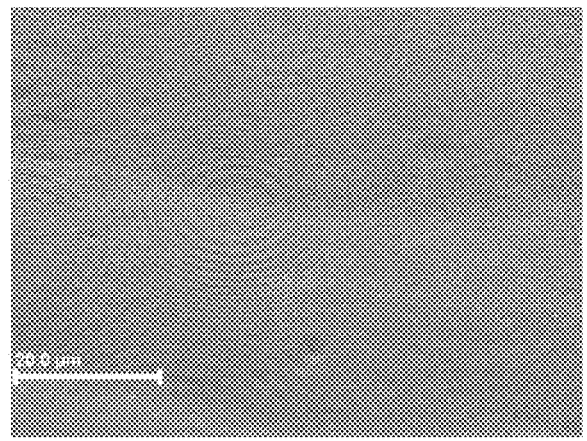
FIG. 31 shows SEM images of a Si surface after irradiation of femtosecond laser pulses, with FIG. 31(a) illustrating the Si surface after exposure to 2 laser shots, FIG. 31(b) illustrating the Si surface after exposure to 3 laser shots, and FIG. 31(c) illustrating the Si surface after exposure to 5 laser shots.
Figure 31B:
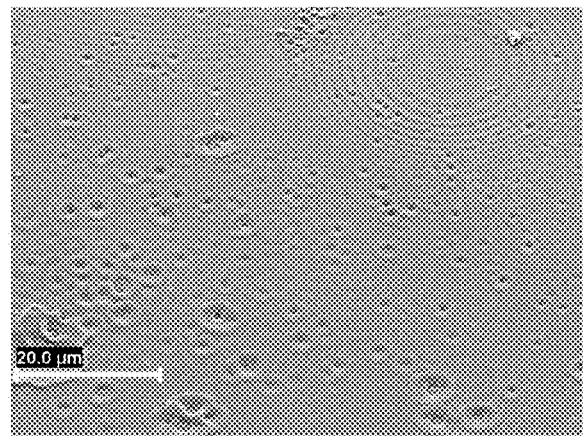
Figure 31C:
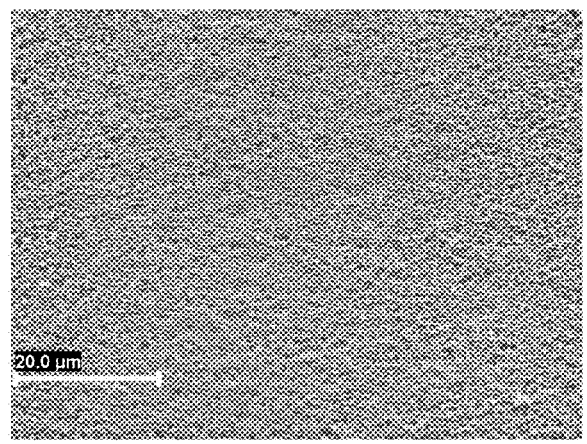
Figure 32:
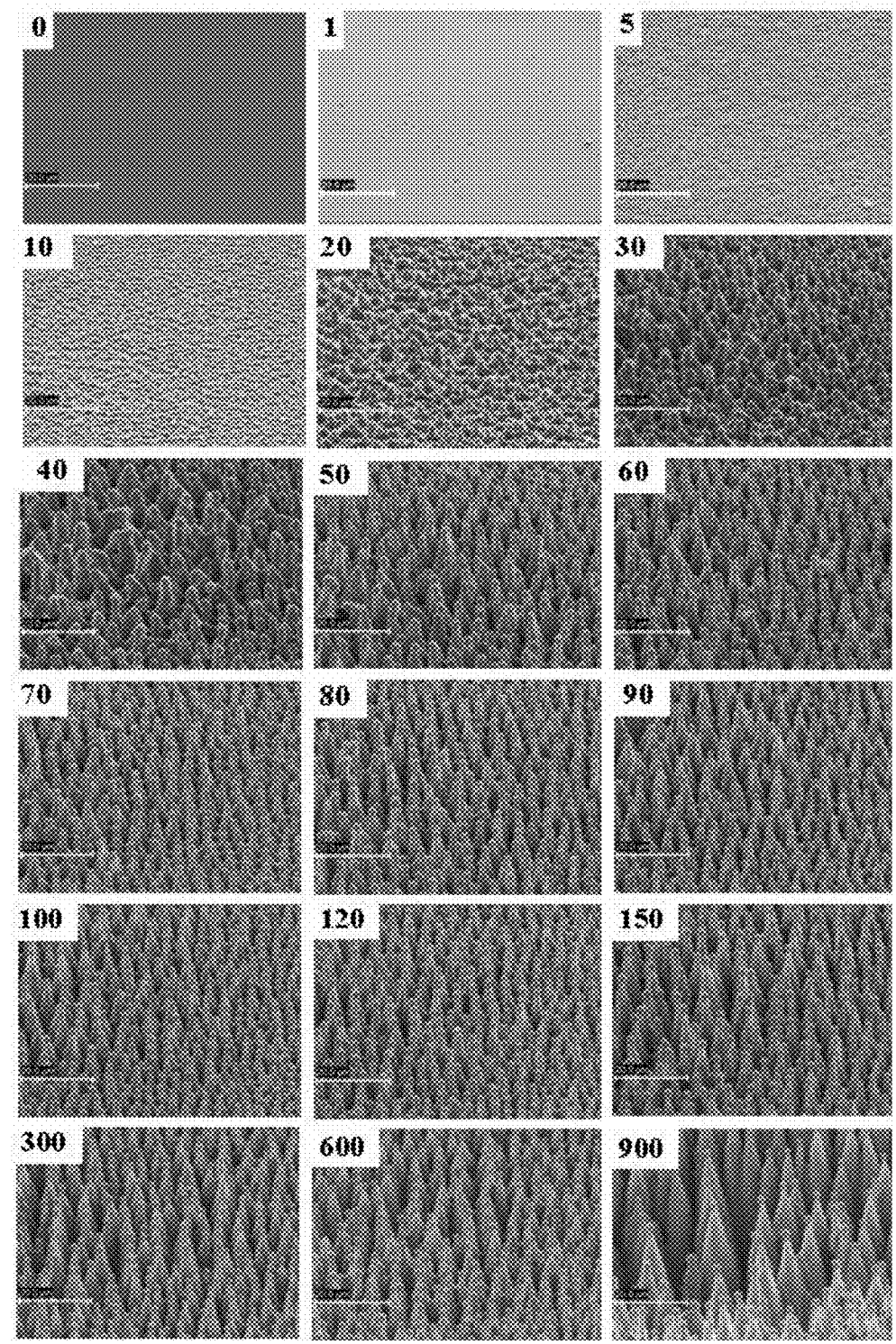
FIG. 32 shows SEM images of a Si surface after exposure to different numbers of laser shots of femtosecond laser pulses, where each image is taken at a 45° angle to the surface at the same magnification.
Figure 33:
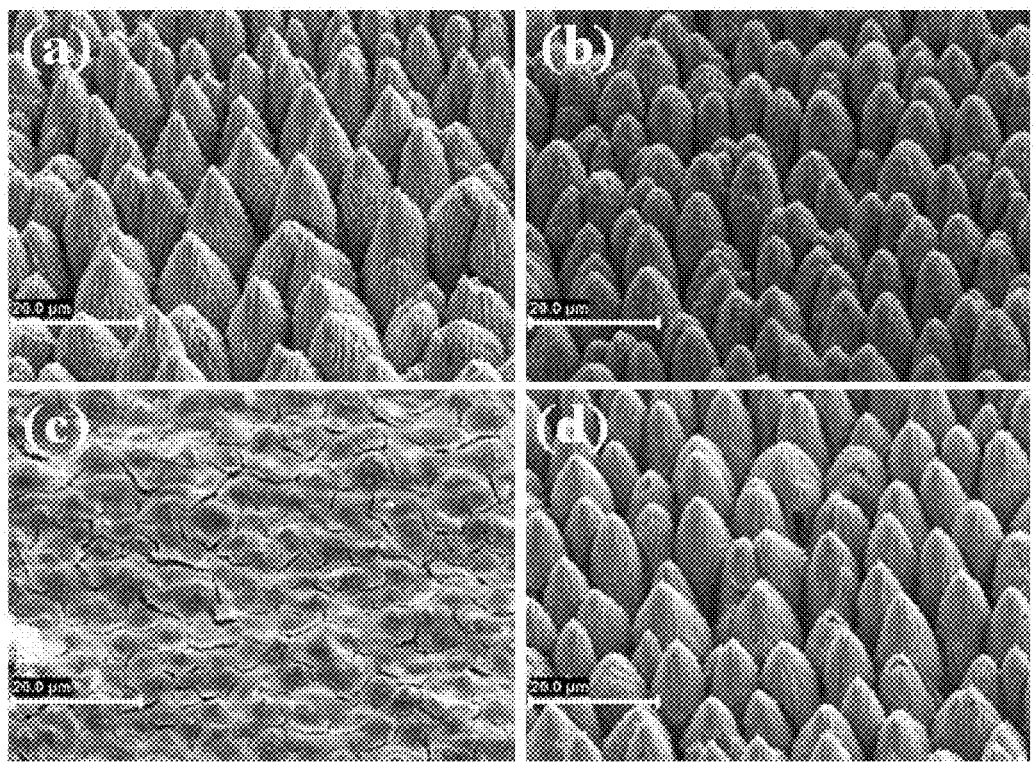
FIG. 33 shows SEM images of titanium surfaces for different background gases after irradiation of laser pulses with a fluence 2.5 J/cm$^2$ and 280 laser shots, with FIG. 33(a) illustrating the results for a vacuum of around 1 mbar, FIG. 33(b) illustrating the results for air at atmospheric conditions, FIG. 33(c) illustrating the results for 100 mbar SF$_6$, and FIG. 33(d) illustrating the results for 100 mbar He.
Figure 34:
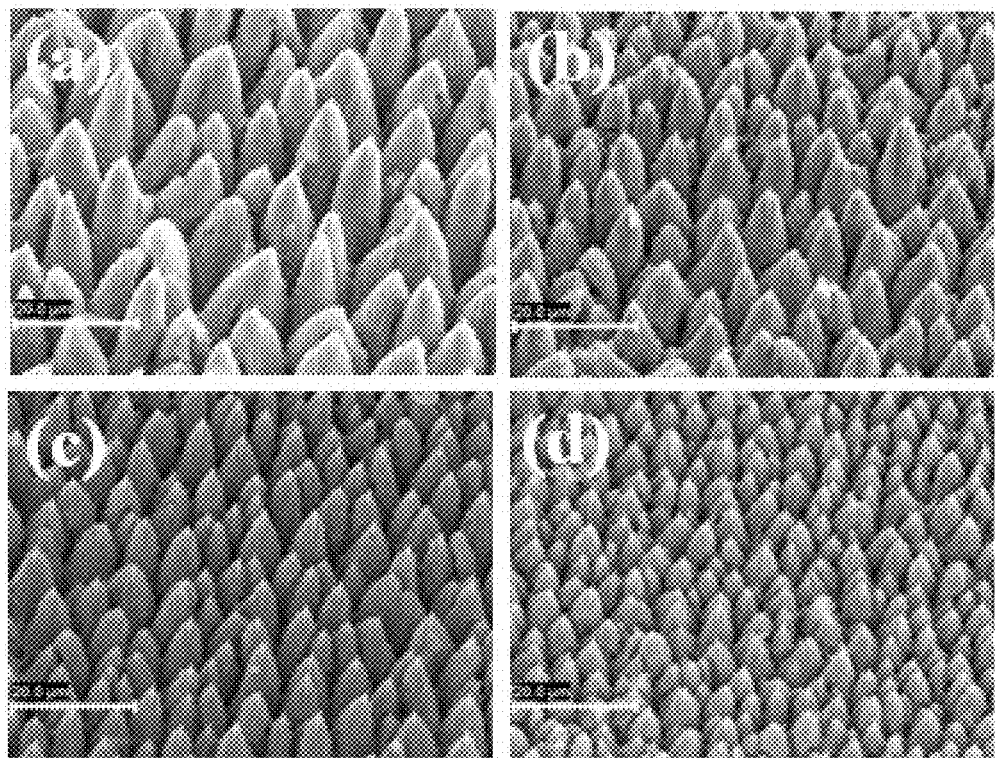
FIG. 34 shows SEM images of titanium surfaces under different pressures of Helium after irradiation of laser pulses with a fluence of 2 J/cm$^2$, with FIG. 34(a) illustrating the results for 50 mbar, FIG. 34(b) illustrating the results for 100 mbar, FIG. 34(c) illustrating the results for 400 mbar, and FIG. 34(d) illustrating the results for 800 mbar.
Figure 35:
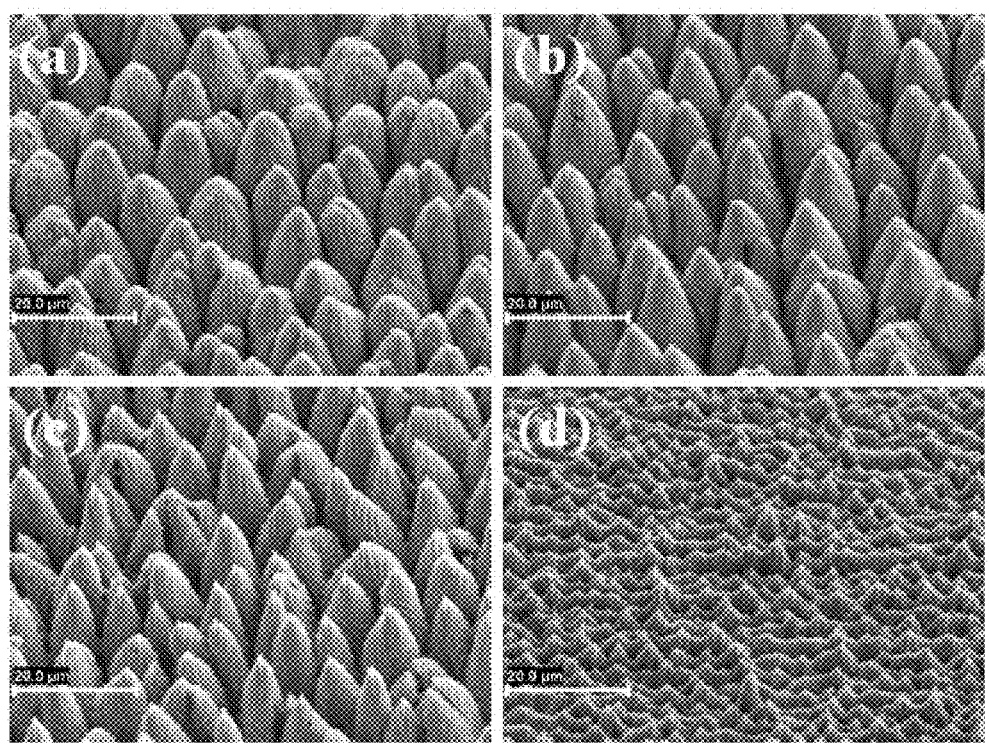
FIG. 35 shows SEM images of titanium surfaces after irradiation of laser pulses with a fluence of 2.5 J/cm$^2$ in a helium pressure of 100 mbar, with FIG. 35(a) illustrating the results for 560 laser shots, FIG. 35(b) illustrating the results for 280 laser shots, FIG. 35(c) illustrating the results for 140 laser shots, and FIG. 35(d) illustrating the results for 55 laser shots.
Figure 37A:
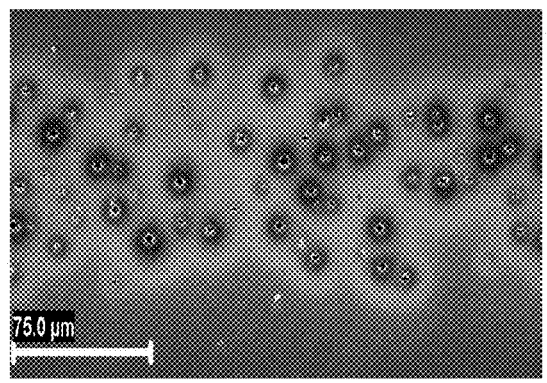
FIG. 37 shows nanopores formed on silicon, with FIG. 37(a) illustrating a scale of 75 µm, FIG. 37(b) illustrating a scale of 10 µm, FIG. 37(c) illustrating a scale of 500 nm, and FIG. 37(d) illustrating a scale of 300 nm.
Figure 37B:
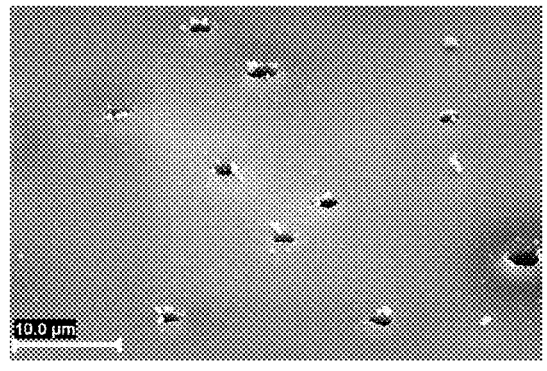
Figure 37C:
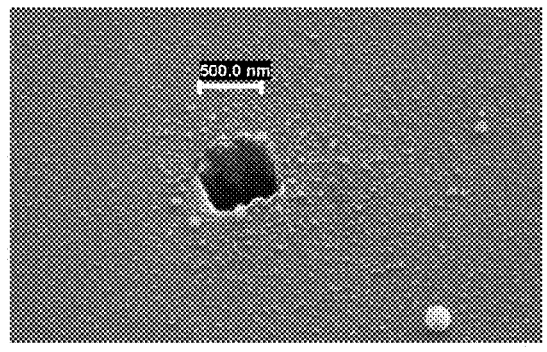
Figure 37D:
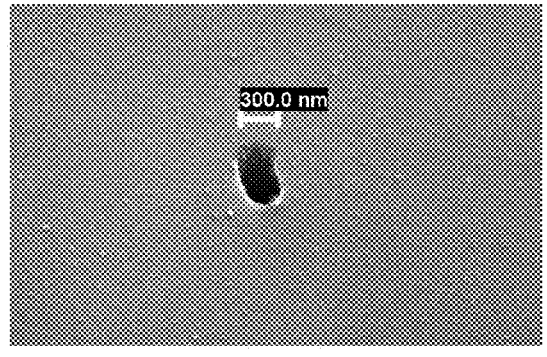

The altered surfaces would also be beneficial in catalytic activity, as schematically illustrated in FIG. 29. The large surface area created by texturing provides many sites for enhanced chemical activity, such as catalytic activity. These catalytic activities would be useful in fuel cell technology, chemical plants, and biomedical applications, including conversion of carbon monoxide to carbon dioxide. The large surface area can also be used for enhanced tissue growth and control. The altered surfaces would also be beneficial in bond strength improvement. The large surface area created by texturing allows more sites for bonding and interlocking, and improves the overall bond strength.

The altered surfaces would also be beneficial in thin film or fibrous whisker growth. Due to the formation of nanospikes or microspikes, it is possible to utilize a large number of tips for growth of other materials atop these tips, as schematically illustrated in FIG. 29. Also, because a small voltage can provide a high electric field, the growth can be controlled by the electric field.

The altered surfaces would also be beneficial in the production of nano or micro tips, as schematically illustrated in FIG. 29. Because the texturing process produces a large array of two-dimensional structures, micro or nano ordered tips can be fabricated. The nanospikes can be solid or hollow. These tips can be used in atomic force microscopy, optical data storage, and fluid control for automobiles and drug delivery.

The altered surfaces would also be beneficial in the development of nanostructures. The sharp nano/micro tips of the altered surface could be used for the growth and application of quantum dots, nanorods, nanotubes and whiskers.

The altered surfaces would also be beneficial in surface-enhanced Raman scattering. The Raman scattering method can be used to detect chemical or biochemical species. Usually Raman scattering signals are relatively low, but a Raman signal can be enhanced by many orders of magnitude by surface-enhanced Raman scattering. Laser textured surfaces coated with metals could provide an ideal template for surface-enhanced Raman scattering for sensor applications, such as single molecule detection. The altered surfaces would also be beneficial in biosensor applications. As schematically illustrated in FIG. 29, specific molecules can be attached atop the tips, and can be used for chemical or biochemical detection, by using methods such as fluorescence and phosphorescence.

The altered surfaces would also be beneficial in bond strength improvement. The large surface area created by the claimed texturing process allows more bond sites for bonding and interlocking. This leads to overall improvement in bond strength. The textured surface could also have an adhesive layer for bond strength improvement.

Figure 28:
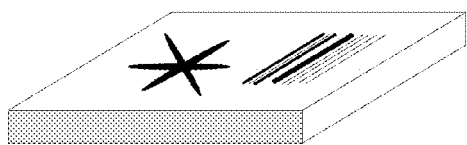
FIG. 28 is a schematic representation of surface marking created by surface alternations, according to exemplary embodiments of the present invention.

The altered surfaces would also be beneficial in manufacturing optical elements. As schematically illustrated in FIGS. 24 and 28, various optical elements, such as diffraction gratings, low scattering surfaces, and antireflection surfaces can be prepared by texturing the optical element surface. Also, light absorption properties can be tailored by adjusting the laser parameters and thermal annealing conditions.

The altered surfaces would also be beneficial in photonic crystals. Photonic crystals are increasingly used for optoelectronic applications, such as wavelength selection and fabrication of negative refractive index materials. Periodic textured surfaces fabricated by laser texturing would be useful in these photonic crystals. The altered surfaces would also be beneficial in producing masters for replication. A textured surface can be used as template for transferring a pattern to a softer material by using mechanical pressure, with or without heat. This can provide a very low cost process for pattering surfaces such as compact discs. This process can also be used for transferring patterns to polymerics and biomaterials.

The altered surfaces would also be beneficial in fabricating mask-less periodic structures. By using an optical interference technique, periodic textured surfaces can be fabricated with a sub-micron period, without any mask fabrication. The altered surfaces would also be beneficial as masters for replication. The textured surfaces could be used as a template for the transfer of patterns to softer materials using mechanical pressures, heat or a combination thereof. This can provide a very low cost process for patterning surfaces similar to compact disks. This process can also be used for transferring patterns to polymeric and biomaterials. The altered surfaces would also be beneficial in pixelated devices. Some optoelectronic and microelectronic devices, such as CCD cameras, diode lasers, and light emitting diodes, require a two-dimensional geometry. Two-dimensional textured surfaces can be easily fabricated for optoelectronic and microelectronic applications. The altered surfaces would also be beneficial in producing substrates for single crystal film or nanoparticle growth.

The altered surfaces would also be beneficial in nano or micro pores. Textured surfaces can be further processed with chemical etching to provide a large number of nano or micro pores, which can be used for filtration or fluid flow control. Pores can be made by the laser texturing process if thin substrates are used, or if longer processing times are used. The altered surfaces would also be beneficial in controlling surface emissivity. By adjusting the surface texture, the surface emissivity and spectral properties can be controlled. This can provide camouflage objects, because such objects are harder to detect if they emit a low radiation signal.

The altered surfaces would also be beneficial in art and photography applications. As schematically illustrated in FIG. 28, laser texturing of surfaces can be used to write text and images on surfaces by controlling the light reflectivity of the surface. This technique can be used to produce name plates, part identification, hidden logos, trademarks, logos, and images. The texturing provides a black color, which produces a very high contrast between the written and unwritten areas. The process of the present invention can also be used to control the gray level in forming high definition images.

The altered surfaces would also be beneficial in radiation shielding. Laser textured surfaces provide a very good method for controlling radiation scattering, reflection, absorption, and transmission over a broad spectral range, including visible, infrared, microwave, terahertz, and radio waves.

The altered surfaces would also be beneficial in plasma applications. Sharp tips can provide a very high electric field, and hence can be used for localized or large area generation of plasma sources. These plasma sources can be used to purify water, kill germs, and destroy bio-chemical agents.

The altered surfaces would also be beneficial in protecting substrates from corrosion, and improving adhesion, such as epoxy adhesion to a metal surface. They can also be used to improve the adhesion of thin films to a surface, such as a TiN coating on drill bits, which would extend the lifetime of the drill bits.

The altered surfaces would also be beneficial in numerous biomedical applications. The altered surfaces would be beneficial in bone grafting applications. Body implants can become detached from the host tissue, due to inadequate biocompatibility and poor osteointegration. Using laser texturing to change the surface chemistry and/or physical texture of the implants can improve the biocompatibility and adhesion. The altered surfaces would be useful in stents. The nano/micro texture could control the fluid flow. Also, it may increase the compatibility of the stent due to the textures increased surface area. The altered surfaces would also be useful in drug or agent delivery, or other medium delivery or medium storage as desired or required. The nanospikes could be solid or hollow allowing for a 2-D array of tips that can be used for fluid flow or drug delivery control (or any other medium delivery or storage).

The altered surfaces would also be beneficial in controlling the tribological properties of materials, such as friction, wear resistance, load-bearing properties, and lubrication. The textured surface can act as a micro-hydrodynamic bearing, a micro-reservoir for a lubricant, or a trap for debris particles generated during a sliding or other motion. This could result in significant friction reduction in piston rings. Similarly, laser texturing of cylinder liners in the interior of an engine compartment could reduce wear, friction, oil consumption, and gas emissions.

Instead of performing the laser texturing method in chemical gases, the method could be performed in the presence of gaseous plasma. Because charged species in gaseous plasma can be very reactive, laser irradiation in the presence of gaseous plasma will provide a much faster speed for texture formation, and further enable control of surface properties. Plasma sources can be created by various methods, such as excitation with a radio frequency (RF) source, direct current (DC), alternating current (AC), or a laser system. This approach provides a method for multi-energy processing technology, where electrical energy for plasma or discharge creation, laser irradiation for melting and ablation, and chemical energy by the gaseous environment are utilized to enhance the process and the control of the surface properties. Also, the sample can be kept at elevated temperatures, or the sample surface can be irradiated by an infrared lamp to raise the surface temperature, in order to enhance the chemical reactions or reduce the laser energy. In addition, plasma or ion etching methods are commonly used for semiconductor chip fabrication and preparation of samples for transmission electron microscopy. The addition of ultrafast pulsed laser energy could be used to further enhance this process.

Combining the laser texturing method with various other processes would also be beneficial. For example, a one-step process for doping, texturing, and crystallization would be advantageous from a manufacturing standpoint. Also, laser texturing and laser surface cleaning could be combined to provide a one-step process. In addition, laser texturing and surface passivation could be performed as a one-step process. The chemical gas used in laser texturing could provide the surface passivation by sulfur or phosphorous diffusion. Finally, laser texturing could be performed in a one-step process with surface hardening. For example, the surface of steel can be textured, and if a reactive gas such as ammonia or nitrogen plasma is used, surface nitridation can be achieved. This provides improved surface properties, such as wear, wetting characteristics, and chemical interactions.

The foregoing description and drawings should be considered as only illustrative of the principles of the present invention. The present invention may be configured and performed in a variety of ways, and is not intended to be limited by the exemplary embodiments discussed herein. Numerous applications of the present invention will readily occur to those skilled in the art who consider the foregoing description. Therefore, the present invention is not to be limited to the specific examples disclosed, or the construction and operation shown and described. Rather, all suitable modifications and equivalents are within the scope of the present invention, as defined in the appended claims.

EXAMPLES

Practice of an aspect of an embodiment (or embodiments) of the invention will be still more fully understood from the following experimental results, which are presented herein for illustration only and should not be construed as limiting the invention in any way.

Example and Experimental Results Set No. 1

Both side polished Si(100) wafers (p-type, resistivity 1 ohm·cm) were diced into small pieces (1 $cm^2$) and ultrasonically cleaned with acetone and methanol. One such piece was put on a stage inside a vacuum chamber mounted on a high precision computer controlled X-Y stage. The experiments were carried out in vacuum (with base pressure ~1 mbar). The samples were exposed to 170 µJ pulses of 337 nm wavelength and 3.5 ns pulse duration at a repetition rate of 20 Hz from a nitrogen laser (Stanford Research Systems model NL 100). The laser beam was focused along the normal onto the sample surface by a 35 mm focal length lens. The spatial profile of the laser pulse was nearly rectangular with slight variation of intensity along the longer side of the rectangular shape. Laser fluence was calculated using the spot size determined by exposing a point on the sample surface to thousands of laser shots. The measured spot size was about 50 µm by 200 µm. In order to scan an area bigger than the laser spot size, the samples were translated under laser beam using a motorized X-Y stage. Scanning also assists to make more uniform surface micro texture by smoothing out any shot-to-shot irregularities in the beam profile. By varying the scan speed of the X-Y stage, the number of laser pulses impinging on the sample surface at a particular spot was controlled. After laser processing the samples were analyzed by scanning electron microscope (SEM) (Zeiss SUPRA 40), energy dispersive X-ray spectroscopy system (EDX) (INCA x-Sight, model 7426), X-ray diffraction (PAN Analytical XPERT PRO; K-Alpha=1.54060 Å) and surface profiling (Vecco Dektak profilometer).

Total integrated scattering (TIS) (sum of specular reflection, scattering and transmission) values were obtained using a 6 inch integrating sphere (Labsphere Inc. Model# RTC-060-SF) with spectraflect coating. A helium-neon laser operating at 633 nm and a diode laser operating at 1615 nm were used as the light sources for scattering measurements. The microtextured samples were mounted in the center of the sphere using a jaw and clip type center mount holder, enabling the measurement of TIS as a function of angle. TIS was calculated by measuring the signal from the sample and normalizing it with a calibrated reflectance standard. A silicon detector (Newport Corp. model#818-SL) and a germanium detector (Newport Corp. model#818-IR-L) with a power meter (Newport Corp. model#1830-C) were used to measure the incident and reflected powers.

Figure 38:
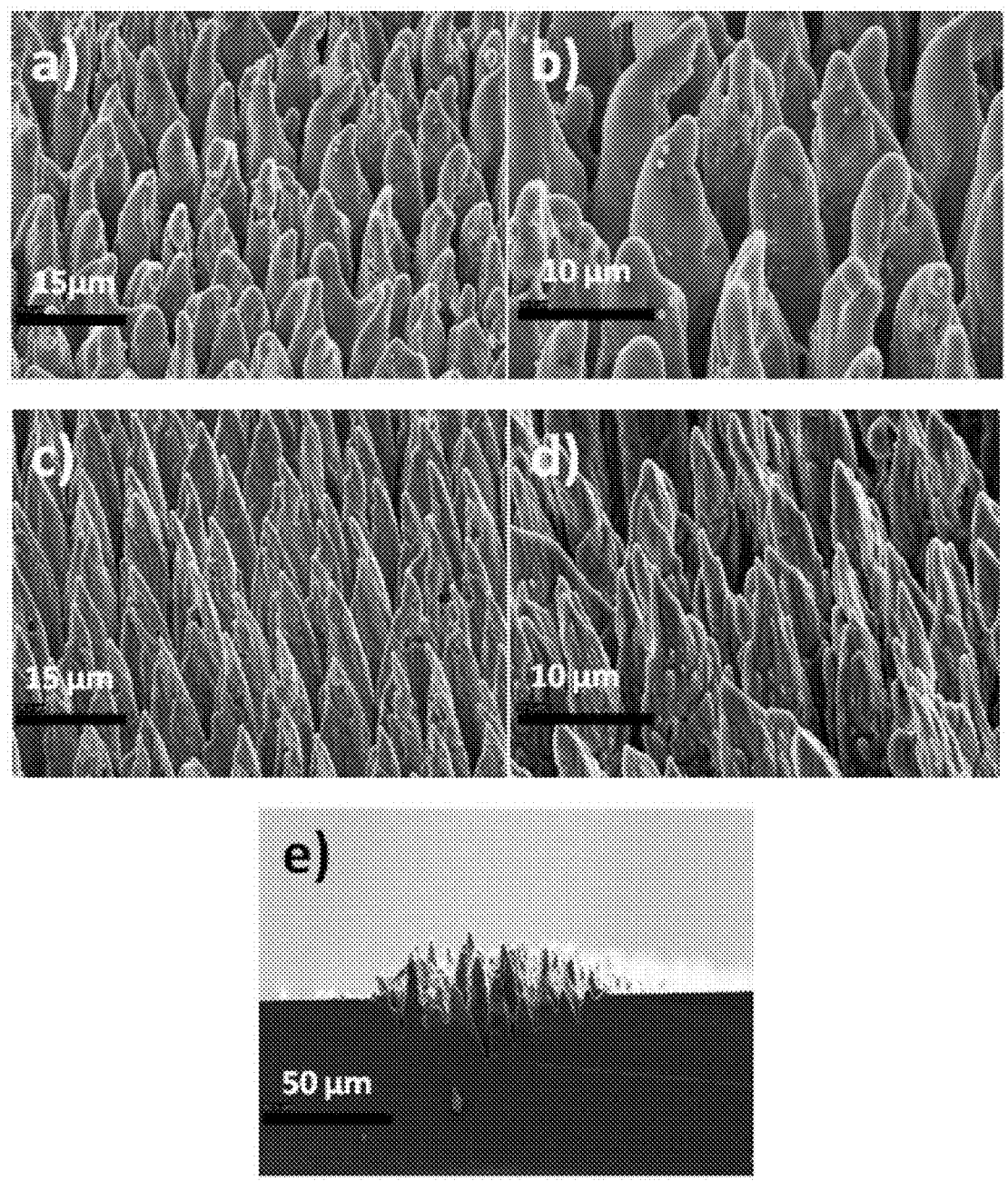
FIG. 38 shows SEM images of a silicon surface, with FIG. 38(a) laser treated sample in vacuum at a laser fluence of 2 J/cm$^2$ and an average number of laser shots of 100.

FIG. 38(*a*) shows the SEM image of nanosecond laser treated Si surface in vacuum. It is evident from FIG. 38 that nearly regular arrays of cone-like micro texture were formed due to laser exposure. The micro texture was self-organized under the exposed laser spot. Larger area (10 mm×10 mm) covered with these micro textures was obtained by scanning the surface under the laser beam. Laser treated surfaces look black to bare eyes indicating that surface reflectivity has been greatly reduced. Surface micro texture shown in FIG. 38(*a*) was prepared by exposing the silicon surface to an average of 100 laser shots at a fluence of ~2 J/$cm^2$ in vacuum. FIG. 38(*b*) shows a higher magnification image of FIG. 38(*a*). The average microtexture height was ~15 µm and base diameter ~10 µm and tip-to-tip separation ~8 µm. The surface of the cone-like structures was very smooth and the amount of laser ablated particles is considerable less compared to the microtextures formed using femtosecond lasers. FIG. 38(*c*) shows the micro texture formed in the presence of 1000 mbar $SF_6$ when all other experimental conditions were kept same as for FIG. 38(a). FIG. 38(d) shows a higher magnification image of FIG. 38(c). These microtextures were sharper and relatively taller compared to that of vacuum, however, the surface of these microstructures was not very smooth. Nanosecond laser produced structures appear much smoother in general when compared to femtosecond laser produced structures.

In order to study the effect of spatial fluence variation across the laser spot, a line scan was created and then it was cross-sectioned. An SEM image of the cross-section is shown in FIG. 38(e). The micro-texture heights vary with the laser fluence across the laser pulse. The micro-texture height variation responds to the spatial intensity variation across the laser pulse. Therefore, overlapped scanning is essential to obtain large area uniform micro-texture. These cross-sectional images show that there are no micro-cavities inside the conical micro-textures which are sometimes found in ultrafast laser texturing process. FIG. 38(e) also shows that the cone-like structures protrude above the initial Si surface. This observation is similar to the results when the micro texturing was done in the presence of reactive gases like $SF_6$ and HCl.

Figure 39:
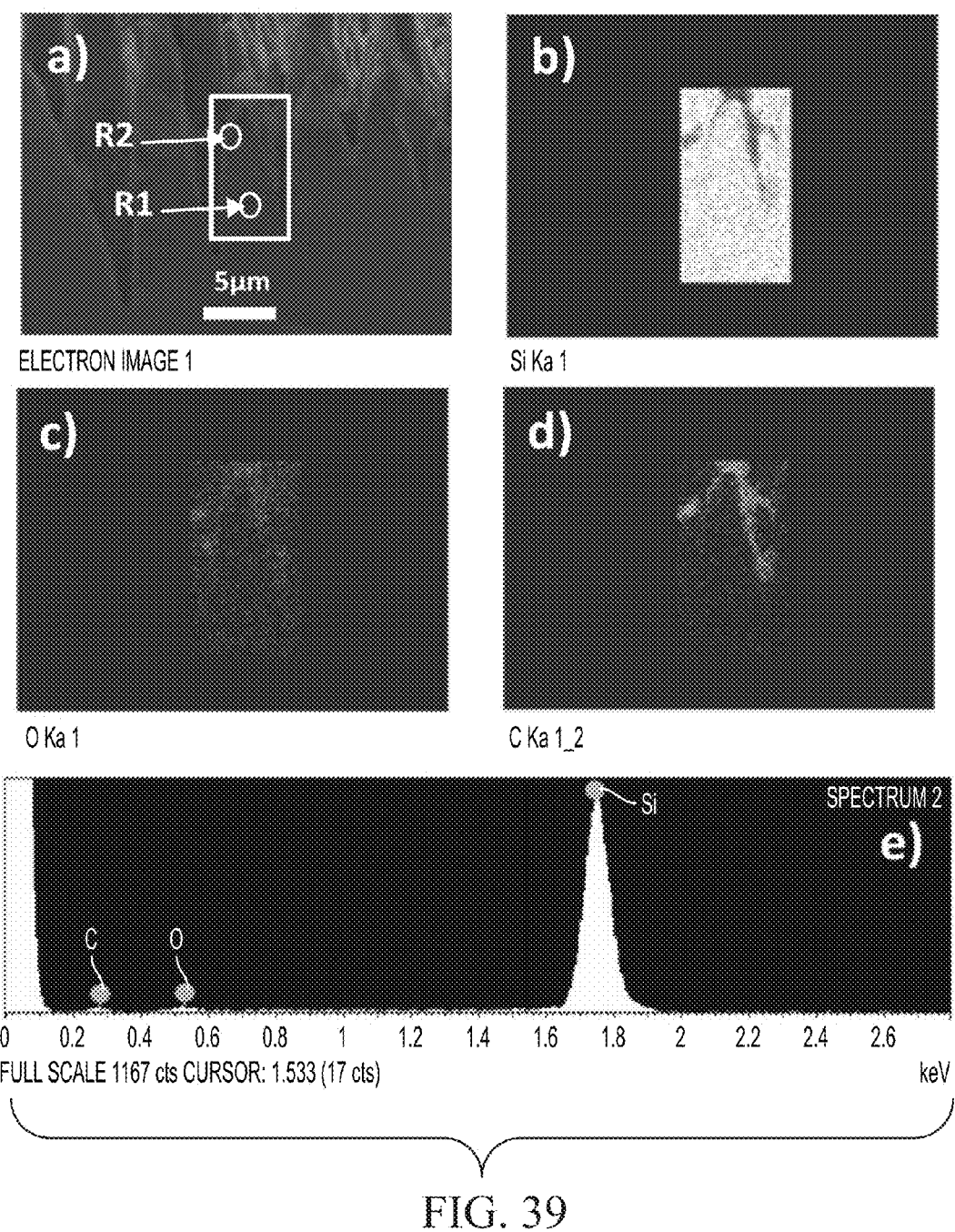
FIG. 39 shows EDX maps acquired from the cross-sectioned conelike microstructure.
Figure 41:
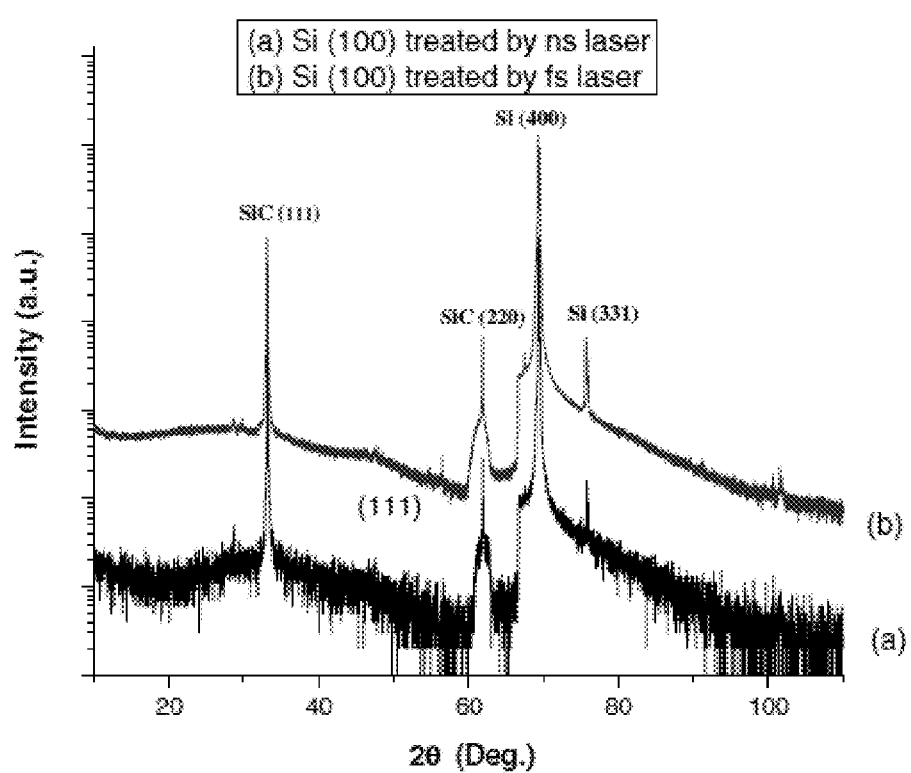
FIG. 41 shows the X-ray diffraction spectrum from (a) nanosecond laser textured Si and (b) femtosecond laser textured Si.

Laser process leading to the formation of self-organized conical micro textures are usually carried out in the presence of reactive gases like $SF_6$ or HCl. Under the intense laser irradiation, $SF_6$ dissociates into radicals that assist in etching of silicon during micro-texturing process. It has been shown that sulfur diffuses deep into the cone-like microstructures during femtosecond laser processing and is expected to go even deeper for nanosecond laser interaction. This impurity incorporation is undesirable for solar cell fabrication, and hence we micro textured large area samples in vacuum. Since the experiments are carried out in low vacuum (~1 mbar) conditions, to investigate impurity incorporation, EDX mapping was used to detect the presence of oxygen, carbon and silicon. FIG. 39(a) shows SEM image of the cross-section of cone-like microstructure. The rectangular area shown in FIG. 39(a) is the mapped region for EDX. FIG. 39(b) shows the silicon map, 39(c) the oxygen map, 39(d) the carbon map, and 39(e) the spectrum acquired over the rectangular region shown in 39(a). FIG. 39 (c) and (d) shows that the presence of the oxygen and carbon was mostly limited to the surface. In order to access the impurity concentration in the core of the cone-like microstructure and toward the surface, point maps were taken (3 µm diameter circular spot) of the region indicated as R1 and R2 in FIG. 39(a). The atomic percentages for O, C, and Si for the rectangular area scan as well as the point scans are tabulated in FIG. 40. As shown in the table and the scan maps, the core of the cone-like microstructures remained free from any contamination. While carbon and oxygen contamination can come from exposure to atmosphere where oxygen can react readily to micro/nano features produced by laser processing. Additionally, carbon on the surface can come from the handling of sample as the samples were not chemically cleaned after laser processing. Oxygen and carbon present on the surface can be easily removed by a post chemical cleaning. This finding is particularly important for photovoltaic application where impurity incorporation can cause minority carrier recombination causing poor device performance. Another important consideration for device application is the crystalline nature of the laser micro textured surface. In order to investigate the crystalline properties of laser treated surfaces, X-ray diffraction on femtosecond- and nanosecond-laser micro-textured samples was performed and found that both form multi-crystalline phases as shown in FIG. 41.

Figure 42A:
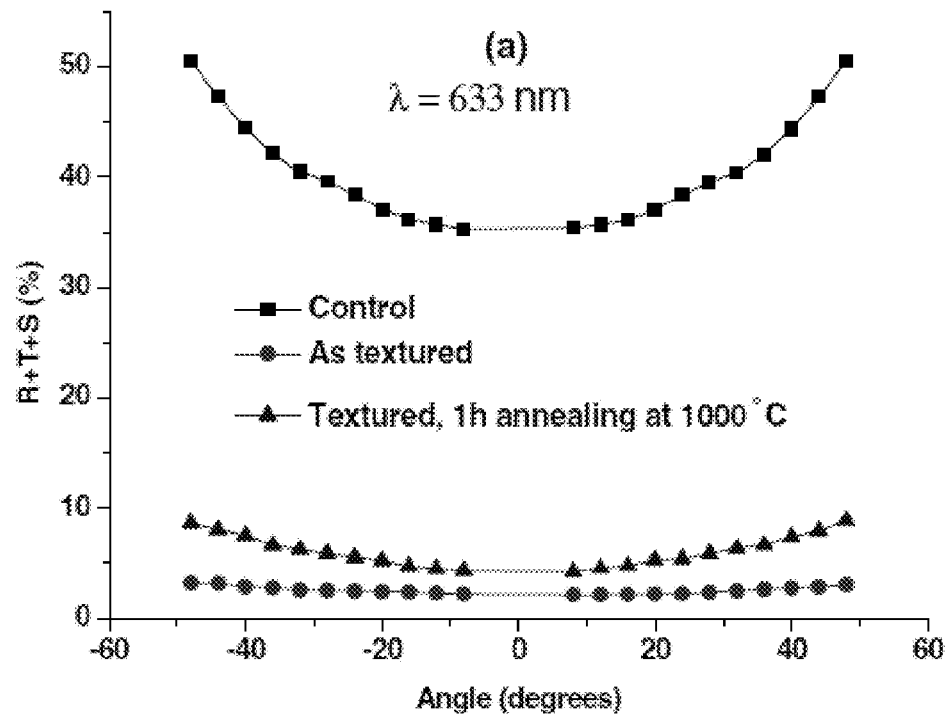
FIG. 42 Shows the total integrated scattering (TIS) as a function of angle for FIG. 42(a) 633 nm and FIG. 42(b) 1615 nm wavelengths.
Figure 42B:
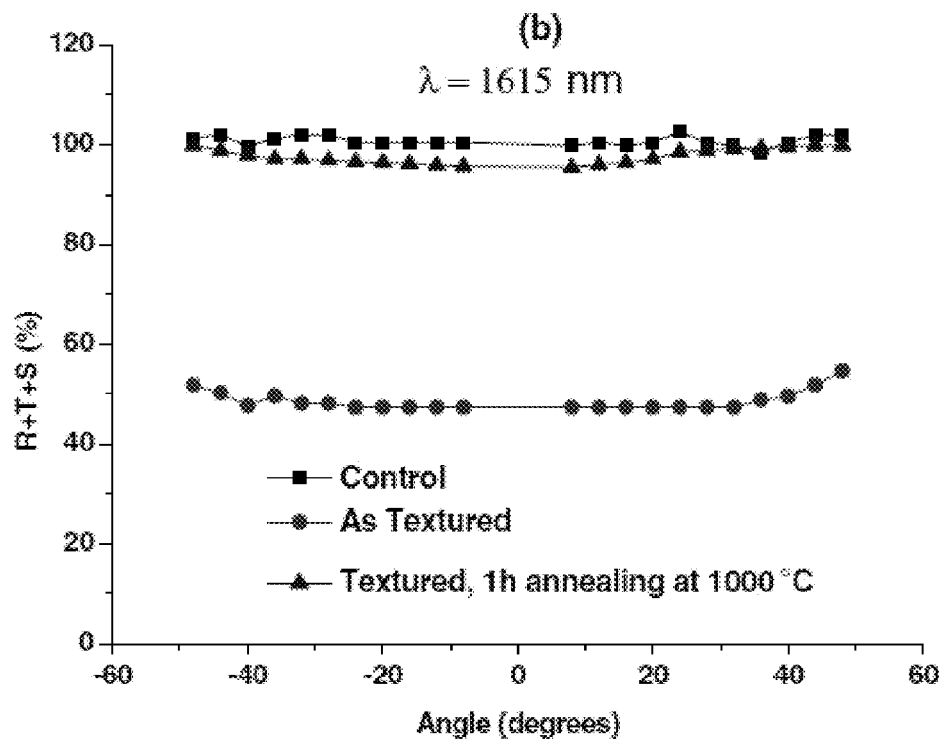

In order to investigate the optical properties of laser micro-textured samples prepared in vacuum, TIS measurements were taken of the sample. FIGS. 42(a) and 42(b) show the TIS as a function of angle for 633 nm and 1615 nm wavelengths, respectively. For as-micro-textured surface, the TIS was <3% over a wide angle of incidence for 633 nm. This result is very consistent with results from femtosecond-laser-micro textured surfaces for Si in $SF_6$. High light absorption results from strong light trapping occurring due to multiple light reflections. In order to investigate the below band-gap optical properties of textured surfaces, we used a 1615 nm wavelength laser and carried out the TIS measurements on as-micro-textured silicon. Around 50% of light is absorbed compared to zero, as expected for control silicon. In previously reported cases, where $SF_6$ was used, the micro textured surfaces showed high absorption for below band-gap wavelengths. Since no $SF_6$ is used for the sample micro texture fabrication, it is obvious that laser induced damage have caused such below band-gap absorption. Since thermal annealing is a well known processing step to anneal the laser induced damage, we subjected the sample for 1 h annealing at 1000° C. and performed the TIS measurements again. It is clear from FIG. 42 that the micro-textured material absorption restores to control sample value after thermal annealing showing TIS of ~100% for 1615 nm light; whereas for 633 nm TIS remains under 5%.

Example and Experimental Results Set No. 2

Figure 44:
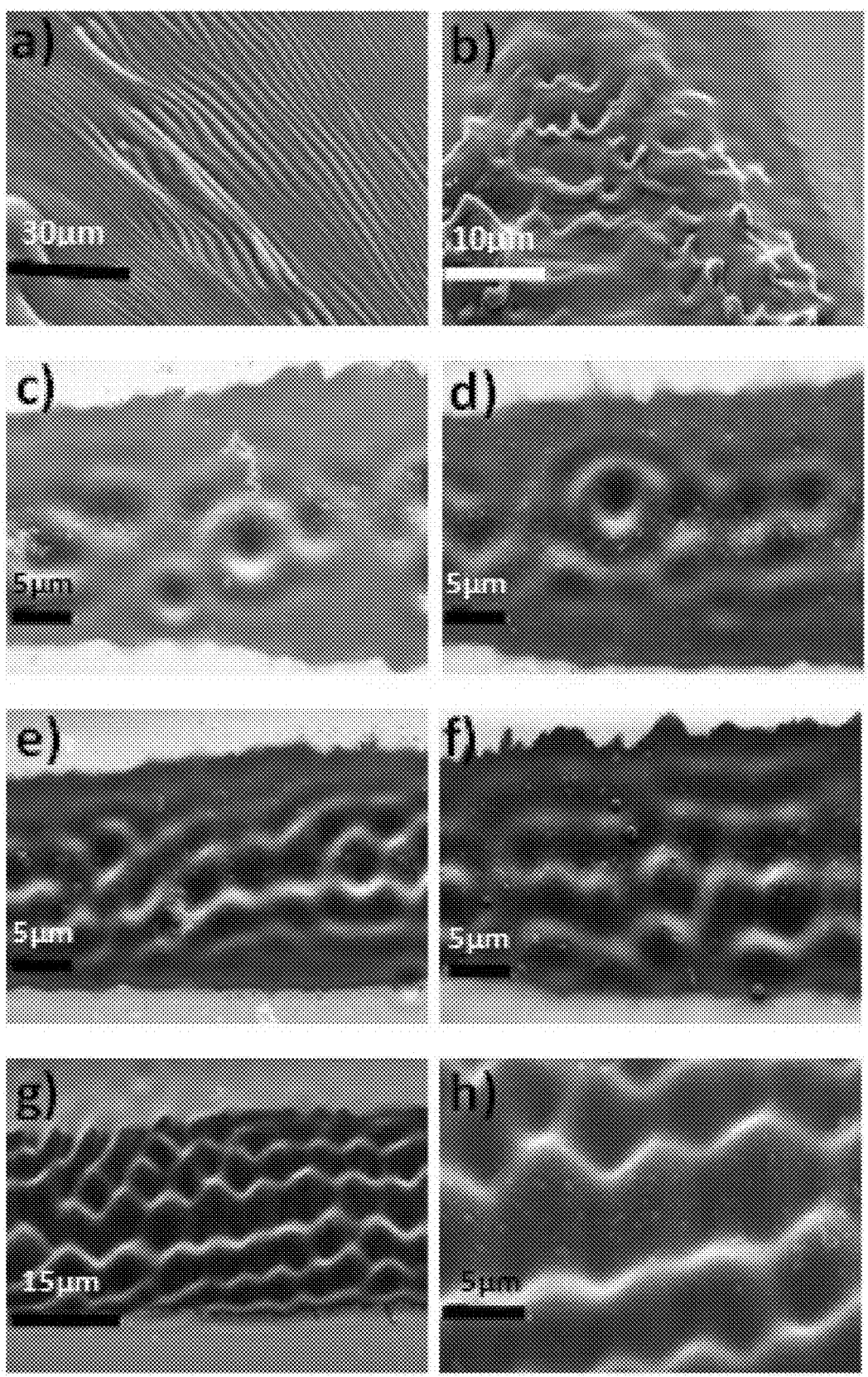
FIG. 44 shows the developments of the microtexture formation in vacuum for a given fluence of 1.6 J/cm$^2$ at different numbers of laser shots.
Figure 45:
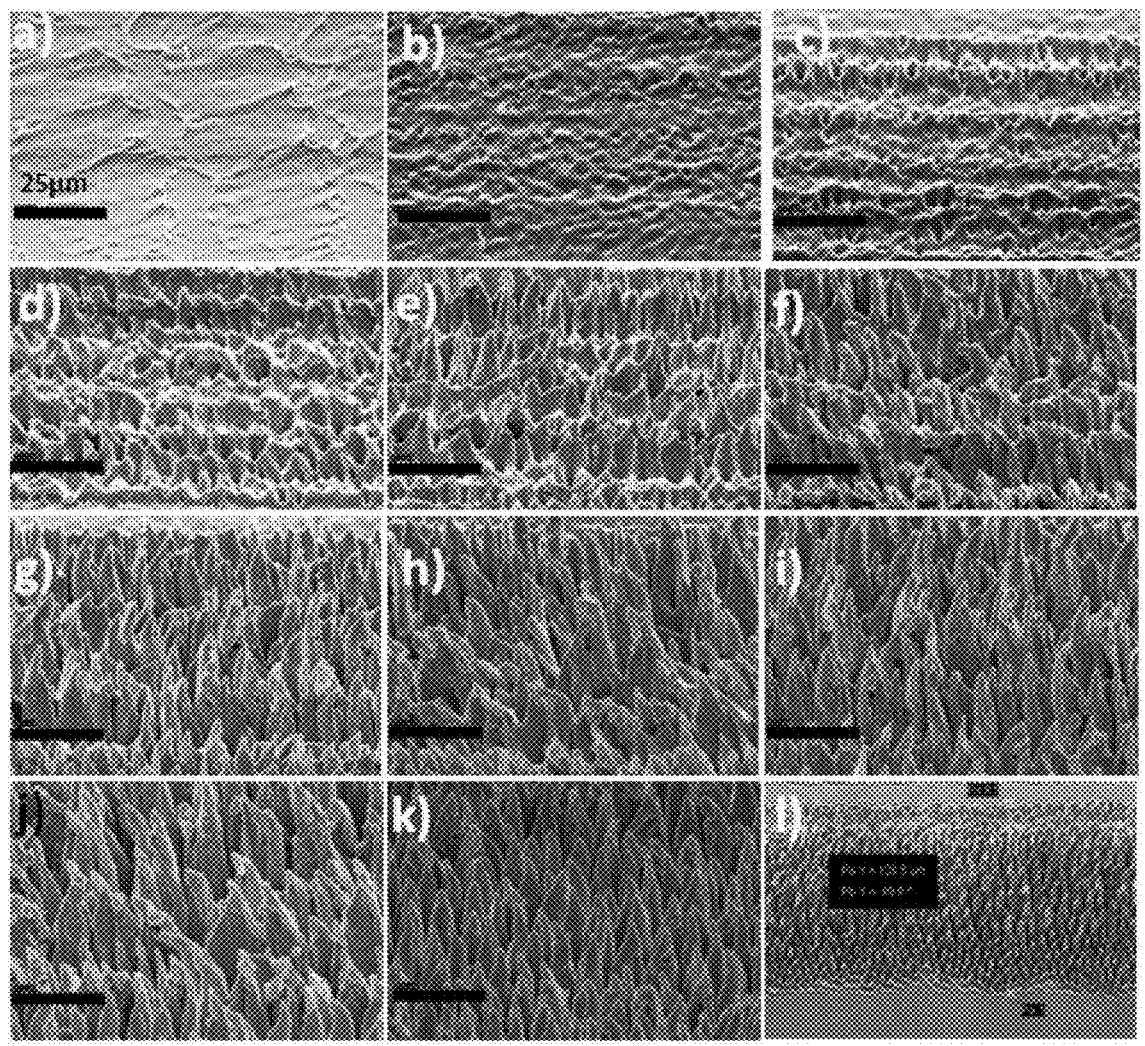
FIG. 45 shows SEM images of laser treated surfaces for different numbers of average laser shots. Laser treatment is carried out in vacuum. The average number of shots for images is FIG. (a) 1, FIG. (b) 10, FIG. (c) 20, FIG. (d) 30, FIG. (e) 40, FIG. (f) 50, FIG. (g) 60, FIG. (h) 70, FIG. (i) 80, FIG. (j) 90, FIG. (k) 100. FIG. (l) Shows a scanned line where the average number of laser shots is kept at 100. The scale bar on the images from FIG. (a) -FIG. (k) is 25 µm. The width of the scanned line shown in FIG. (l) is 128.5 µm. Laser fluence is kept at ~2 J/cm$^2$.

In order to investigate the mechanism of micro-texture evolution in vacuum, single shot experiments were performed where individual spots on a wafer were exposed to a given amount of laser pulses. FIG. 44 shows the evolution of micro-texture formation. Since light absorption of silicon at 337 nm is very high (absorption coefficient ~$1.13 \times 10^6$ cm$^{-1}$), there was significant melting and ablation even with one pulse. A wave like surface pattern emerged for single pulse exposure (see FIG. 44(a)). As the pulse number increased (see FIGS. 44(b)-(h)) more and more roughness appeared on the surface. After 50 laser shots (FIG. 44(c)) many collapsed bubble like structure could be observed on the surface. After 80 laser shots (FIG. 44(f)), micro-texture emerged which eventually turned into cone-like structures with subsequent laser shots. Lowndes et al, observed similar early stage growth in silicon using excimer laser in air and $SF_6$ environments. Similarity of these observations points to the fact that early stage evolution of these micro-textures may not depend on the gaseous environments, although presence of reactive gases can enhance chemically induced etching process. In order to gain insight into the formation of fully-grown cone-like microstructures in vacuum, line scans were performed with different scan velocities such that average number of laser shots could be varied (see FIG. 45). It became apparent from the figure that there is a critical number of laser shots required for the full growth of the micro-texture. For instance, at fluence of 2 J/cm$^2$, around 100 shots were needed to create fully developed cone-like microstructures (see FIG. 45(k)). Staying below this number created microtexture (for example as in FIGS. 45(g)-(j)), however, the microstructures were not well formed and areas of untextured regions was found on the laser scan lines. Therefore, for uniform micro texture formation over large area, accumulation of a sufficient number of laser pulses is needed (see FIG. 45(l)).

Example and Experimental Results Set No. 3

Figure 46:
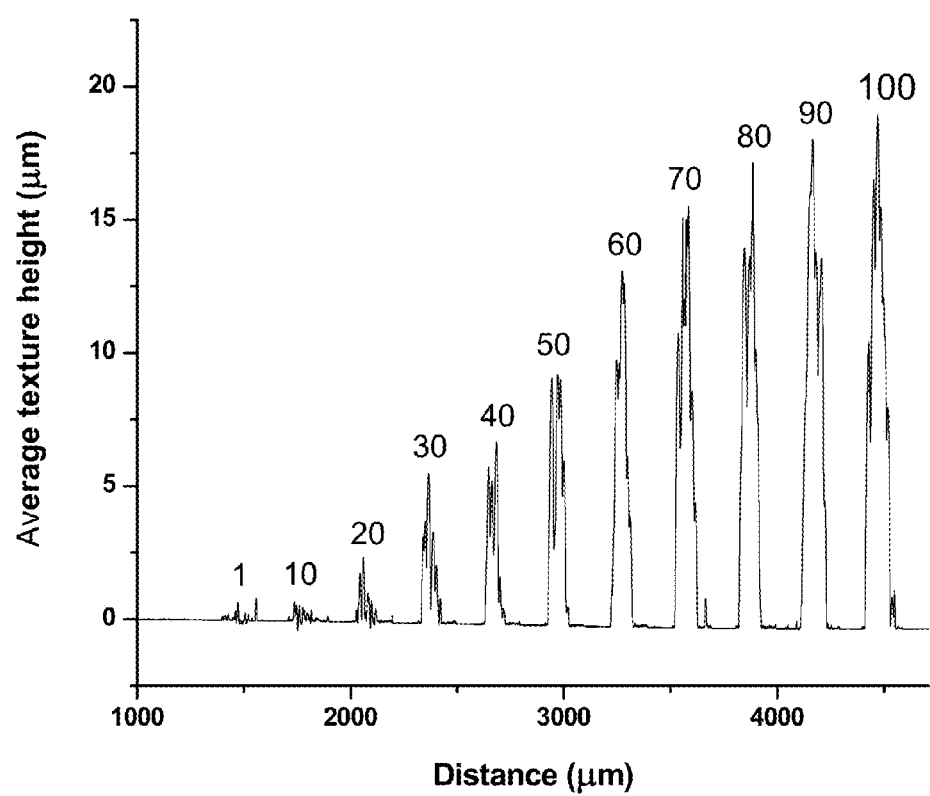
FIG. 46 shows the dependence of average microtexture height on number of laser shots. Average number of laser shots corresponding to each scan line is indicated in the figure.

In order to investigate the effect of number of laser shots (for a given fluence of 2 J/cm$^2$) on the micro-texture height, laser scan lines were created with different velocities so that average number of laser shots could be varied. Since the cone-like micro-textures protrude above the substrate (as evident from FIG. 38(*e*)), a surface profiling was carried out across the lines created for different average number of laser shots. FIG. 46 shows the dependence of average micro-texture height on average number of laser shots. As the average number of laser shots increases, the texture heights also increased. After 100 laser shots, the cone-like micro-textures grew taller and eventually the structures were destroyed.

Example and Experimental Results Set No. 4

After investigating the Si micro texture formation in vacuum as well as in a reactive gaseous environment such as $SF_6$, he laser micro-texturing process was investigated in the presence of non-reactive gas such as nitrogen and air. FIGS. 43(*a*) and 43(*b*) show the SEM images of laser micro-textured surfaces in $N_2$ and air, respectively. Micro-texture formation occurred in both environments; however, in case of $N_2$ the micro-texture was relatively well formed compared to air. Also, in the case of air, there was a significant oxide formation. These results indicate that micro texturing process can be carried out in a non-reactive gaseous environment without the necessity of vacuum chamber.

Additional Examples

Example 1

A method for texturing a surface of a material, comprising: providing a gaseous or vacuum environment in an area around the surface of the material; irradiating a portion of the surface with laser pulses, wherein the laser pulses have: a laser pulse energy density of about 0.05 $J/cm^2$ to about 5 $J/cm^2$, a wavelength of about 200 nm to about 2000 nm, a pulse width greater than 0 ns and less than about 30 ns; and wherein the method produces a periodic array of pillars or a non-periodic array of pillars on the surface, resulting in changes in properties of the surface.

Example 2

The method of example 1, wherein the laser pulses are sent at a repetition rate of about 1 Hz to 100 MHz.

Example 3

The method of example 1 (as well as subject of example 2), wherein the laser pulses are sent at a repetition rate of about 20 Hz to 600 kHZ, Example 4

The method of example 1 (as well as subject matter of one or more of any combination of examples 2-3), wherein the laser pulses are sent at a repetition rate of about 10 Hz to 40 Hz.

Example 5

The method of example 1 (as well as subject matter of one or more of any combination of examples 2-4), wherein the laser pulses are sent at a repetition rate of about 500 kHz to 700 kHz.

Example 6

The method of example 1 (as well as subject matter of one or more of any combination of examples 2-5), further comprising the step of: annealing the surface at less than about 1,500 degC after laser texture.

Example 7

The method of example 6 (as well as subject matter of one or more of any combination of examples 2-6), where the annealing occurs for a duration from about 1 second to about 2 hours.

Example 8

The method of example 6 (as well as subject matter of one or more of any combination of examples 2-7), where the annealing occurs for a duration from about 1 second to about 1 hour.

Example 9

The method of example 6 (as well as subject matter of one or more of any combination of examples 2-8), where the annealing occurs for a duration from 1 second to about 10 minutes.

Example 10

The method of example 1 (as well as subject matter of one or more of any combination of examples 2-9), wherein the laser spot size is about 50 um to about 200 um having a substantially uniform energy distribution.

Example 11

The method of example 1 (as well as subject matter of one or more of any combination of examples 2-10), wherein the laser spot size on the surface is between about 3 um to 8 mm by between about 3 um to 8 mm.

Example 12

The method of example 1 (as well as subject matter of one or more of any combination of examples 2-11), wherein the laser spot size on the surface has an area of about 10,000 $um^2$ having a substantially uniform energy distribution.

Example 13

The method of example 1 (as well as subject matter of one or more of any combination of examples 2-12), wherein the laser pulses have a wavelength of about 300 nm to 400 nm.

Example 14

The method of example 1 (as well as subject matter of one or more of any combination of examples 2-13), wherein the laser pulses have a laser pulse energy density of about 1.6 $J/cm^2$ to 2 $J/cm^2$.

Example 15

The method of example 1 (as well as subject matter of one or more of any combination of examples 2-14), wherein the laser pulses have a pulse width of about 3.5 ns.

Example 16

The method of example 1 (as well as subject matter of one or more of any combination of examples 2-15), wherein the laser pulses have a pulse width of about 1 ns.

Example 17

The method of example 1 (as well as subject matter of one or more of any combination of examples 2-16), further comprising the step of: moving at least one of the surface or the laser beam relative to each other to allow the laser pulses to irradiate a surface area larger than the laser beam spot size.

Example 18

The method of example 1 (as well as subject matter of one or more of any combination of examples 2-17), wherein the material surface comprises at least one of the following: semiconductor material, metallic, dielectric material, alloy material, or polymer material.

Example 19

The method of example 1 (as well as subject matter of one or more of any combination of examples 2-18), wherein the laser pulses have: about 1 to 120 laser pulses to irradiate the material, the wavelength of about 337 nm, the pulse energy density of about 1.6 J/cm$^2$ to 2 J/cm$^2$, and the pulse width of about 3.5 ns.

Example 20

The method of example 19 (as well as subject matter of one or more of any combination of examples 2-19), wherein the number of laser pulses is about 100.

Example 21

The method of example 1 (as well as subject matter of one or more of any combination of examples 2-20), wherein the laser pulses have: about 80 to 120 laser pulses to irradiate the material.

Example 22

The method of 21 (as well as subject matter of one or more of any combination of examples 2-21), wherein the number of laser pulses is about 100.

Example 23

The method of using the textured surface of example 1 (as well as subject matter of one or more of any combination of examples 2-22) to provide a high-efficiency heat sink for an electronic or optoelectronic device.

Example 24

The method of using the textured surface of example 1 (as well as subject matter of one or more of any combination of examples 2-23) to provide a very high electric field for electron emission.

Example 25

The method of using the textured surface of example 1 (as well as subject matter of one or more of any combination of examples 2-24) to generate catalytic activity.

Example 26

The method of using the textured surface of example 1 (as well as subject matter of one or more of any combination of examples 2-25) to perform osteointegration of a body implant.

Example 27

The method of using the textured surface of example 1 (as well as subject matter of one or more of any combination of examples 2-26) to control the flow of air or fluid over the surface.

Example 28

The method of using the textured surface of example 1 (as well as subject matter of one or more of any combination of examples 2-27) to create a two-dimensional array of micro or nano dimensioned ordered tips.

Example 29

The method of using the textured surface of example 1 (as well as subject matter of one or more of any combination of examples 2-28) to manufacture an optical beam block which absorbs substantially all light from the visible to the far-infrared.

Example 30

The method of using the textured surface of example 1 (as well as subject matter of one or more of any combination of examples 2-29) in micro fluidic applications.

Example 31

The method of using the textured surface of example 1 (as well as subject matter of one or more of any combination of examples 2-30) to provide a radiation shield which operates in a broad spectral range.

Example 32

The method of using the textured surface of example 1 (as well as subject matter of one or more of any combination of examples 2-31) to provide an infrared sensor.

Example 33

The method of using the textured surface of example 1 (as well as subject matter of one or more of any combination of examples 2-32) to provide an element to control light reflection or transmission in an optical device.

Example 34

The method of using the textured surface of example 1 (as well as subject matter of one or more of any combination of examples) to provide a template for optoelectronic devices.

Example 35

The method of example 34 (as well as subject matter of one or more of any combination of examples 2-34), wherein the optoelectronic devices comprises at least one of: photodetector, photovoltaic cell, photoconductive devices, sensor application, sensor, optical device, electronic device, or photonic device.

Example 36

The method of using the textured surface of example 1 (as well as subject matter of one or more of any combination of examples 2-35) to provide an electrical device.

Example 37

The method of example 36 (as well as subject matter of one or more of any combination of examples 2-36), wherein, the electrical device provides at least one of electrical resistance or charge carrier control type.

Example 38

The method of using the textured surface of example 1 (as well as subject matter of one or more of any combination of examples 2-37) to provide a laser device to control optical properties.

Example 39

The method of using the textured surface of example 1 (as well as subject matter of one or more of any combination of examples 2-38) to provide an opto-mechanical device.

Example 40

The method of example 39 (as well as subject matter of one or more of any combination of examples 2-39), wherein the opto-mechanical device provides electrical power conversion for mechanical motion.

Example 41

The method of using the textured surface of example 1 (as well as subject matter of one or more of any combination of examples 2-40) to provide a mechanical device.

Example 42

The method of example 41 (as well as subject matter of one or more of any combination of examples 2-41), wherein the mechanical device can be used to control tribological properties required for the mechanical device.

Example 43

A system (as well as subject matter of one or more of any combination of examples 1-42) for texturing a surface of a material comprising: a gaseous or vacuum environment encompassing the material; a base for retaining the surface; and an energy source configured to provide a radiation source, the radiation source configured to irradiate a portion of the surface with laser pulses. The laser pulses configured to provide: a laser pulse energy density of about 0.05 J/cm$^2$ to about 5 J/cm$^2$; a wavelength of about 200 nm to about 2000 nm; and a pulse width greater than 0 ns and less than about 30 ns; resulting in the formation of a periodic array of pillars or a non-periodic array of pillars on the surface.

Example 44

The system of example 43, wherein the laser pulses are sent at a repetition rate of about 1 Hz to 100 MHz.

Example 45

The system of example 43 (as well as subject matter of example 44), wherein the laser pulses are sent at a repetition rate of about 20 Hz to 600 kHZ.

Example 46

The system of example 43 (as well as subject matter of one or more of any combination of examples 44-45), wherein the laser pulses are sent at a repetition rate of about 10 Hz to 40 Hz.

Example 47

The system of example 43 (as well as subject matter of one or more of any combination of examples 44-46), wherein the laser pulses are sent at a repetition rate of about 500 kHz to 700 kHz.

Example 48

The system of example 43 (as well as subject matter of one or more of any combination of examples 44-47), further comprising:
an annealing means for the annealing the surface at less than about 1,500 degC, whereby the annealing occurs after laser texture.

Example 49

The system of example 48 (as well as subject matter of one or more of any combination of examples 44-47), where the annealing occurs for a duration from about 1 second to about 2 hours.

Example 50

The system of example 48 (as well as subject matter of one or more of any combination of examples 44-49), where the annealing occurs for a duration from about 1 second to about 1 hour.

Example 51

The system of example 48 (as well as subject matter of one or more of any combination of examples 44-50), where the annealing occurs for a duration from 1 second to about 10 minutes.

Example 52

The system of example 43 (as well as subject matter of one or more of any combination of examples 44-51), wherein the laser spot size on the surface is about 50 um by about 2,000 um having a substantially uniform energy distribution.

Example 53

The system of example 43 (as well as subject matter of one or more of any combination of examples 44-52), wherein the laser spot size on the surface is about 50 um by about 200 um having a substantially uniform energy distribution.

Example 54

The system of example 43 (as well as subject matter of one or more of any combination of examples 44-53), wherein the laser spot size on the surface is between about 3 um to 8 mm by between about 3 um to 8 mm.

Example 55

The system of example 43 (as well as subject matter of one or more of any combination of examples 44-54), wherein the laser spot size on the surface has an area of about 10,000 um$^2$ having a substantially uniform energy distribution.

Example 56

The system of example 43 (as well as subject matter of one or more of any combination of examples 44-55), wherein the laser pulses have a wavelength of about 300 nm to 400 nm.

Example 57

The system of example 43 (as well as subject matter of one or more of any combination of examples 44-56), wherein the laser pulses have a laser pulse energy density of about 1.6 J/cm$^2$ to 2 J/cm$^2$.

Example 58

The system of example 43 (as well as subject matter of one or more of any combination of examples 44-57), wherein the laser pulses have a pulse width of about 3.5 ns.

Example 59

The system of example 43 (as well as subject matter of one or more of any combination of examples 44-58), wherein the laser pulses have a pulse width of about 1 ns.

Example 60

The system of example 43 (as well as subject matter of one or more of any combination of examples 44-59), wherein:
the base or the laser beam are configured to move relative to each other to allow the laser pulses to irradiate a larger surface area than the laser beam spot size.

Example 61

The system of example 43 (as well as subject matter of one or more of any combination of examples 44-60), wherein the material surface comprises at least one of the following: semiconductor material, metallic material, dielectric material, alloy material, or polymer material.

Example 62

The system of example 43 (as well as subject matter of one or more of any combination of examples 44-61), wherein the laser pulses have: about 80 to 120 laser pulses to irradiate the material, the wavelength of about 337 nm, the pulse energy density of about 1.6 J/cm$^2$ to 2 J/cm$^2$, and the pulse width of about 3.5 ns.

Example 63

The system of example 62 (as well as subject matter of one or more of any combination of examples 44-62), wherein the number of laser pulses is about 100.

Example 64

The system of example 43 (as well as subject matter of one or more of any combination of examples 44-63), wherein the laser pulses have:
about 80 to 120 laser pulses to irradiate the material.

Example 65

The system of 64 (as well as subject matter of one or more of any combination of examples 44-64), wherein the number of laser pulses is about 100.

REFERENCES

The following patents, applications and publications as listed below and throughout this document are hereby incorporated by reference in their entirety herein. The devices, systems, articles of manufacture and methods of various embodiments of the present invention disclosed herein may utilize aspects disclosed in the following patents and applications and are hereby incorporated by reference in their entirety (and which are not admitted to be prior art with respect to the present invention by inclusion in this section):

[1] C. Wu, C. H. Crouch, L. Zhao, J. E. Carey, R. Youkin, J. A. Levinson, E. Mazur, R. M. Farrell, P. Gothoskar, and A. Karger, "Near-unity below-band-gap absorption by microstructured silicon", Appl. Phys. Lett., 78, 1850 (2001).

[2] B. K. Nayak, V. V. Iyengar, M. C. Gupta, "Efficient light trapping in silicon solar cells by ultrafast-laser-induced self-assembled micro/nano structures", *Progress in Photovoltaics: Research and Applications*, DOI: 10.1002/pip.106718, 1 (2011).

[3] V. V. Iyengar, B. K. Nayak, and M. C. Gupta, "Optical properties of silicon light trapping structures for photovoltaics", *Solar energy materials and solar cells*, 94, 2251, (2010).

[4] V. V. Iyengar, B. K. Nayak, and M. C. Gupta, "Ultra low reflectance metal surfaces by ultrafast laser texturing", *Applied Optics* 49, 5983 (2010).

[5] A. Pedraza, J. Fowlkes and D. Lowndes, "Silicon microcolumn arrays grown by nanosecond pulsed-excimer laser irradiation", Appl. Phys. Lett., 74, 2322-2324 (1999).

[6] B. K. Nayak, M. C. Gupta, K. W. Kolasinski, "Ultrafast-laser-assisted chemical restructuring of silicon and germanium surfaces", Applied Surface Science, 253, 6580-6583 (2007).

[7] C. H. Crouch, J. E. Carey, J. M. Warrender, M. J. Aziz, E. Mazur, F. Y. Genin, "Comparision of structure and properties of femtosecond and nanosecond laser-structured silicon", Appl. Phys. Lett., 84, 1850 (2004).

[8] B. K. Nayak, M. C. Gupta, "Femtosecond-laser-induced-crystallization and simultaneous formation of light trapping microstructures in thin a-Si:H films", Applied Physics A: Materials Science & Processing, 89, 663-666 (2007).

[9] D. Mills, K. W. Kolasinski, "Laser-etched silicon pillars and their porosification", J. Vac. Sci. Technol. A, 22, 1647-1651 (2004).

[10] B. K. Nayak, M. C. Gupta and K. W. Kolasinski, "Spontaneous formation of nanospiked microstructures in germanium by femtosecond laser irradiation", Nanotechnology, 18, 195302-195302 (2007).

[11] V. Zorba, I. Alexandrou, I. Zergiotia, A. Manousakia, C. Ducatib, A. Neumeistera, C. Fotakisa, G.A.J. Amaratungab, "Laser microstructuring of Si surfaces for low-threshold field-electron Emission", Thin Solid Films, 453, 492-495 (2004).

[12] B. K. Nayak, M. C. Gupta, K. W. Kolasinski, "Formation of nano-textured conical microstructures in titanium metal surface by femtosecond laser irradiation", Appl. Phys. A, 90, 399-402 (2008).

[13] M. A. Bassam, P. Parvin, B. Sajad, A. Moghimi, H. Coster, "Measurement of optical and electrical properties of silicon microstructuring induced by ArF excimer laser at SF6 atmosphere", Appl. Surf Sci., 254, 2621-2628 (2008).

[14] B. K. Nayak and M. C. Gupta, "Ultrafast laser-induced self-organized conical micro/nano surface structures and their origin", Optics and Lasers in Engineering, 48, 966-973 (2010).

[15] D. Riedel, J. Hernandez-Pozos, E. Palmer, and K. Kolasinski, *Fabrication of ordered arrays of silicon cones by optical diffraction in ultrafast laser etching with $SF_6$*", Appl. Phys. A, 78, 381-385 (2004).

[16] B. K. Nayak and M. C. Gupta, "Self-organized micro/nano structures in metal surfaces by ultrafast laser irradiation", Optics and Lasers in Engineering, 48, 940-949 (2010).

[17] M. Sheehy, L. Winston, J. E. Carey, C. M. Friend and E. Mazur, "Role of the background gas in the morphology and optical properties of laser-microstructured silicon", Chem. Mater. 17, 3582 (2005).

[18] V. V. Iyengar, B. K. Nayak, and Mool C. Gupta,"Material properties of ultrafast laser textured silicon for photovoltaics", *Solar energy materials and solar cells*, 95, 2745 (2011).

[19] A. J. Pedraza, J. D. Fowlkes, D.H. Lowndes, "Self-organized silicon microcolumn arrays generated by pulsed laser irradiation", Appl. Phys. A., 69, S731-S734 (1999).

[20] D.H. Lowndes, J. D. Fowlkes, A. J. Pedraza, "Early stages of pulsed-laser growth of silicon microcolumns and microcones in air and $SF_6$", Appl. Surf. Sci. 154, 647-658 (2000).

[21] T.H. Her, R.J. Finlay, C. Wu, E. Mazur, Femtosecond laser-induced formation of spikes on silicon, Applied Physics A: Materials Science & Processing, 70 (2000) 383-385.

[22] F. Raksi, K.R. Wilson, Z. Jiang, A. Ikhlef, C.Y. Cote, J.-C. Kieffer, Ultrafast x-ray absorption probing of a chemical reaction, The Journal of Chemical Physics, 104 (1996) 6066-6069.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for texturing a surface of a material, comprising:
    providing a gaseous or vacuum environment in an area around the surface of the material;
    irradiating a portion of the surface with about 1 to 120 laser pulses, wherein the laser pulses have:
        a laser pulse energy density of about 1.6 $J/cm^2$ to 2 $J/cm^2$,
        a wavelength of about 337 nm,
        a pulse width of about 3.5 ns; and
    wherein the method produces a periodic array of pillars or a non-periodic array of pillars on the surface, resulting in changes in properties of the surface.

2. The method of claim 1, wherein the laser pulses are sent at a repetition rate of about 1 Hz to 100 MHz.

3. The method of claim 1, wherein the laser pulses are sent at a repetition rate of about 20 Hz to 600 kHZ.

4. The method of claim 1, wherein the laser pulses are sent at a repetition rate of about 10 Hz to 40 Hz.

5. The method of claim 1, wherein the laser pulses are sent at a repetition rate of about 500 kHz to 700 kHz.

6. The method of claim 1, further comprising the step of:
    annealing said surface at less than about 1,500 degC after laser texture.

7. The method of claim 6, where said annealing occurs for a duration from about 1 second to about 2 hours.

8. The method of claim 6, where said annealing occurs for a duration from about 1 second to about 1 hour.

9. The method of claim 6, where said annealing occurs for a duration from 1 second to about 10 minutes.

10. The method of claim 1, wherein the laser spot size is about 50 µm to about 200 µm having a substantially uniform energy distribution.

11. The method of claim 1, wherein the laser spot size on the surface is between about 3 µm to 8 mm by between about 3 µm to 8 mm.

12. The method of claim 1, wherein the laser spot size on the surface has an area of about 10,000 µm² having a substantially uniform energy distribution.

13. The method of claim 1, further comprising the step of:
moving at least one of the surface or the laser beam relative to each other to allow the laser pulses to irradiate a surface area larger than the laser beam spot size.

14. The method of claim 1, wherein said material surface comprises at least one of the following:
semiconductor material, metallic, dielectric material, alloy material, or polymer material.

15. The method of claim 14, wherein the number of said laser pulses is about 100.

16. The method of claim 1, wherein the number of said laser pulses is about 80 to 120.

17. The method of using the textured surface of claim 1 to provide a high-efficiency heat sink for an electronic or optoelectronic device.

18. The method of using the textured surface of claim 1 to provide a very high electric field for electron emission.

19. The method of using the textured surface of claim 1 to generate catalytic activity.

20. The method of using the textured surface of claim 1 to perform osteointegration of a body implant.

21. The method of using the textured surface of claim 1 to control the flow of air or fluid over the surface.

22. The method of using the textured surface of claim 1 to create a two-dimensional array of micro or nano dimensioned ordered tips.

23. The method of using the textured surface of claim 1 to manufacture an optical beam block which absorbs substantially all light from the visible to the far-infrared.

24. The method of using the textured surface of claim 1 in micro fluidic applications.

25. The method of using the textured surface of claim 1 to provide a radiation shield which operates in a broad spectral range.

26. The method of using the textured surface of claim 1 to provide an infrared sensor.

27. The method of using the textured surface of claim 1 to provide an element to control light reflection or transmission in an optical device.

28. The method of using the textured surface of claim 1 to provide a template for optoelectronic devices.

29. The method of claim 28, wherein said optoelectronic devices comprises at least one of: photodetector, photovoltaic cell, photoconductive devices, sensor application, sensor, optical device, electronic device, or photonic device.

30. The method of using the textured surface of claim 1 to provide an electrical device.

31. The method of claim 30, wherein, said electrical device provides at least one of electrical resistance or charge carrier control type.

32. The method of using the textured surface of claim 1 to provide a laser device to control optical properties.

33. The method of using the textured surface of claim 1 to provide an opto-mechanical device.

34. The method of claim 33, wherein said opto-mechanical device provides electrical power conversion for mechanical motion.

35. The method of using the textured surface of claim 1 to provide a mechanical device.

36. The method of claim 35, wherein said mechanical device can be used to control tribological properties required for said mechanical device.

37. A system for texturing a surface of a material comprising:
a gaseous or vacuum environment encompassing the material;
a base for retaining the surface; and
an energy source configured to provide a radiation source, said radiation source configured to irradiate a portion of the surface with about 1 to 120 laser pulses, said laser pulses configured to provide:
a laser pulse energy density of 1.6 J/cm² 2 J/cm²;
a wavelength of about 337 nm; and
a pulse width of about 3.5 ns;
resulting in the formation of a periodic array of pillars or a non-periodic array of pillars on the surface.

38. The system of claim 37, wherein the laser pulses are sent at a repetition rate of about 1 Hz to 100 MHz.

39. The system of claim 37, wherein the laser pulses are sent at a repetition rate of about 20 Hz to 600 kHZ.

40. The system of claim 37, wherein the laser pulses are sent at a repetition rate of about 10 Hz to 40 Hz.

41. The system of claim 37, wherein the laser pulses are sent at a repetition rate of about 500 kHz to 700 kHz.

42. The system of claim 37, further comprising:
an annealing means for annealing said surface at less than about 1,500 degC, whereby said annealing occurs after laser texture.

43. The system of claim 42, where said annealing occurs for a duration from about 1 second to about 2 hours.

44. The system of claim 42, where said annealing occurs for a duration from about 1 second to about 1 hour.

45. The system of claim 42, where said annealing occurs for a duration from 1 second to about 10 minutes.

46. The system of claim 37, wherein the laser spot size on said surface is about 50 µm by about 2,000 µm having a substantially uniform energy distribution.

47. The system of claim 37, wherein the laser spot size on said surface is about 50 µm by about 200 µm having a substantially uniform energy distribution.

48. The system of claim 37, wherein the laser spot size on the surface is between about 3 µm to 8 mm by between about 3 µm to 8 mm.

49. The system of claim 37, wherein the laser spot size on the surface has an area of about 10,000 µm² having a substantially uniform energy distribution.

50. The system of claim 37, wherein:
the base or the laser beam are configured to move relative to each other to allow the laser pulses to irradiate a larger surface area than the laser beam spot size.

51. The system of claim 37, wherein said material surface comprises at least one of the following:
semiconductor material, metallic material, dielectric material, alloy material, or polymer material.

52. The system of claim 37, wherein the number of said laser pulses is about 100.

53. The system of claim 37, wherein the number of said laser pulses is about 80 to 120.

54. A method for texturing a surface of a material, comprising:
providing a gaseous or vacuum environment in an area around the surface of the material;
irradiating a portion of the surface with about 1 to 120 laser pulses, wherein the laser pulses have:
a laser pulse energy density of about 1.6 J/cm² to 2 J/cm², a wavelength of about 337 nm,
a pulse width of about 1 ns to 3.5 ns; and
wherein the method produces a periodic array of pillars or a non-periodic array of pillars on the surface, resulting in changes in properties of the surface.

55. The method of claim 54, wherein the laser pulses are sent at a repetition rate of about 1 Hz to 100 MHz.

56. The method of claim 54, further comprising the step of:
annealing said surface at less than about 1,500 deg C after laser texture.

57. The method of claim 54, wherein the laser spot size on the surface is between about 3 μm to 8 mm by between about 3 μm to 8 mm.

58. The method of claim 54, further comprising the step of:
moving at least one of the surface or the laser beam relative to each other to allow the laser pulses to irradiate a surface area larger than the laser beam spot size.

59. The method of claim 54, wherein said material surface comprises at least one of the following:
semiconductor material, metallic, dielectric material, alloy material, or polymer material.

60. A system for texturing a surface of a material comprising:
a gaseous vacuum environment encompassing the material;
a base for retaining the surface; and
an energy source configured to provide a radiation source, said radiation source configured to irradiate a portion of the surface with about 1 to 120 laser pulses, said laser pulses configured to provide:
a laser pulse energy density of about 1.6 J/cm$^2$ to 2 J/cm$^2$;
a wavelength of about 337 nm; and
a pulse width of about 1 ns to 3.5 ns;
resulting in the formation of a periodic array of pillars or a non-periodic array of pillars on the surface.

61. The system of claim 60, wherein the laser pulses are sent at a repetition rate of about 1 Hz to 100 MHz.

62. The system of claim 60, further comprising:
an annealing means for the annealing of said surface at less than about 1,500 deg C, whereby said annealing occurs after laser texture.

63. The system of claim 60, wherein the laser spot size on the surface is between about 3 μm to 8 mm by between about 3 μm to 8 mm.

64. The system of claim 60, wherein:
the base or the laser beam are configured to move relative to each other to allow the laser pulses to irradiate a larger surface area than the laser beam spot size.

65. The system of claim 60, wherein said material surface comprises at least one of the following:
semiconductor material, metallic material, dielectric material, alloy material, or polymer material.

* * * * *